US010460162B2

(12) United States Patent
Gelosi

(10) Patent No.: US 10,460,162 B2
(45) Date of Patent: Oct. 29, 2019

(54) METHOD, DEVICE, AND SYSTEM, FOR IDENTIFYING DATA ELEMENTS IN DATA STRUCTURES

(71) Applicant: Handycontract, LLC, Reno, NV (US)

(72) Inventor: Patrizio Gelosi, Phan Rang (VN)

(73) Assignee: Handycontract, LLC, Reno, NV (US)

(*) Notice: Subject to any disclaimer, the term of this patent is extended or adjusted under 35 U.S.C. 154(b) by 0 days.

(21) Appl. No.: 16/155,844

(22) Filed: Oct. 9, 2018

(65) Prior Publication Data

US 2019/0114479 A1    Apr. 18, 2019

Related U.S. Application Data

(63) Continuation of application No. 16/152,384, filed on Oct. 4, 2018.

(60) Provisional application No. 62/573,174, filed on Oct. 17, 2017.

(51) Int. Cl.

| G06F 17/00 | (2019.01) |
|---|---|
| G06K 9/00 | (2006.01) |
| G06F 17/22 | (2006.01) |
| G06F 17/24 | (2006.01) |
| G06F 16/93 | (2019.01) |

(52) U.S. Cl.
CPC ..... *G06K 9/00469* (2013.01); *G06F 17/2229* (2013.01); *G06F 17/2241* (2013.01); *G06F 17/245* (2013.01); *G06K 9/00463* (2013.01); *G06F 16/93* (2019.01)

(58) Field of Classification Search
CPC ............ G06F 17/2247; G06F 17/2745; G06F 17/2229
See application file for complete search history.

(56) References Cited

U.S. PATENT DOCUMENTS

| 5,392,387 | A  | * | 2/1995  | Fitzpatrick | G06F 3/0483 715/776 |
|---|---|---|---|---|---|
| 5,634,064 | A  | * | 5/1997  | Warnock | G06F 16/93 715/208 |
| 6,298,357 | B1 | * | 10/2001 | Wexler | G06F 17/272 715/210 |
| 6,442,574 | B1 | * | 8/2002  | Schumacher | G06F 3/0489 715/208 |
| 6,820,079 | B1 | * | 11/2004 | Evans | G06F 17/2211 |
| 7,080,318 | B2 | * | 7/2006  | Devillers | G06F 17/2247 707/E17.006 |
| 7,107,524 | B2 | * | 9/2006  | Lin | G06F 16/355 715/234 |

(Continued)

*Primary Examiner* — Laurie A Ries
(74) *Attorney, Agent, or Firm* — Banner & Witcoff, Ltd.

(57) ABSTRACT

A computer implemented method for identifying one or more data elements in an input data stream formed from an input data structure using processing enabled by a processor-executable instruction can be stored on a non-transitory computerized storage medium. This stored method includes identifying a marker sequence set in the input document string, the marker sequence set including a marker sequence; assigning an eligibility value to each marker sequence, the eligibility value being a number calculated using an eligibility calculation, to obtain at least one eligible marker sequence; generating output data comprising data related to the at least one eligible marker sequence; and providing the output data, such as on a human-readable interface.

20 Claims, 31 Drawing Sheets

(56) References Cited

U.S. PATENT DOCUMENTS

| | | | |
|---|---|---|---|
| 7,260,773 B2* | 8/2007 | Zernik | G06F 17/2211 |
| | | | 707/999.202 |
| 7,743,327 B2* | 6/2010 | Meunier | G06F 17/2745 |
| | | | 715/255 |
| 7,937,653 B2* | 5/2011 | Dejean | G06F 17/2745 |
| | | | 715/234 |
| 8,060,506 B1* | 11/2011 | Chang | G06F 16/345 |
| | | | 707/729 |
| 8,209,608 B1* | 6/2012 | Linyard | G06F 17/211 |
| | | | 715/716 |
| 8,302,002 B2* | 10/2012 | Dejean | G06F 16/313 |
| | | | 715/256 |
| 8,706,475 B2* | 4/2014 | Dejean | G06F 17/2745 |
| | | | 704/1 |
| 9,001,390 B1* | 4/2015 | Zernik | G06K 9/00463 |
| | | | 358/448 |
| 9,229,916 B2* | 1/2016 | DeLuca | G06F 17/2247 |
| 9,355,083 B1* | 5/2016 | Meran | G06F 16/27 |
| 9,361,355 B2* | 6/2016 | Anderson | G06F 16/285 |
| 9,424,465 B2 | 8/2016 | Zernik | |
| 9,563,351 B2* | 2/2017 | Migos | G06F 3/0483 |
| 9,575,945 B2* | 2/2017 | Mansfield | G06F 17/211 |
| 9,736,331 B2 | 8/2017 | Zernik | |
| 2004/0054535 A1* | 3/2004 | Mackie | G10L 13/08 |
| | | | 704/260 |
| 2004/0268230 A1* | 12/2004 | Liu | G06F 17/211 |
| | | | 715/201 |
| 2005/0210003 A1* | 9/2005 | Tsay | G06F 16/334 |
| 2007/0188473 A1* | 8/2007 | Anwar | G06F 3/0481 |
| | | | 345/173 |
| 2008/0077554 A1* | 3/2008 | Fablet | G06F 17/2247 |
| 2010/0146435 A1* | 6/2010 | Cros | G06F 3/04855 |
| | | | 715/786 |
| 2010/0268528 A1* | 10/2010 | Raskina | G06F 17/277 |
| | | | 704/9 |
| 2010/0306260 A1* | 12/2010 | Dejean | G06F 17/2745 |
| | | | 707/776 |
| 2011/0137900 A1* | 6/2011 | Chang | G06F 16/353 |
| | | | 707/737 |
| 2012/0297335 A1* | 11/2012 | Ramasubramanian | G06F 3/04855 |
| | | | 715/787 |
| 2013/0007087 A1* | 1/2013 | van den Brink | G06F 15/76 |
| | | | 708/800 |
| 2014/0281876 A1* | 9/2014 | Schmidt | G06F 17/241 |
| | | | 715/230 |
| 2015/0046681 A1* | 2/2015 | King | G06F 15/76 |
| | | | 712/42 |
| 2015/0121204 A1* | 4/2015 | O'Donoghue | G06F 17/217 |
| | | | 715/251 |
| 2016/0048482 A1* | 2/2016 | Tsui | G06F 16/24578 |
| | | | 715/251 |
| 2016/0364608 A1* | 12/2016 | Sengupta | G06F 16/35 |
| 2017/0169251 A1* | 6/2017 | Lewin-Eytan | G06F 21/6254 |
| 2017/0346986 A1* | 11/2017 | Zernik | G06K 9/00463 |

\* cited by examiner

ACKNOWLEDGMENT OF DEBT [EOL]
[EOL]                                                502
[EOL]
This Acknowledgment Of Debt ("the Acknowledgment") is entered into as of Feb. 1, 2017 (the "Effective Date") between Johnny Doe ("Creditor") and James Roe ("Debtor"). [EOL]
[EOL]
Section 1. Acknowledgment: [EOL]
  1.1 The facts giving rise to the debt are: [EOL]
    i) the fact occurred on 12/17/2015 [EOL]
    ii) the fact occurred on 4/21/2015 [EOL]
  1.2 The debtor acknowledges indebtedness to the creditor in the sum of $ [EOL]
[EOL]
[EOL]

1 [EOL]
[EOL]                                504
[EOL]
1.1 00 (one thousand and one hundred dollars) plus an interest rate of 5% per annum. [EOL]
[EOL]
Section 2. Payment: [EOL]
 2.1 The debtor agrees to pay the outstanding amount in instalments of $ 100 over 11 months. [EOL]
 2.2 The first monthly instalment will commence on Jan 1, 2018 [EOL]
[EOL]
Sction 3 General: [EOL]
 3.1 Should the debtor fail to make payment on the due date/s, the full balance of the outstanding amount becomes due and payable by the debtor to the creditor together with legal costs [EOL]
 3.2 This acknowledgment constitutes the entire agreement and no variation in terms of this agreement, novation or cancellation shall be of any force or effect unless reduced to writing and signed by both the creditor and debtor. [EOL]
[EOL]
[EOL]

2 [EOL]
[EOL]                                506

Fig. 5

ACKNOWLEDGMENT OF DEBT [EOL]
[EOL]
[EOL]                            602                        604
Section 1. Acknowledgment: [EOL]
This Acknowledgment Of Debt ("the Acknowledgment") is entered into as of Feb. 1, 2017 (the "Effective Date") between Johnny Doe ("Creditor") and James Roe ("Debtor"). [EOL]
[EOL]
  1.1 The facts giving rise to the debt are: [EOL]
    i) the fact occurred on 12/17/2015 [EOL]
    ii) the fact occurred on 4/21/2015 [EOL]
  1.2 The debtor acknowledges indebtedness to the creditor in the sum of $ [EOL]
[EOL]
[EOL]
                              1 [EOL]
[EOL]
[EOL]
1.1 00 (one thousand and one hundred dollars) plus an interest rate of 5% per annum. [EOL]
[EOL]
Section 2. Payment: [EOL]
 2.1 The debtor agrees to pay the outstanding amount in instalments of $ 100 over 11 months. [EOL]
 2.2 The first monthly instalment will commence on Jan 1, 2018 [EOL]
[EOL]
Sction 3 General: [EOL]
 3.1 Should the debtor fail to make payment on the due date/s, the full balance of the outstanding amount becomes due and payable by the debtor to the creditor together with legal costs [EOL]
 3.2 This acknowledgment constitutes the entire agreement and no variation in terms of this agreement, novation or cancellation shall be of any force or effect unless reduced to writing and signed by both the creditor and debtor. [EOL]
[EOL]
[EOL]
                              2 [EOL]
[EOL]

Fig. 6

702 — ACKNOWLEDGMENT OF DEBT Section ① Acknowledgment: This Acknowledgment Of Debt ("the Acknowledgment") is entered into as of Feb. 1, 2017 (the "Effective Date") between Johnny Doe ("Creditor") and James Roe ("Debtor"). (1.1) The facts giving rise to the debt are: i) the fact occurred on 12/17/2015 ii) the fact occurred on 4/21/2015 (1.2) The debtor acknowledges indebtedness to the creditor in the sum of $ 1 1.1 00 (one thousand and one hundred dollars) plus an interest rate of 5% per annum. Section② Payment: (2.1) The debtor agrees to pay the outstanding amount in instalments of $ 100 over 11 months. (2.2) The first monthly instalment will commence on Jan 1, 2018 Sction ③ General: (3.1) Should the debtor fail to make payment on the due date/s, the full balance of the outstanding amount becomes due and payable by the debtor to the creditor together with legal costs (3.2) This acknowledgment constitutes the entire agreement and no variation in terms of this agreement, novation or cancellation shall be of any force or effect unless reduced to writing and signed by both the creditor and debtor. 2

Fig. 7

ACKNOWLEDGMENT OF DEBT [EOL]
[EOL]
[EOL]
This Acknowledgment Of Debt ("the Acknowledgment") is entered into as of Feb. 1, 2017 (the "Effective Date") between Johnny Doe ("Creditor") and James Roe ("Debtor"). [EOL]
[EOL]
Section 1. Acknowledgment: [EOL]
  1.1 The facts giving rise to the debt are: [EOL]
    i) the fact occurred on 12/17/2015 [EOL]
    ii) the fact occurred on 4/21/2015 [EOL]
  1.2 The debtor acknowledges indebtedness to the creditor in the sum of $ 1.1 00 (one thousand and two hundred dollars) plus an interest rate of 5% per annum. [EOL]
[EOL]
Section 2. Payment: [EOL]
  2.1 The debtor agrees to pay the outstanding amount in instalments of $ 100 over 11 months. [EOL]
  2.2 The first monthly instalment will commence on Jan 1, 2018 [EOL]
  2.3 The present terms of payment are subject to the restrictions of the Section(3.) [EOL]
[EOL]
Section(3.)General: [EOL]
  3.1 Should the debtor fail to make payment on the due date/s, the full balance of the outstanding amount becomes due and payable by the debtor to the creditor together with legal costs [EOL]
  3.2 This acknowledgment constitutes the entire agreement and no variation in terms of this agreement, novation or cancellation shall be of any force or effect unless reduced to writing and signed by both the creditor and debtor. [EOL]
[EOL]

Fig. 8

| step 7 | ...in the sum of $... ①|

| mS[ 0 ] | mS[ 1 ] | mS[ 2 ] | mS[ 3 ] |
|---|---|---|---|
| 1 {Feb} | 1. | i) | 1 {Page} |
| 1.1 | 1.1 | ii) | |
| 1.2 | 1.2 | | |

| step 8 | ...①.1) 00 (one thousand and one hundred ... |

| mS[ 0 ] | mS[ 1 ] | mS[ 2 ] | mS[ 3 ] |
|---|---|---|---|
| 1 {Feb} | 1. | i) | 1 {Page} |
| 1.1 | 1.1 | ii) | 1.1 {00} |
| 1.2 | 1.2 | | |

| step 9 | Section ② Payment: |

| mS[ 0 ] | mS[ 1 ] | mS[ 2 ] | mS[ 3 ] |
|---|---|---|---|
| 1 {Feb} | 1. | i) | 1 {Page} |
| 1.1 | 1.1 | ii) | 1.1 {00} |
| 1.2 | 1.2 | | 2. |
| 2. | 2. | | |

...

| step 16 | ...signed by both the creditor and debtor. ② |

1002

| mS[ 0 ] | mS[ 1 ] | mS[ 2 ] | mS[ 3 ] | mS[ 4 ] |
|---|---|---|---|---|
| 1 {Feb} | 1. | i) | 1 {Page} | 1 {Jan} |
| 1.1 | 1.1 | ii) | 1.1 {00} | 2 {Page} |
| 1.2 | 1.2 | | 2. | |
| 2. | 2. | | 2.1 | |
| 2.1 | 2.1 | | 2.2 | |
| 2.2 | 2.2 | | 3 | |
| 3 | 3 | | 3.1 | |
| 3.1 | 3.1 | | 3.2 | |
| 3.2 | 3.2 | | | |

Fig. 10 step 7-B  ...(1.1) 00 (one thousand and one hundred ...

| mS[ 0 ] | mS[ 1 ] | mS[ 2 ] | mS[ 3 ] | mS[ 4 ] |
|---|---|---|---|---|
| 1 {Feb} | 1. | i) | 1 {Feb} | 1. |
| 1.1 | 1.1 | ii) | 1.1 {00} | 1.1 {00} |
| 1.2 | 1.2 | | | | step 13-B  ...to the restrictions of the Section (3.)

| mS[ 0 ] | mS[ 1 ] | mS[ 2 ] | mS[ 3 ] | mS[ 4 ] | mS[ 5 ] |
|---|---|---|---|---|---|
| 1 {Feb} | 1. | i) | 1 {Feb} | 1. | 1 {Jan} |
| 1.1 | 1.1 | ii) | 1.1 {00} | 1.1 {00} | |
| 1.2 | 1.2 | | 2. | 2. | |
| 2. | 2. | | 2.1 | 2.1 | |
| 2.1 | 2.1 | | 2.2 | 2.2 | |
| 2.2 | 2.2 | | 2.3 | 2.3 | |
| 2.3 | 2.3 | | 3. {Ref.} | 3. {Ref.} | |
| 3. {Ref.} | 3. {Ref.} | | | | | step 14-B  Section (3.) Payment:

| mS[ 0 ] | mS[ 1 ] | mS[ 2 ] | mS[ 3 ] | mS[ 4 ] | mS[ 5 ] | mS[ 6 ] | mS[ 7 ] | mS[ 8 ] | mS[ 9 ] |
|---|---|---|---|---|---|---|---|---|---|
| 1 {Feb} | 1. | i) | 1 {Feb} | 1. | 1 {Jan} | 1 {Feb} | 1. | 1 {Feb} | 1. |
| 1.1 | 1.1 | ii) | 1.1 {00} | 1.1 {00} | | 1.1 | 1.1 | 1.1 {00} | 1.1 {00} |
| 1.2 | 1.2 | | 2. | 2. | | 1.2 | 1.2 | 2. | 2. |
| 2. | 2. | | 2.1 | 2.1 | | 2. | 2. | 2.1 | 2.1 |
| 2.1 | 2.1 | | 2.2 | 2.2 | | 2.1 | 2.1 | 2.2 | 2.2 |
| 2.2 | 2.2 | | 2.3 | 2.3 | | 2.2 | 2.2 | 2.3 | 2.3 |
| 2.3 | 2.3 | | 3. {Ref.} | 3. {Ref.} | | 2.3 | 2.3 | 3. | 3. |
| 3. {Ref.} | 3. {Ref.} | | | | | 3. | 3. | | | step 16-B  (3.2) This acknowledgment constitutes...

| mS[ 0 ] | mS[ 1 ] | mS[ 2 ] | mS[ 3 ] | mS[ 4 ] | mS[ 5 ] | mS[ 6 ] | mS[ 7 ] | mS[ 8 ] | mS[ 9 ] |
|---|---|---|---|---|---|---|---|---|---|
| 1 {Feb} | 1. | i) | 1 {Feb} | 1. | 1 {Jan} | 1 {Feb} | 1. | 1 {Feb} | 1. |
| 1.1 | 1.1 | ii) | 1.1 {00} | 1.1 {00} | | 1.1 | 1.1 | 1.1 {00} | 1.1 {00} |
| 1.2 | 1.2 | | 2. | 2. | | 1.2 | 1.2 | 2. | 2. |
| 2. | 2. | | 2.1 | 2.1 | | 2. | 2. | 2.1 | 2.1 |
| 2.1 | 2.1 | | 2.2 | 2.2 | | 2.1 | 2.1 | 2.2 | 2.2 |
| 2.2 | 2.2 | | 2.3 | 2.3 | | 2.2 | 2.2 | 2.3 | 2.3 |
| 2.3 | 2.3 | | 3. {Ref.} | 3. {Ref.} | | 2.3 | 2.3 | 3. | 3. |
| 3. {Ref.} | 3. {Ref.} | | 3.1 | 3.1 | | 3. | 3. | 3.1 | 3.1 |
| 3.1 | 3.1 | | 3.2 | 3.2 | | 3.1 | 3.1 | 3.2 | 3.2 |
| 3.2 | 3.2 | | | | | 3.2 | 3.2 | | |

Fig. 11

ACKNOWLEDGMENT OF DEBT

This Acknowledgment Of Debt ("the Acknowledgment") is entered into as of Feb. 1, 2017 (the "Effective Date") between Johnny Doe ("Creditor") and James Roe ("Debtor").

Section 1. Acknowledgment:
1.1) The facts giving rise to the debt are:
  i) the fact occurred on 12/17/2015
  ii) the fact occurred on 4/21/2015
1.2) The debtor acknowledges indebtedness to the creditor in the sum of $

1

1.1 00 (one thousand and one hundred dollars) plus and interest rate of 5% per annum.

Section 2. Payment:
2.1) The debtor agrees to pay the outstanding amount in instalments of $ 100 over 11 months.
2.2) The first monthly instalment will commence on Jan 1, 2018

Section 3. General:
3.1) Should the debtor fail to make payment on the due date/s, the full balance of the outstanding amount becomes due and payable by the debtor to the creditor together with legal costs
3.2) This acknowledgment constitutes the entire agreement and no variation in terms of this agreement, novation or cancellation shall be of any force or effect unless reduced to writing and signed by both the creditor and debtor.

LEASE AGREEMENT
TABLE OF CONTENTS

DEFINITIONS AND INTERPRETATIONS ........................................................................................ 1
LEASE AGREEMENT ........................................................................................................................ 1
1. Parties ................................................................................................................................................ 2
2. Conditions ......................................................................................................................................... 2
3. Duration ............................................................................................................................................. 2
4. Right of Use ....................................................................................................................................... 2
5. Rent .................................................................................................................................................... 2
5.1. Amount ........................................................................................................................................... 2
5.1.1. Monthly Rent ............................................................................................................................... 2
5.1.2. Yearly Increase ............................................................................................................................ 2
5.2. Due Date ......................................................................................................................................... 2
6. Payments ........................................................................................................................................... 3
GENERAL ........................................................................................................................................... 3
I. Alterations and Improvements. ......................................................................................................... 3
II. Termination and Breach ................................................................................................................... 3

DEFINITIONS AND INTERPRETATIONS

A) Building/s: the house and outbuildings, if any, on the Property.
B) Days: business days which are calculated by excluding: i) the first day, ii) public holiday, iii) Saturday, and iv) Sunday.
C) Lease Period: the duration of this agreement per clause 3

LEASE AGREEMENT

1. Parties. The Parties to this agreement are: a) John Doe ("Lessor"); and b) Joan Boe ("Lessee").
2. Conditions. The Lessor leases his Property to the Lessee on the terms and conditions of this agreement.
3. Duration. This agreement will commence on Sep. 1, 2017 and will continue for 2 year/s and 3 months.
4. Right of Use. The Lessee, for the Lease Period, has the right to use and enjoy the Property as agreed.
5. Rent
  5.1. Amount.
    5.1.1. Monthly Rent. The Rent will be: $ 800 for each Month of the first Year of the Lease Period;
    5.1.2. Yearly Increase. The amount shall increase, annually, by 2.5 %.
  5.2. Due Date. The Lessee must pay the Rent in advance, on or before the first day of each Month.
6. Payments. The Lessor shall furnish the Lessee with a written receipt for all payments made by the Lessee.

GENERAL

I. Alterations and Improvements. The Lessee may not make alterations or improvements to the Property without the Lessor's prior written consent.
II. Termination and Breach.
  II.1. If the Property is destroyed or damaged to the extent that it cannot be occupied, this agreement will terminate unless the Parties agree in writing otherwise.
  II.2. If a Party breaches a material provision of this agreement the aggrieved Party will be entitled to any remedy available in law without further notice.
  II.3. The insolvency of either the Lessor or the Lessee will not terminate this agreement.

| mS[ 0 ] | |
|---|---|
| 一 | 第一章 |
| 二 | 第二条 |
| 三 | 第三条 |
| 四 | 第四条 |
| 五 | 第五条 |
| 六 | 第六条 |
| 七 | 第七条 |
| 八 | 第八条 |
| 九 | 第九条 |
| 十 | 第十条 |
| 十一 | 第十一条 |
| 十二 | 第十二条 |
| 十三 | 第十三条 |
| 十四 | 第十四条 |

| mS[ 1 ] | |
|---|---|
| 一 | …一般规… |
| 二 | 第二条 |
| 三 | 第三条 |
| 四 | 第四条 |
| 五 | 第五条 |
| 六 | 第六条 |
| 七 | 第七条 |
| 八 | 第八条 |
| 九 | 第九条 |
| 十 | 第十条 |
| 十一 | 第十一条 |
| 十二 | 第十二条 |
| 十三 | 第十三条 |
| 十四 | 第十四条 |

| mS[ 2 ] | |
|---|---|
| 一 | 第一条 |
| 二 | 第二条 |
| 三 | 第三条 |
| 四 | 第四条 |
| 五 | 第五条 |
| 六 | 第六条 |
| 七 | 第七条 |
| 八 | 第八条 |
| 九 | 第九条 |
| 十 | 第十条 |
| 十一 | 第十一条 |
| 十二 | 第十二条 |
| 十三 | 第十三条 |
| 十四 | 第十四条 |

| mS[ 3 ] | |
|---|---|
| 一 | …一方不… |
| 二 | 第二章 |
| 三 | 第三章 |

| mS[ 4 ] | |
|---|---|
| 一 | …一方。 |
| 二 | 第二章 |
| 三 | 第三章 |

| mS[ 5 ] | |
|---|---|
| 一 | 第一章 |
| 二 | 第二章 |
| 三 | 第三章 |

| mS[ 6 ] | |
|---|---|
| 一 | …一般规… |
| 二 | 第二章 |
| 三 | 第三章 |

| mS[ 7 ] | |
|---|---|
| 一 | 第一条 |
| 二 | 第二章 |
| 三 | 第三章 |

1702, 1706, 1708

| mS[ 8 ] | |
|---|---|
| 一 | …一般包… |

1704

| mS[ 9 ] | |
|---|---|
| (1.) | (1.) 当事… |
| (2.) | (2.) 标的; |
| (3.) | (3.) 数量; |
| (4.) | (4.) 质量; |
| (5.) | (5.) 价款… |

ACKNOWLEDGMENT OF DEBT

This Acknowledgment Of Debt ("the Acknowledgment") is entered into as of Feb. 1, 2017 (the "Effective Date") between Johnny Doe ("Creditor") and James Roe ("Debtor").

2202

Section 1) Acknowledgment:
2204 (1.1) The facts giving rise to the debt are:
(i) the fact occurred on 12/17/2015
2206 (ii) the fact occurred on 4/21/2015
(1.2) The debtor acknowledges indebtedness to the creditor in the sum of $ 2208 

(1.1)00 (one thousand and one hundred dollars) plus an interest rate of 5% per
2210 annum.

(Section 2) Payment:
(2.1) The debtor agrees to pay the outstanding amount in instalments of $ 100 over 11 months.
 (2.2) The first monthly instalment will commence on Jan 1, 2018

Sction 3) General:
2212 (3.1) Should the debtor fail to make payment on the due date/s, the full balance of the outstanding amount becomes due and payable by the debtor to the creditor together with legal costs
(3.2) This acknowledgment constitutes the entire agreement and no variation in terms of this agreement, novation or cancellation shall be of any force or effect unless reduced to writing and signed by both the creditor and debtor.

Fig. 22

ACKNOWLEDGMENT OF DEBT

2302  This Acknowledgment Of Debt ("the Acknowledgment") is entered into as of Feb. 1, 2017 (the "Effective Date") between Johnny Doe ("Creditor") and James Roe ("Debtor").

Section 1) Acknowledgment:
- 1.1) The facts giving rise to the debt are:
    i) the fact occurred on 12/17/2015
    ii) the fact occurred on 4/21/2015
- 1.2) The debtor acknowledges indebtedness to the creditor in the sum of $

1

1.1 00 (one thousand and one hundred dollars) plus an interest rate of 5% per annum.

Section 2) Payment:
- 2.1) The debtor agrees to pay the outstanding amount in instalments of $ 100 over 11 months.
- 2.2) The first monthly instalment will commence on Jan 1, 2018

Sction 3) General:
- 3.1) Should the debtor fail to make payment on the due date/s, the full balance of the outstanding amount becomes due and payable by the debtor to the creditor together with legal costs
- 3.2) This acknowledgment constitutes the entire agreement and no variation in terms of this agreement, novation or cancellation shall be of any force or effect unless reduced to writing and signed by both the creditor and debtor.

ACKNOWLEDGMENT OF DEBT

This Acknowledgment Of Debt ("the Acknowledgment") is entered into as of Feb. 1, 2017 (the "Effective Date") between Johnny Doe ("Creditor") and James Roe ("Debtor").

2502

2504 Section(1) Acknowledgment:
(1.1) The facts giving rise to the debt are:
    i) the fact occurred on 12/17/2015
    ii) the fact occurred on 4/21/2015
(1.2) The debtor acknowledges indebtedness to the creditor in the sum of $

1

1.1 00 (one thousand and one hundred dollars) plus an interest rate of 5% per annum.

Section (2) Payment:
(2.1) The debtor agrees to pay the outstanding amount in instalments of $ 100 over 11 months.
(2.2) The first monthly instalment will commence on Jan 1, 2018

Sction (3) General:
(3.1) Should the debtor fail to make payment on the due date/s, the full balance of the outstanding amount becomes due and payable by the debtor to the creditor together with legal costs
(3.2) This acknowledgment constitutes the entire agreement and no variation in terms of this agreement, novation or cancellation shall be of any force or effect unless reduced to writing and signed by both the creditor and debtor.

| Markers in the form of first-element strings | | | | | | | |
|---|---|---|---|---|---|---|---|
| 1. | i) | I. | A) | a. | 一 | א | ) |

| Base markers | Markers consecutively congruent to base markers | | | |
|---|---|---|---|---|
| C) | D) | | | |
| vii. | viii. | viii | vii.(a) | |
| 1.1 | 1.1.1 | 1.1.i | 1.2 | 2 |
| .2.1 | .2.1.1 | .2.2 | .2.Z | .3 |
| 十五 | 十六 | 十大 | | |

| Marker Sequence | TNM | IMN | OSL | OCC | UC | UOC | WA |
|---|---|---|---|---|---|---|---|
| mS[0] | 3 | 0 | 192 | 0.093 | 0.344 | 0.032 | 0.029 |
| mS[1] | 3 | 0 | 173 | 0.084 | 0.162 | 0.014 | 0.012 |
| mS[2] | 10 | 10 | 159 | 0.077 | 0.583 | 0.045 | 1.041 |
| mS[3] | 2 | 2 | 38 | 0.019 | 1.000 | 0.019 | 0.217 |
| mS[4] | 3 | 3 | 197 | 0.096 | 0.690 | 0.067 | 0.360 |
| mS[5] | 4 | 0 | 60 | 0.029 | 0.900 | 0.026 | 0.024 |
| mS[6] | 10 | 10 | 706 | 0.343 | 0.449 | 0.154 | 1.139 |
| mS[7] | 2 | 0 | 30 | 0.015 | 1.000 | 0.015 | 0.013 |
| mS[8] | 3 | 0 | 44 | 0.022 | 0.636 | 0.014 | 0.012 |
| mS[9] | 5 | 5 | 500 | 0.243 | 0.643 | 0.156 | 0.641 |

METHOD, DEVICE, AND SYSTEM, FOR IDENTIFYING DATA ELEMENTS IN DATA STRUCTURES

CROSS-REFERENCE TO RELATED APPLICATIONS

This application is a continuation of co-pending U.S. non-provisional patent application Ser. No. 16/152,384, filed Oct. 4, 2018, entitled METHOD, DEVICE, AND SYSTEM, FOR IDENTIFYING DATA ELEMENTS IN DATA, which is a non-provisional of and claims benefit from U.S. provisional application Ser. No. 62/573,174, filed Oct. 17, 2017, entitled DEVICE, SYSTEM, AND METHOD FOR IDENTIFYING SECTIONS AND NUMBERED LISTS IN DOCUMENTS, the contents of both of which are incorporated herein by reference in their entirety.

TECHNICAL FIELD

Embodiments of the invention are directed to a system for creating an indexing framework of an input file, such as a document, or of an input string, and, more particularly, to a system or computer implemented method for identifying data element(s)/substructure(s) in a data structure, particularly section(s) and/or numbered list(s) in a document or input document string.

BACKGROUND

It has become common in present times to exchange several documents, especially legal documents, particularly contracts, in digital form in the course of commerce, legal counseling, valuation, and the like. Commonly, most such documents are long and difficult to visualize/be navigated, both to skilled and unskilled readers. In some cases these documents are available only in plain text, in other cases as web pages or Portable Document Format (PDF) documents. In cases of lengthy and/or highly structured documents (i.e., having many sections, subsections, etc.), a table of contents is sometimes added at the beginning of the document. Nevertheless this aid, although useful, is not always the best solution when accessing the document on a digital device, since tables of content are not necessarily easily accessible to the reader while scrolling down the document, and the entries in tables of content cases may be or not in the form of a link to the related content.

The ease of navigating legal documents cannot be easily improved by the parties involved, due primary to the necessity for the parties to maintain legally valid document formalities. Typically, e.g., the parties to a contract in principle need to (i) ensure that each section, sentence, and word in the contract has a sufficient level of readability, and (ii) keep a similar level of readability of the document whether it is consulted in electronic format or in hard copy.

This situation leaves a need for improved document navigability, particularly in digital form, under less formal circumstances. In order to implement techniques to improve the document navigability, it is useful to identify the structure of the documents having hierarchies of sections and subsections. Several known methods perform structure identification. These known methods, however, suffer from problems preventing their widespread use. For example, some document analyzers work only for documents with a pre-existing table of contents. Others perform analysis merely based on formatting and style, and therefore only work with a limited number of documents, thus escaping wide adoption. Yet others are limited to left-to-right languages, particular formatted documents, or are limited to alphabetic languages, only.

Embodiments described herein address these and other limitations of the prior art.

BRIEF SUMMARY OF THE INVENTION

Embodiments of the invention provide a method of identifying the structure of documents without necessarily having to rely upon information on the formatting, the styling, and the language of the document itself. Aspects of the invention provide a method to ease the reading of the documents, especially legal documents, by automatically identifying the sections, subsections and numbered lists within them.

Embodiments of the invention include a computer implemented method for identifying one or more data elements in an input data stream formed from an input data structure using processing enabled by a processor-executable instruction stored on a non-transitory computerized storage medium. This method includes identifying a marker sequence set in the input document string, the marker sequence set including a marker sequence; assigning an eligibility value to each marker sequence, the eligibility value being a number calculated using an eligibility calculation, to obtain at least one eligible marker sequence; generating output data comprising data related to the at least one eligible marker sequence; and providing the output data, such as on a human-readable interface. In some embodiments the one or more data elements include one or more selected from the group consisting of a section, a subsection, a numbered list, and an outline numbered list. In some embodiment, identifying a marker sequence set in the input document string comprises identifying a marker sequence set in the input document string without operator intervention. In some embodiments the data structure is a computer-readable text document.

In some embodiments identifying a marker sequence set includes storing one or more initial sequential marker(s) of the input document string in one or more first sequence array(s), where each stored initial sequential marker is in the form of first-element string; and storing one or more consecutive sequential marker(s) of the input document string in one or more second sequence array(s), wherein each stored consecutive sequential marker is consecutively congruent to at least one marker of the second sequence array(s).

In some embodiments the eligibility calculation uses data related to the sequential marker(s) of each marker sequence.

In some embodiments the eligibility calculation uses eligibility data of an eligibility data set, where the eligibility data set includes (a) a cardinality of a sequential marker set comprising each sequential marker, (b) a substring of a first sequential marker, (c) a string adjacent to a second sequential marker, (d) a sequential number of a third sequential marker, and (e) identification information in a wrapping string of a fourth sequential marker, of each of the marker sequences, and where the wrapping string is obtained from a first substring of the input document string.

In some embodiments the method may optionally include selecting one or more eligible marker sequences and verifying at least one of a list of eligibility conditions for each of the eligible marker sequences, where each eligibility condition of the list compares an eligibility value of the eligible marker sequence to a comparison value.

The method may also optionally include selecting one or more eligible marker sequence from the marker sequence set by verifying at least one of a list of eligibility conditions for each of the eligible marker sequences, where each eligibility condition of the list compares an eligibility value of the eligible marker sequence to a comparison value set, where the comparison value set comprises (i) a threshold value, (ii) a comparison marker value obtained from eligibility value(s) of marker sequence(s), (iii) an adaptive comparison value calculated using an adaptive threshold calculation based on the eligibility value(s), or (iv) two or more of any of these, wherein the output data comprises (i) an output string obtained from output marker caption(s) of first-output eligible sequential marker(s), (ii) output identification information of second-output eligible sequential marker(s) in an identification string obtained from a second substring of the input document string, (iii) a report value obtained from eligibility value(s) of third-output eligible sequential marker(s), or (iv) two or more of any of these.

Some embodiments of the invention may optionally include accepting an input document, performing a first pre-treatment process on the input document, and generating the input data stream from an output of the first pre-treatment process, and may further, optionally, include detecting if at least one removable string is present in the output of the first pre-treatment process, and removing the at least one removable string, where a removable string(s) comprises one or more selected from the group consisting of a page header, a page footer, and a footnote. In some embodiments the input document string is in HTML format.

In other aspects of embodiments, the operation of identifying a marker sequence set in the input document string comprises identifying an internal reference to a referred sequential marker in the input document string.

Embodiments may further include verifying parent sequential marker(s) of child sequential marker(s), from a set of parental conditions, where the set of parental conditions comprises one or more selected from the group consisting of a first parent sequential marker identifying a parent section of the input document string, a child sequential marker identifying a first subsection of the parent section, a second parent sequential marker identifying a parent subsection of the input document string, and a child sequential marker identifying a second subsection of the parent subsection.

Other embodiments may include combining a first eligible marker sequence with a second eligible marker sequence into a third eligible marker sequence, where the third eligible marker sequence comprises (a) one or more markers of the first eligible marker sequence, and (b) one or more markers of the second eligible marker sequence.

Embodiments of the invention may be used when the input document string includes text in two or more document languages.

Other embodiments of the invention described herein are an apparatus for determining document structure, including an input for accepting an input data structure; and one or more processors configured to: generate an input document string from the input data structure; identify a marker sequence set in the input document string, the marker sequence set including a marker sequence; assign an eligibility value to each marker sequence, the eligibility value being a number calculated using an eligibility calculation, to obtain at least one eligible marker sequence; generate output data comprising data related to the at least one eligible marker sequence; and provide the output data. The input data structure may be received through a network coupled to the apparatus and/or the output data may be provided through a network coupled to the apparatus.

BRIEF DESCRIPTION OF THE DRAWINGS

Aspects, features, and advantages of embodiments of the present disclosure are described in greater detail below in reference to the appended drawings in which:

FIG. 5 is a representation of a first sample document that may be processed using embodiments of the invention.

FIG. 6 is a representation of a second sample document that may be processed using embodiments of the invention.

FIG. 7 is a representation of a third sample document that may be processed using embodiments of the invention.

FIG. 8 is a representation of a fourth sample document that may be processed using embodiments of the invention.

FIG. 10 is a diagram illustrating example continuation steps 7 to 9 and the step 16 of the execution of the first implementation of identifying procedure that begins in FIG. 9.

FIG. 11 is a diagram illustrating alternative example steps 7-B, 13-B, 14-B and 16-B of an execution of the second implementation of identifying procedure illustrated in FIG. 4 to identify a marker sequence set in the input document string of the fourth sample document.

FIG. 12 is a representation of a result of the processing of the first sample input document string according to embodiments of the invention.

FIG. 14 is a representation of a fifth sample document that may be processed using embodiments of the invention.

FIG. 16 is a representation of a sixth sample document that may be processed using embodiments of the invention.

FIG. 17 is a representation of the result of an execution of the second implementation of the identifying procedure to identify a marker sequence set in the input document string of the sixth sample document according to embodiments of the invention.

FIG. 20 is a representation of a seventh sample document that may be processed using embodiments of the invention.

FIG. 22 illustrates a representation of markers of the first sample document processed by marker-lookup according to known methods of data element identification.

FIG. 23 illustrates another representation of markers of the first sample document processed by marker-lookup according to known methods of data element identification.

FIG. 25 illustrates an example representation of a best-fit marker sequence of the first sample document processed according to embodiments of the invention.

FIG. 28 is a table illustrating example markers in the form of first-element strings according to embodiments of the invention.

FIG. 29 is a table illustrating examples of consecutively congruent markers according to embodiments of the invention.

DETAILED DESCRIPTION OF THE INVENTION

Figure 1:
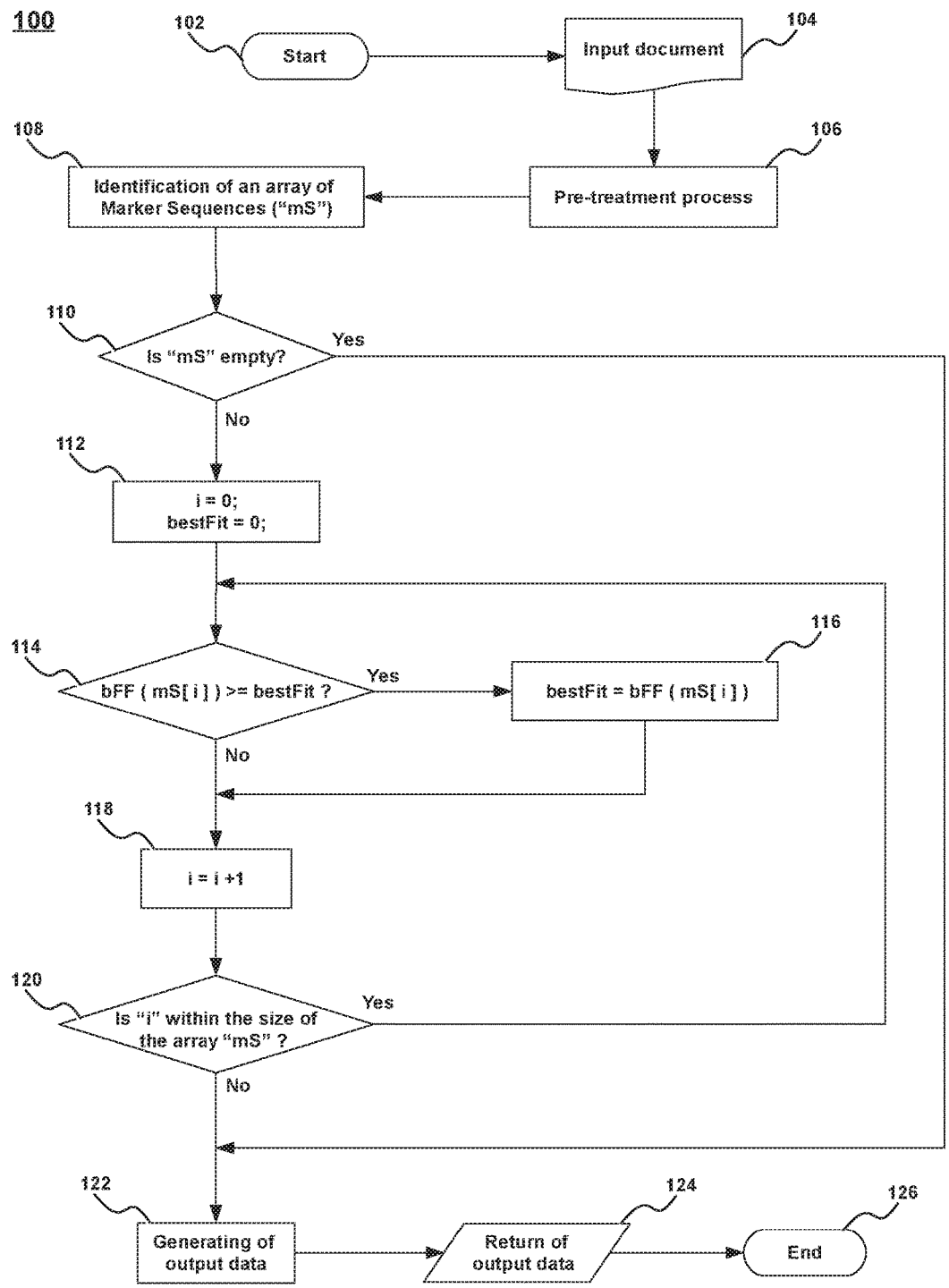
FIG. 1 is a flow chart illustrating example operations of a system for identifying data elements in data structures according to embodiments of the invention in which at most one eligible marker sequence is identified and returned.

Computer implemented methods according to embodiments of the invention can identify one or more data elements in a data structure as an input document string using processing enabled by a processor-executable instruction stored on a non-transitory computerized storage medium, the methods generally comprising: identifying a marker sequence set in the input document string, the marker sequence set comprising a marker sequence; assigning an eligibility value to each marker sequence, the eligibility value being a number calculated using an eligibility calculation to obtain at least one eligible marker sequence; generating output data comprising data related to the at least one eligible marker sequence; and providing the output data.

The unconventional combination of steps of such methods can provide certain technical advantages over methods to date, as described in details herein.

The following definitions provide context for the terms as used herein, and provide at least one definition thereof. In some instances and instantiations other definitions and other meanings are also possible. In other words, although at least one definition of certain terms is provided herein, some terms may be interpreted broadly or have multiple definitions.

"Coefficient" means a floating point number in the range of 0 and 1, e.g., a single precision floating point number as defined by IEEE Standard 754, preferably comprising 32 bits, although different bit-lengths are possible.

"String" means a finite sequence of bytes, where a byte is a group of binary digits, typically eight digits.

"Substring" (of a primary string) means a secondary string that is a portion of the primary string, the portion beginning from a begin-mark byte of the primary string and ending with an end-mark byte of the primary string. The definition of "substring" does not exclude the case where a substring is equal to its primary string.

"Superstring" (of a contained string) means a containing string of which the contained string is a substring. Similarly to the previous definition of "substring", the case where a superstring is equal to its contained string is not excluded by this definition.

"Character" means a sequence of one or more bytes representing a single graphic symbol or control code.

"Document" means any computer data that is intended to be used in either an electronic form or as printed output. By way of example, and not limitation, documents may include a file in PDF format, a file from a word processor program, an HTML web page, or a string in ASCII format.

"Identification information" (of a needle string in a haystack string) means computer based information suitable for identifying the needle string in the haystack string, wherein the needle string is a substring of the haystack string. A first example of identification information is the position of the needle string in the haystack string, i.e., the number of bytes of the haystack string that precedes the first byte of the needle string. A second example of identification information is a start HTML tag inserted in the haystack string at the beginning of the needle string, followed by an end HTML tag inserted in the haystack string at the end of the needle string.

"End of line", "EOL", and "[EOL]" mean a constant string to which the function of ending the line is pre-assigned. Solely for explanatory purposes rather than limitation, the end-of-line string is herein assumed to be of a single character.

"Outline numbered list" means a nested structure of simple numbered lists. An example of an outline numbered list is as follows: "1) first item; 1.1) first sub-item; 1.2) second sub-item; 2) second item.".

"Section hierarchy" and "hierarchy" mean an arranged set of at least one section of the input document string, wherein each section of the at least one section is (i) a sibling of the sections of the at least one section excluding itself (where the sections exist); and (ii-a) a childless element, or (ii-b) a root element of a tree structure comprising at least one subsection of the input document string.

"Sequential marker" and "marker" mean a substring of an input document string, the substring being a candidate to identify (i) a section, (ii) a subsection, (iii) an item of a simple numbered list, (iv) an item of an outline numbered list, and (v) any other element in the input document string that is useful for processing input document strings according to embodiments of the invention.

"Marker content" (of a marker) means the content of the marker string. For example, a certain marker, which has "2.1" as marker content, is a substring located at a certain position of the input document string, and that substring "2.1" is candidate to identify (i) a subsection, (ii) a sub-item of an outline numbered list of the input document string, and (iii) any other element in the input document string that is useful for processing input document strings according to embodiments of the invention.

"Marker caption" (of a marker) means a substring of the input document string, the substring being a superstring of the marker.

"Trimmed marker" (of a marker) means a substring of the marker content of the sequential marker, wherein (i) the first character of the substring is the first sequenced character (e.g., the decimal numbers and the alphabetical letters) of the marker content, and (ii) the last character of the substring is the last sequenced character of the marker content. For example, the trimmed marker of "2.1.2)" is "2.1.2" and the trimmed marker of "(a)" is "a".

"Marker enclosure" (of a marker) means a string obtained by removing the trimmed marker of the marker from its marker content. For example, the marker enclosure of "2.1" is an empty string, the marker enclosure of "3." is a dot ".", and the marker enclosure of "(a)" is an open parenthesis followed by a close parenthesis "( )".

"Marker in the form of first-element string" means a marker whose marker content is in a form commonly utilized to represent the first elements of the sequences in the documents. In the table illustrated in FIG. 28, some examples of markers in the form of first-element strings are listed solely for explanatory purposes rather than limitation, e.g., the number "1" is depicted (1) in Chinese and Japanese language in the table at 2802, (2) in Hebrew language at 2804, and (3) in Arabic language at 2806.

"A marker K is consecutively congruent to a marker H" means that (a) the trimmed marker of the marker "H" is a candidate to be a certain element of a general sequence, and (b) the trimmed marker of the marker "K" is a candidate to be the element immediately subsequent to the certain element of the general sequence. Examples of general sequences include (i) an ordered sequence, and (ii) a hierarchical outline sequence. Furthermore, examples of markers consecutively congruent to a list of base markers are shown in the table of FIG. 29. To overcome possible OCR import errors, certain couples of characters are considered interchangeable in determining the consecutive congruence. Examples of interchangeable characters in the examples of markers of FIG. 29 are the couples of characters ["1", "i" ], ["2"; "Z" ], and [element 2902; element 2904].

"Marker sequence" means a sequence of at least one marker of the input document string, the sequence having the two distinctive properties: (1) the first marker of the sequence is in the form of first-element string; and (2) given an "i-th" marker (in which "i" is a non-negative integer number), the immediate subsequent "(i+1)-th" marker (where it exists) is consecutively congruent to the "i-th" marker.

"Eligible marker sequence" means a marker sequence that is automatically selected as a sequence identifying (i) a hierarchy, (ii) a simple numbered list, and/or (iii) an outline numbered list in the input document string.

"Eligible sequential marker" and "eligible marker" mean a marker of an eligible marker sequence.

"An eligible marker Q is the closest subsequent eligible marker of an eligible marker P" means that (i) the position of the eligible marker Q in the input document string is subsequent to the position of the eligible marker P, and (ii) no eligible marker is positioned between the eligible marker P and the eligible marker Q, in the input document string.

"Document error" means a mistake in the input document string due, for example, to (1) an OCR error occurring in a process of converting a document into the input document string, and/or (2) a typographical error by the writer of the document from which the input document string is obtained.

Methods according to embodiments of the invention may ease the reading of documents, especially legal documents, by automatically identifying section(s), subsection(s), and/or numbered list(s) in such documents, and using the identified document components to build a framework to be used for document interaction. Using approaches as claimed, the reader of a document, such as a contract, is aided by a computer application in reading one or more documents without having to adhere to structural formalities constraining legal texts, e.g., validity issues.

Computer applications according to embodiments of the invention can offer the reader a set of functionalities including displaying each section and subsection of the input document in a collapsed form, switchable to an expanded form as controlled by the reader. In the collapsed form, only the sequential marker and the heading of each section, or some convenient abbreviated format, may be shown. In the expanded form, the body and the related subsections, e.g., in a hierarchical relationship and/or legalistic form, may also be displayed.

Computer applications according to embodiments of the invention may alternatively or further allow the reader to easily navigate the internal reference(s) to the sequential marker by rendering them as links. After that, the reader may perform an action on one of the links to show the referenced section or subsection of the document.

Computer applications according to embodiments of the invention may alternatively or further ease reading of numbered lists, for example by displaying the list below "according to the conditions a) condition one, b) condition two, and c) condition three", e.g., in the following extended form:

"according to the conditions
   a) condition one,
   b) condition two, and
   c) condition three".

In a computer application implementation, some of the functionalities of a computer application according to embodiments of the invention may allow a user of the application to provide, as input document, (1) a text string that the user can, for example, (1a) type in an appropriate entry field of the application, and/or (1b) copy and then paste from a source in the user's local computer; and/or (2) an input file selected from a list of candidate files.

The herein described methods may be, in whole or in part, implemented in a web service. For example, the functionalities of the web service may allow a consumer of the service to upload to a server an input document and then to receive a set of data available to be displayed in a web interface that is implemented in a web application.

In a file-processing web-service implementation, some of the functionalities of the web service allow a consumer of the service to upload an input document to a server and then to receive from the server a new version of the input document that includes a table of contents. The advantages of the file-processing implementation compared to the ones providing a computer application are that they allow the reader to be free to use or not use a computer application each time that the reader needs to consult the document, since the new version of the document is available to be handled as a common file. The internal references in the table of content may be available as (a) links to the section, when the document is displayed in a digital device; or (b) page numbers, when the document is printed, for example.

One potential disadvantage of the file-processing implementation is that a table of contents may have a limited effectiveness in terms of ease of navigation of the document, taking into account that the table of contents is usually not visible while the body of the document is scrolled down. A split-screen option may vitiate some of these downsides, however.

In an address-processing implementation, some of the functionalities of a web service according to embodiments of the invention allow a consumer of the web service to transmit to a server the web address of an input document—which can be, for example, in the form of an HTML web page—and then to receive a set of data available to be displayed in a web interface that is implemented in a web application.

In a document-selection implementation, some of the functionalities of a web service according to embodiments of the invention allow a consumer of the web service to select an input document, for example, from a list of input documents, and then to receive a set of data—in whole or in part related to the selected input document—which are available to be displayed in a web interface that is implemented in a web application.

Methods according to embodiments of the invention may be, in whole or in part, implemented in an extension, an add-on, a plug-in, and/or another component installed in third-party applications—for example, in viewing applications (e.g., PDF viewers) and/or in editing applications (e.g., word processors). For example, the user of a word processor program may utilize the functionalities of a program add-on implementing the herein described methods to facilitate the navigation of the document while editing the same document. In a further example, the user of a PDF viewer application may utilize an application extension implementing embodiments of the invention to facilitate the reading of a document while using a PDF viewer application.

Aspects of the invention take into consideration that section(s) and/or subsection(s) of most sectioned documents—especially legal documents—are marked by sequential markers. Certain conventions for arranging the sequential markers in sectioned documents are standard all over the world, usually in the interest of clarity and consistency, irrespective of the language in which the documents are written, and even in presence of bilingual and multilingual documents.

Therefore, focusing on sequential markers, methods according to embodiments of the invention may be applied to any document containing sections identified by the markers, with no operator intervention, i.e., automatically, and with no need to adapt to specific language(s) and/or culture(s). For example, embodiments of the invention are readily extensible to (1) documents in Chinese Mandarin language in which the sections/subsections follow a decimal numeration system with no need of adaptations; and (2) documents in Chinese Mandarin language in which the sections/subsections follow a Chinese numeration system, provided that those embodiments support the Chinese numeration system by including Chinese-numeral data types, operators, functions and/or other instructions/structures. In a further example, embodiments of the invention are readily extensible to documents in Chinese Mandarin language in which (a) the sections/subsections follow a Chinese numeration system, and (b) document error(s) may or may not affect the markers of the documents, provided that those embodiments (i) support the Chinese numeration system, and (ii) include table(s) of predefined markers consecutively congruent that support the Chinese Mandarin language—e.g., the markers shown in the row at the bottom of the table in FIG. 29.

Aspects of the invention may improve the (correct) interpretation of sections in a document compared to known methods and algorithms. Methods according to embodiments of the invention may gain efficiency by, in a first phase, selecting all possible marker sequences and then evaluating each marker sequence globally (e.g., in the document in question), using an optimizable eligibility calculation so as to adhere as closely as possible, when desired, to the above-mentioned standard conventions for the sequential markers.

Aspects of the invention may allow automatic identification of one or more section hierarchies and distinguish them from the numbered lists of the document and/or classify the relevance of hierarchies in the document, e.g., by identifying the main hierarchy.

Relative to methods of the art, embodiments of the invention may also work correctly for one or more sequential markers not positioned at the beginning of a line, due, for example, to a document error or to a specific layout of the document.

Inventive methods as described herein may correctly identify one or more marker sequences without reliance on keyword(s) and character set adaptations in specific languages. For example, the numbers in the strings "Section 3", "Articulo IX", "Appendice 17" and the strings in the tables of FIG. 28 and FIG. 29 are correctly interpreted as markers. Such independence gives embodiments of the invention several advantages compared to known methods. Such embodiments may be compatible with all languages, provided that the above-mentioned standard conventions and well-known systems of numeration, lettering, etc. are followed. This means that, in principle, inventive methods are not constrained to a restricted list of supported languages.

Unlike the invention, known methods that are language-dependent usually require populating and maintaining a list of all the possible keywords in supported language(s). The ability of embodiments of the invention to avoid such lists/libraries allows easier implementation than these known methods. Methods according to embodiments of the invention may also be more robust to document errors compared to known methods, since embodiments of the invention can correctly interpret document strings in which certain document errors occur in the vicinity of the markers and within the markers themselves. Possible false interpretations incurred by known methods, for example, due to pre-existence of a table of contents in the input document, or due to the presence of numbered footnotes, may be bypassed using embodiments of the invention.

The efficiency and generality of the methods described herein lies in the wide range of possibilities to implement the eligibility calculation to (a) correctly interpret the greatest possible number of documents, and (b) support various options of identification of sections, subsections, and numbered lists in a document.

In general, embodiments of the invention ingest an input document, such as a PDF file or HTML web page, and build one or more marker sequence(s) based on markers or other indicators within the document. Markers or the other indicators may indicate the beginning of a section, subsection, item of a numbered list, or any other element. Embodiments of the invention may generate a single marker sequence or multiple marker sequences, depending on the implementation, as described below.

A first scenario, hereinafter "single result category", includes implementations returning at most one eligible marker sequence, renaming it in this case to "best-fit marker sequence". Such implementations may aid identification of a main hierarchy (hereinafter "master hierarchy") of sections and subsections in a sectioned document. This master hierarchy may correspond, for example, to the hierarchy of conditions of a contract.

A second scenario, hereinafter "multiple result category", includes implementations returning multiple eligible marker sequences. These implementations can be utilized to identify sections and subsections belonging to more than one hierarchy. Furthermore, a best-fit marker sequence, as well as a related master hierarchy, can be identified among the eligible marker sequences returned, analogously to the results of the single result category implementations.

Although numerous variations of the inventive methods are possible, the following general assumptions for both the single and multiple marker sequence implementation are made for the examples described hereinafter solely for elucidative purposes and not to limit the scope of the invention: (1) the input document can have several sources, e.g., an OCR process, a word processor program, or a web address; (2) the input document can be in several formats, e.g., PDF, HTML, txt, doc, and/or odt; (3) if the format is HTML or txt, the input document may be stored directly in the input document string, otherwise if the format is different from HTML and txt, the input document may be automatically converted into a HTML or txt string and then stored in the input document string; (4) generally, eligible sequential markers identified in the document string correspond to (a) a section and/or an item of a simple numbered list, if the marker is in a basic form, e.g., "(D)", "3", or "iii."); and (b) a subsection and/or a sub-item of an outline numbered list, if the marker is in a form of an outline numbered list item (for example, "1.1.2" and "iv. 1)"); (5) in certain cases of input documents—described in details hereinafter—, eligible sequential markers in the basic form described in prior point (4) correspond to subsections that follow a consecutive numeration across the section markers, as illustrated for example in the extract of document in FIG. 27; (6) a number of optional properties can be present or not in each section/subsection of the document string including (a) a heading, which is a short description of each section/subsection identified by each sequential marker, immediately following the sequential marker in the document string; (b) a body, which is the full content of each section/subsection, immediately following one of (b-1) the heading (where it exists), and (b-2) the sequential marker (if the heading is missing); and (c) one or more subsections of each section/subsection, which are hierarchically arranged as children of the section/subsection—the body (b) may be missing partially or entirely, for example, in case that a section is entirely made up of subsections—; (7) implementations of the eligibility calculation may be built as a function (hereinafter "eligibility function") returning the eligibility value of a marker sequence, wherein the eligibility value is assumed to be a number of type floating point and strictly positive; and (8) the programming language used in inventive methods may be, for example, Javascript, which is used for exemplary purposes in this disclosure.

Examples of alternative structures of the output data generated by these methods, described hereinafter solely for elucidative purposes, include: (1) section/subsection data structure(s) (hereinafter "SSDS"), wherein each SSDS is related to (i) a section of the document, or (ii) a subsection of one of a parent section and a parent subsection of the document; (2) linear data structure(s)—i.e., ordered array(s)—of SSDS(s); (3) tree data structure(s) of SSDS(s) (hereinafter "TSDS"); and/or (4) one or more HTML output string(s) that include one or more part(s) of the input document string, where (4-a) section(s), (4-b) subsection(s), and/or (4-c) markers, are identified by identification information of HTML tag(s) in the HTML output string(s).

Example 1

The first example illustrating embodiments of the invention utilizes an eligibility calculation belonging to the single result category. In addition to the general assumptions set forth above, this implementation: (1) renames the eligibility function to "best-fit function" and renames the eligibility value to "best-fit value"; (2) begins each section and subsection of the best-fit marker sequence from the corresponding eligible marker, and ends each section and subsection (a) at the end of the document string, if the eligible marker is the last in the best-fit marker sequence, and (b) one character before the closest subsequent eligible marker of the eligible marker, otherwise.

The condition (2)(a) of the paragraph immediately above does not necessarily correctly identify the end of the last section with the end of the document string, if the last section of a document ends before the end of the document and a further final section—with no sequential marker at the beginning—concludes the document. That is, some documents have the structure:

Header 1
<body of Header 1>
Header 2
<body of Header 2>
Header 3
<body of Header 3>
<closing text of the document>.

In such a structure, it is difficult to identify where <body of Header 3> ends and where <closing text of the document> begins. It is also possible to correct this structure discrepancy by automatically identifying the end of the last section in cases in which the end of the last section having a header does not coincide with the end of the document.

The flow chart depicted in the FIG. 1, described below, represents a flow 100 of the first implementation. The flow 100 starts in block 102, and the input document is acquired in block 104. For example, a user may select the input document from a set of documents. A pre-treatment process, implemented in block 106, performs a format conversion of the input document to HTML if the format is different from HTML or txt. The output of block 106 is referred to as an input document string. Block 108, which is described in detail below with reference to FIG. 3, identifies the marker sequences of the marker sequence set and then stores them in an array "mS" through the execution of a first implementation of identifying procedure (hereinafter "first identifying procedure"). Relevant aspects of the first identifying procedure 108 include: (1) sequential markers found in the document string are all collected in "mS"—meaning that, in this phase, eligible sequential markers are not yet discriminated from others markers that meet the requirements to be part of a marker sequence; (2) sequential markers are grouped in marker sequences only using the criterion of the consecutive congruence as defined herein under "marker sequence", disregarding other criteria such as, for example, the similarity of the marker sequences; and (3) each sequential marker may be grouped into more than one marker sequence.

The array "mS", i.e., the output of the block 108, is structured as an ordered array of full-marker data structures, each of which is related to a marker sequence of the marker sequence set and includes (1) the marker content, and (2) the identification information in the document string—herein implemented as the position of the marker in the document string—of each sequential markers of the marker sequence. The following is an example of value of "mS" in JavaScript Object Notation (JSON):

```
[
    {
        marker: "1",
        position: "123"
    },
    {
        marker: "1.1",
        position: "456"
    },
    {
        marker: "2",
        position: "789"
    }
]
```

Hereinafter, markers are in some cases referred to by their marker contents for simplicity of exposition. For example, the first marker of the example of "mS" value in the immediately prior paragraph may be referred to by its marker content "1"—i.e., either as marker "1" or as "1".

Solely for simplicity of exposition rather than limitation, in the working examples and in the Figures of the present disclosure the array "mS" is assumed to be structured in a simplified form of an ordered array of sequence arrays, wherein each of the sequence arrays: (1) is related to a marker sequence of the marker sequence set; and (2) is an ordered array of the marker contents of the markers in the marker sequence.

The following is an example of value of "mS" in the simplified form and in JSON notation:

```
[
    [
        "1",
        "1.1",
        "1.2",
        "2",
        "3"
    ],
    [
        "i)",
        "ii)",
        "iii)"
    ]
]
```

Figure 3:
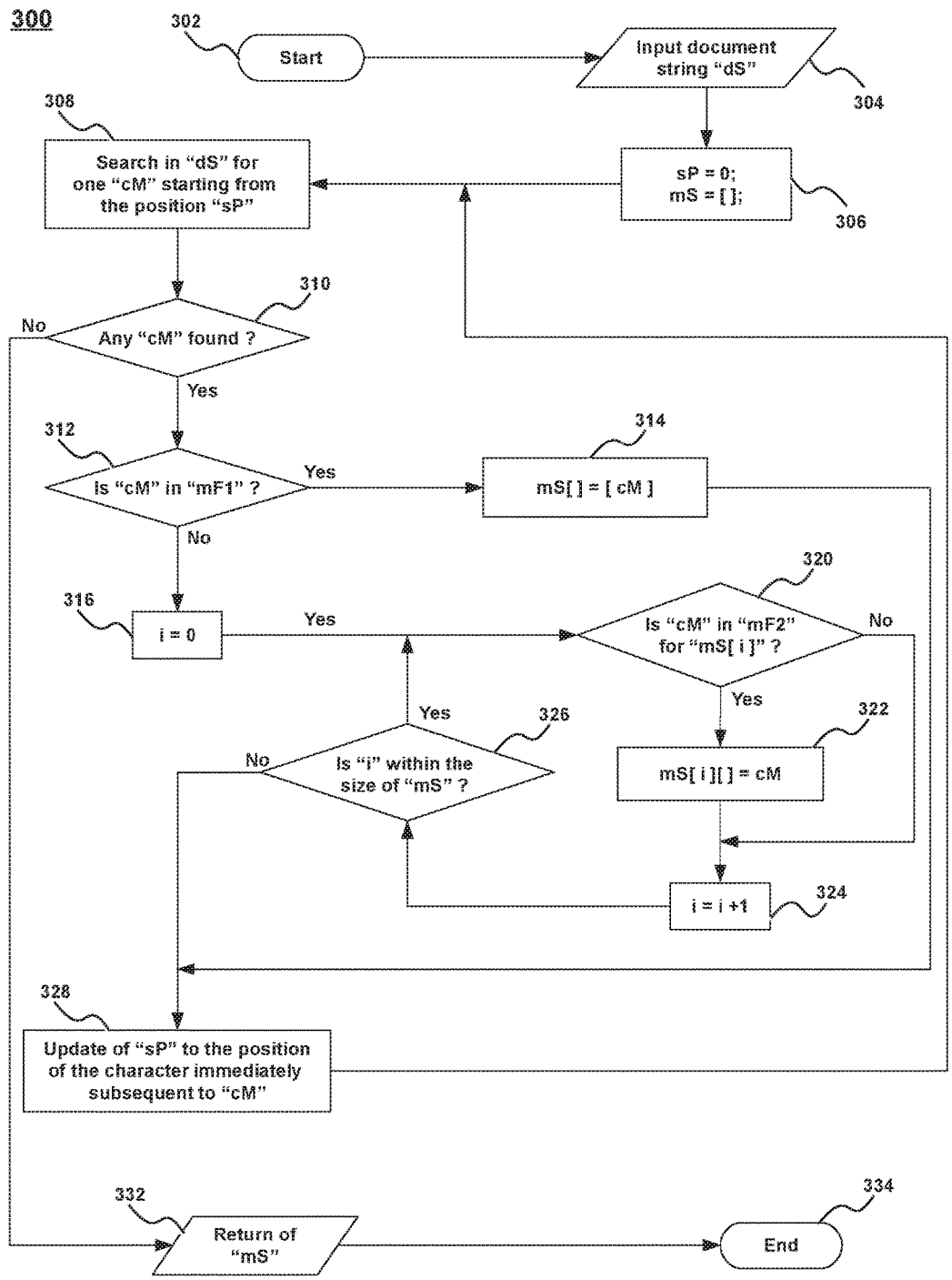
FIG. 3 is a flow chart illustrating example operations of a first implementation of an identifying procedure for identifying an array of marker sequences according to embodiments of the invention.

A first example of the first identifying procedure is depicted in the flow chart of FIG. 3, which illustrates example operations in a flow 300. In this first identifying procedure, in summary, the output string of block 106 of FIG. 1 is automatically scanned from the beginning by a string pointer, which searches for sequential markers in the form of one of the following (hereinafter "marker forms"): (first) a first-element string; and (second) a marker consecutively congruent to at least one last element of a sequence array of "mS". The condition of a marker consecutively congruent to the last element of a sequence array "mS[x]" may be hereinafter referred to as a "marker consecutive to mS[x]", wherein "x" is a non-negative integer number.

The flow 300 starts in block 302 of FIG. 3, and the output string of block 106 of FIG. 1 is assigned to the variable "dS" in block 304. In block 306, (i) the position "sP" of the string pointer is initialized to the value zero (0), so that it points to the beginning of "dS"; and (ii) the array "mS" is initialized to an empty array.

The control of flow 300 then passes to block 308, in which, if "sP" is not equal to a conventional value that represents the end of the string "dS" (hereinafter "End Of String"), one candidate marker—of which some examples are given below—is searched in "dS" starting from the position "sP". Examples of candidate markers include numbers (i.e., decimal numbers, roman numerals, and numbers in non-alphabetic character sets), and numbers and letters immediately followed by a punctuation character (e.g., the dot ".", the closed parenthesis ")", or the dash "-"). If a candidate marker is found, then the candidate marker is assigned to the variable "cM".

For example, the search in the string "dS" that is performed in block 308 may be implemented using regular expression match techniques. The following pattern "cMRX" is an example of regular expression pattern—in Javascript language—which can be utilized to select the first word occurrence of "dS" that is in the form of (1) a decimal number and, optionally, a close parenthesis ")" or a dot "." immediately subsequent to the decimal number; or (2) a letter immediately followed by a close parenthesis or a dot.

cMRX=/\b(([0-9]+[).]?|[a-zA-Z][).])b/

In the pattern "cMRX", (1) the strings "b" denote the word boundaries and they are utilized to restrict the selection to the whole words only; (2) "[0-9]+" selects an integer positive number; (3) "[).]?" selects an optional (i) close parenthesis or (ii) dot; (4) "|" is the alternation—i.e., "OR"—operator; (5) "[a-zA-Z]" selects an alphabetic single letter either lowercase or uppercase; and (6) "[).]" selects a mandatory (i) close parenthesis or (ii) dot. It is noted that, solely for clarity of reading, a number of spaces " " not functional to the selection of candidate markers are inserted in the pattern "cMRX". If the value of the string pointer "sP" is greater than zero, the pattern "cMRX" can be, for example, utilized to search the first candidate marker in a substring of the document string "dS" that begins at the position "sP" and ends at the end of "dS".

After block 308, the control of flow 300 passes to block 310, which is based on the result of the search in 308. Block 310 checks for the presence of "cM". If no candidate marker is found in block 308, the control of flow 300 passes to block 332, in which the array "mS" is returned, and finally the flow ends in block 334. Otherwise, if a candidate marker is found, the control of flow passes to block 312, which tests whether "cM" is in the first marker form—i.e., if its marker content is in the form of a first-element string. To perform such testing, the marker content can be, for example, tested against a table of predefined first-element strings such as depicted in the table shown in FIG. 28. Of course, the table shown in FIG. 28 includes only a few predefined first element strings that may be used in embodiments of the invention, and are show for explanatory purposes only.

If "cM" is in the first marker form (referred to as "mF1" in FIG. 3), the control of flow 300 passes to block 314, in which a sequence array—which at this stage has "cM" as a single element—is appended to the array "mS". After block 314, the control of flow 300 passes to block 328.

In block 328, the value of the position "sP" of the string pointer is updated to the value of the position of the character immediately subsequent to "cM"—if such character exists—, so that if a subsequent candidate marker of "dS" is in a position immediately subsequent to "cM", the subsequent candidate marker is found in block 308 in the next main loop of the flow 300. If a character immediately subsequent to "cM" does not exist—i.e., "cM" is at the end of "dS"—, then "sP" is updated to the value "End Of String". After block 328, the main loop is closed and the control of flow passes back to block 308.

If the test of block 312 has a negative result, the control of flow 300 passes to block 316, in which an index "i"—iterating over the elements of "mS" in a subsequent first search form loop—is initialized to the value of zero (0). Blocks 320, 322, 324, and 326 make up the first search form loop, whose operation is (1) detecting the markers in the second marker form, and (2) appending those detected markers to "mS".

Namely, block 320 detects whether "cM" is in the second marker form (referred to as "mF2" in FIG. 3) for the sequence array "mS[i]", which is the sequence array of "mS" indicated by the current value of the index "i" in the first search form loop. In other words, block 320 detects if candidate marker "cM" is consecutively congruent to "mS[i]".

For example, assuming that (i) "i" is equal to zero (0), (ii) "mS[0]"=["1", "2", "2.1" ], and (iii) the candidate marker ("cM") "2.2" is found in block 308, then block 320 will determine that "2.2" is consecutively congruent to "mS[0]".

If the result of the test in block 320 is positive, such as in the immediately preceding paragraph, the control of flow 300 passes to block 322, in which "cM" is appended to the sequence array "mS[i]", and subsequently the flow 300 passes to block 324, in which the value of the iterating index "i" is increased by 1. Following the example given above, in block 322 "2.2" is appended to "mS[0]", whose content—after the flow passes to the subsequent block 324 in this example—is then ["1", "2", "2.1", "2.2" ].

If instead the result of the test in block 320 is negative, the control of flow 300 passes directly to block 324, which increments the iterating index "i". Block 326 is thus the closing-loop block for the first search form loop. Block 326 determines whether the current value of the index "i" is still pointing to an element of the array "mS". If "mS[i]" exists, the control of flow 300 loops back to block 320 and the first search form loop proceeds with the element "mS[i]". Otherwise, if the index "i" exceeds the end of the array "mS", the first search form loop ends and the control of flow passes on to block 328.

In summary, the first search form loop scans the sequence array of "mS" in search of one or more second-marker-form sequence array(s) for which the candidate marker "cM" is in the second marker form. Each time that a second-marker-form sequence array is found, "cM" is appended to said second-marker-form sequence array.

A practical example of use of the first identifying procedure that has been described with reference to FIGS. 1 and 3 is set forth in the first fact pattern used to illustrate Example 1 below.

Returning back to block 110 of FIG. 1, if no marker sequence is found after performing the operations of block 108, the control of flow 100 passes to the immediately subsequent block 122, in which a suitable information message is generated and then returned (in block 124), and finally the flow ends in block 126.

Otherwise, a best-fit marker sequence search loop is initialized in block 112, specifically in the form of two variables, "i" and "bestFit", wherein "i" is an index iterating over the elements of "mS", and "bestFit" contains the partial greater best-fit value found during the execution of the loop. The variable "bestFit" is initialized to the value "0" in block 112 to be congruent with the assumption of strict positiveness for the eligibility value.

In block 114, the best-fit function "bFF" takes as the argument the sequence array of the marker sequence of the array "mS", as indicated by the current value of the index "i" in the loop ("mS[i]"), and returns the best-fit value of the marker sequence. The function "bFF" is implemented so that a better fit of the marker sequence to be a best-fit marker sequence corresponds to a greater best-fit value returned.

The main operation of block 114 involves detecting if the best-fit value of "mS[i]" is greater than or equal to the current value of "bestFit". If the best-fit value of "mS[i]" is indeed greater than or equal to "bestFit", i.e., a marker sequence with a best-fit value at least equal to the partial best-fit value has just been found, the control of flow 100 passes to block 116.

In block 116, "bestFit" is updated with the best-fit value of "mS[i]". In other words, the marker sequence related to the currently iterating-over "mS[i]" becomes the candidate to be the best-fit marker sequence. In block 116, a further variable "iBest", omitted for brevity from the representation in FIG. 1, is also updated to the current value of "i" in the loop, to store in memory the index of the candidate marker sequence with the best "bestFit" value found up to this step. After block 116, the control of flow 100 passes to block 118, in which the value of the iterating index "i" is increased by 1.

If, in block 114, the best-fit value of "mS[i]" is detected to be less than "bestFit", the control of flow 100 passes directly to block 118 without updating the variable "bestFit".

Block 120 is the closing-loop block, which determines whether the current value of the index "i" is still pointing to an element of the array "mS". That is, block 120 represents an analysis for whether the element "mS[i]" exists. In the case "mS[i]" exists, the control of flow 100 loops back to block 114 and the loop proceeds with the element "mS[i]".

Otherwise, if the index "i" exceeds the end of the array, the loop ends and the control of flow 100 passes on to block 122.

Thus, at the end of the execution of the branch of the flow 100 starting from block 112 and ending with block 120, exactly one best-fit marker sequence is found and its structure is stored in the variable "bFMS" with the assignment bFMS=mS[iBest].

This assignment is also omitted in the FIG. 1 for brevity. When a best-fit marker sequence found, the output data generated in the block 122 includes information on the best-fit marker sequence.

For each sequential marker of the best-fit marker sequence, the output data includes a SSDS. Each SSDS (1) includes the sequential marker; and (2) may include one or more of the following optional properties: (2-a) the heading, (2-b) the body, and (2-c) the subsections of the section/subsection identified by the sequential marker.

In this Example 1 as well as in other Examples described below, the SSDS(s) are structured in TSDS(s) solely for simplicity of exposition.

A number of structure-detecting techniques may be used in block 122 to detect the structure of sections and subsections in each marker sequence and generate the TSDS(s). These structure-detecting techniques are based on the fact that the markers of the marker sequences are already in a tree ordering, due the modus operandi of the first identifying procedure described with reference to FIG. 3. As described above, the first identifying procedure generates the marker sequences on the basis of the consecutive congruence criterion, and this criterion implies that, given (i) a marker X of a marker sequence S, and (ii) a marker Y immediately subsequent to X in S, it turns out that Y identifies a section/subsection in accordance with one of the following 3 congruence cases: (1) Y identifies the section/subsection immediately subsequent to the section/subsection identified by X; (2) Y identifies the subsection that is the first child of the section/subsection identified by X; or (3) Y identifies a section/subsection that is immediately subsequent to an ancestor section/subsection of the section/subsection identified by X.

To explain by an example the congruence cases listed in the immediately preceding paragraph, an example of subsection "1.1.1" identified by X is described below. According to the three congruence cases of the immediately preceding paragraph, the marker Y immediately subsequent to X may identify (1) the subsequent subsection "1.1.2", (2) the first-child subsection "1.1.1.1", or (3) a section/subsection immediately subsequent to an ancestor section/subsection of "1.1.1", i.e. "1.2" or "2".

Since the markers are in the tree ordering, a structure-detecting technique is implemented in embodiments of the invention. The structure-detecting technique may include, for example, (1) scanning each marker Y subsequent to X, and (2) detecting the relationship between X and Y through a congruence function described below. The TSDS is generated according to the result of the congruence function.

The dot-notation commonly adopted to identify the nested subsections of a document (and, more generally, for the outline numbered lists) can be used in embodiments of the invention for implementing the congruence function. For example, in certain document languages, the boundaries between the numbers are formed by the string dot (".", hereinafter referred to as "dot"), thus an example of congruence function recognizes the marker "2.1" (identifying the subsection "2.1" of a document) as children marker of a parent marker "2" (identifying the section "2" of a document) by subdividing the marker content of the children marker by the delimiter dot.

Following the flow 100 of FIG. 1, the output data is returned in the block 124, after which the flow 100 ends in the block 126.

First Fact Pattern Used to Illustrate Example 1

The following description steps through operations carried out by an embodiment of the invention according to Example 1 described above. This fact pattern uses the first sample document as the input document, which is illustrated in FIG. 5. It also assumes that the first sample document is also the input document string—i.e., the output of block 106 of FIG. 1—solely for simplicity of exposition. In other words, in this fact pattern, no changes were made to the first sample document in the pre-treatment process block 106.

In this fact pattern description, relevant aspects of the document depicted in FIG. 5, are as follows: (1) the end of lines (EOL) are explicitly displayed as elements analogous to 502; (2) a number of document errors are present in the document, as described below, to simulate some borderline cases in which it is harder to correctly identify the section and subsections markers; and (3) the page numbers in footers of the document are present in the document string—i.e., the elements 504 and 506 in FIG. 5—to further increase the difficulty to identify the correct markers, although, in alternative implementations, the page numbers could be removed from the document string in the pre-treatment process of block 106.

The expected result of this fact pattern description illustrating embodiments of the invention according to Example 1 is the generating of a correct TSDS without incurring misinterpretations due to the document errors, the presence of page numbers, and other digits placed in certain critical positions of the document. As described above with reference to operations of blocks 112-116—related to the eligibility calculation implementation—the best-fit function "bFF" is implemented as a function that (1) takes as argument the element "currentPMS" of "mS", and (2) returns the total number of elements in "currentPMS". An example of Javascript code implementing function "bFF" is

```
function bFF ( currentPMS ) {
    return currentPMS.length;
}
```

Given the above definition of "bFF", embodiments according to this Example 1 return, as the best-fit marker sequence, the marker sequence having the greatest number of sequential markers. If two or more marker sequences have the same number of sequential markers, the last marker sequence found is returned. That is, the marker sequence related to the sequence array having the greatest order number, due to the comparison operator ">=" in the condition of block 114 of the flow 100 depicted in FIG. 1.

Figure 9:
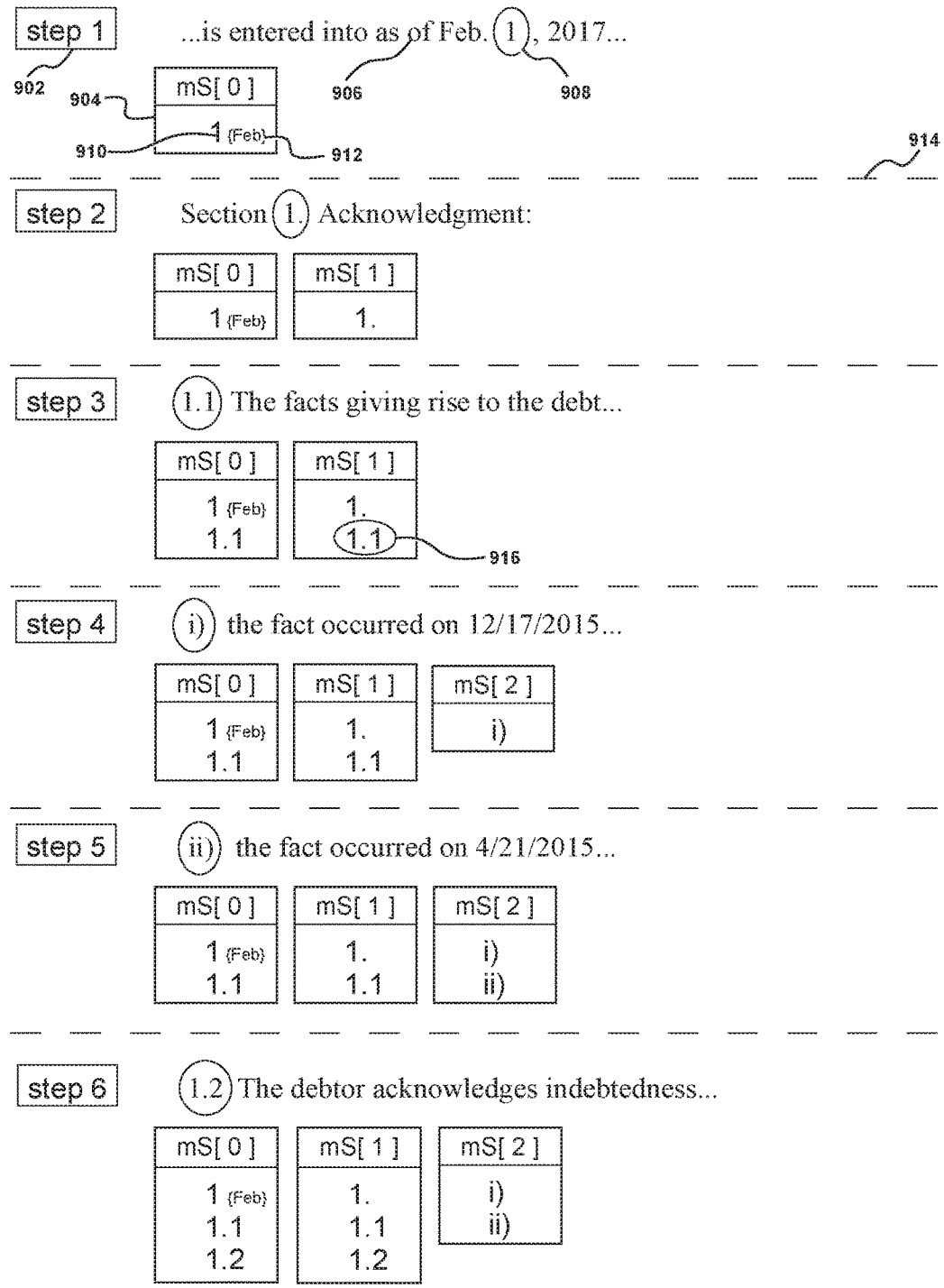
FIG. 9 is a diagram illustrating example steps 1 to 6 of an execution of the first implementation of identifying procedure illustrated in FIG. 3 to identify a marker sequence set in the input document string of the first sample document.

Some relevant steps of the first identifying procedure are shown in FIG. 9 (steps from "1" to "6") and in FIG. 10 (steps "7", "8", "9", and the last step "16").

Each step shown in the FIGS. 9 and 10 is marked by a label similar to element 902 of FIG. 9, and delineated by a dashed line, i.e., element 914. At each step, a sequential marker matching one of the marker forms is found by the first identifying procedure: in FIGS. 9 and 10 the text surrounding the marker found is shown at the right of each step label, i.e., element 906, and the marker itself is highlighted from the text with a rounded border, i.e., element 908.

At each step, one of the following identifying-procedure operations is performed: (1) if the marker found is in the form of a first-element string, a last-generated sequence array (e.g., the element 904), which has the marker content of the marker found as unique element, is appended to "mS"; or (2) if the marker found is consecutive to a matching set of sequence arrays of "mS", the marker content of the marker found is appended to the end of each sequence array of the matching set (e.g., the marker outlined by 916). For clarity of the drawings, a number of localization labels are depicted at the right of some markers in curly brackets—e.g., element 912 is juxtaposed to element 910 so as to help to distinguish the marker "1" (in the text "Feb. 1") from the marker "1." (in the text "Section 1.").

Notable positions of the string pointer when the first identifying procedure (Flow 300 of FIG. 3, described above) is executed and a description of the related actions performed by the procedure, if any, are as follows.

At the position of the string "1" (after the text "is entered into as of Feb.") a marker in the form of first-element string ("1") is found and stored in the first sequence array "mS[0]" in step 1 of FIG. 9. This correlates to operation 314 of the flow 300 of FIG. 3. Although a human may easily determine that this string "1" is not actually a marker of a section, such a distinction for an automated system is not trivial. The subsequent string "2017" is not interpreted as marker (in operation 312 and in the first search form loop—including blocks 320-236—of the flow 300 of FIG. 3) since it does not match any of the marker forms.

The string "1." in the text "Section 1. Acknowledgment" is recognized as in the form of first-element string and stored in "mS[1]" in step 2 of FIG. 9, again correlating to operation 314. Next, the string "1.1" of "1.1 The facts giving rise to the debt" is recognized as marker consecutive to both the sequence arrays "mS[0]" and "mS[1]" (in the first search form loop of the flow 300 of FIG. 3), thus the marker "1.1" is appended to both arrays in step 3 of FIG. 9. In step 4 of FIG. 9, the string "i)" of "i) the fact occurred on" is recognized as in the form of first-element string and stored in an additional sequence array "mS[2]". After the step 4 of FIG. 9, the string pointer encounters the strings "12", "17", and "2015", but none of them matches any of the marker forms, thus no action is performed.

In step 5 of FIG. 9, the string "ii)" of "ii) the fact occurred on Apr. 21, 2015" is recognized as marker consecutive to "mS[2]" and appended to it, whereas the strings "4", "21", and "2015" do not match the marker forms and thus they are not appended to any sequence array mS[0], mS[1], or mS[2]. In step 6 of FIG. 9, the string "1.2" of "1.2 The debtor acknowledges indebtedness" is recognized as a marker consecutive to both "mS[0]" and "mS[1]" and appended to both of them. In step 7 of FIG. 10 the string "1", indicating the page number of the current page of the document, is pointed by the string pointer. The string is identified as in the form of first-element string and stored in an additional sequence array "mS[3]".

After step 7 of FIG. 10, a document error is encountered by the string pointer: a space is wrongly inserted after the hundreds of the amount of debit ("1.100" is written as "1.1 00"). Therefore, the "1.1" is interpreted as a marker and appended to "mS[3]" in step 8 of FIG. 10. The subsequent string "5" of "5% per annum" is in none of the marker forms, thus it is skipped. In step 9 of FIG. 19, the string "2." of "Section 2. Payment" is recognized as a marker consecutive to "mS[0]", "mS[1]", and "mS[3]", and appended to all of them.

In step 10, not depicted in FIG. 10, the string "2.1" of "2.1 The debtor agrees" is recognized as marker consecutive to "mS[0]", "mS[1]" and "mS[3]" and appended to all of them. The same action is performed with the subsequent string "2.2" of "2.2 The first monthly installment" in step 11. In step 12, the string "1" of "commence on Jan. 1, 2018" is stored in an additional sequence array "mS[4]" since it is in the form of first-element string. In step 13, the string "3" of "Sction 3 General" is recognized as marker consecutive to "mS[0]", "mS[1]", and "mS[3]", and appended to all of them.

There are at least two document errors in the first sample document of FIG. 5. First, there is an error in the word "Section", which is instead written as "Sction", and second, the format of the section number "3" in "Sction 3" is missing a dot at the end, which is present in the markers of the other sections. These errors do not affect the proper functioning of embodiments of the invention, which instead continue analyzing elements of the document as described above.

In steps 14 and 15, which are not illustrated in FIG. 10, the strings "3.1" of "3.1 Should the debtor fail" and "3.2" of "3.2 This acknowledgment constitutes" are recognized as marker consecutive to "mS[0]", "mS[1]", and "mS[3]", and appended to all of them. In step 16 of FIG. 10, the final step, the string "2", which indicates the current page number of the document, is interpreted as marker consecutive to "mS

[4]" and appended to it. The value of "mS" at the end of the procedure, which is the output of block 108 of FIG. 1, is shown in the final step 16 of FIG. 10 (i.e., element 1002 of FIG. 10).

The first sample document in FIG. 5 is a first "stress test" for embodiments of the invention, as it contains a selection of document errors and digits in positions that may be misinterpreted by other document analysis methods. Returning back to the flow 100 of FIG. 1, at this point the control of flow 100 after block 108 passes to block 110, and then, since "mS" is not empty, to block 112, in which the loop variables are initialized as described above.

The result of the loop of blocks 114, 116, 118, and 120 is, as advanced in the above description of FIG. 1, the selection of the particular marker sequence with the greatest number of markers as the best-fit marker sequence and, for marker sequences with an equal number of markers, the selection of the last marker sequence found. In terms of variables, the loop assigns to "bFMS" the sequence array of "mS" having the maximum number of elements and, in the event of equal numbers, the sequence array with the greatest index: in this set of facts described with reference FIGS. 9 and 10, "mS[0]" and "mS[1]" both have nine elements, thus the sequence array assigned to "bFMS" is "mS[1]". This is the correct identification since "mS[1]" is related to the marker sequence having the marker "1." in "Section 1. Acknowledgment" as first marker, rather than the mS[0] sequence array which instead begins with the "1" in "Feb. 1, 2017". Following the flow 100 of FIG. 1, in block 122 the output data is generated.

In this fact pattern, if a best-fit marker sequence is found, the output data of block 122 comprises: (1) optionally a title of the document, containing the first line of the document; (2) optionally an opening, containing the substring of the document string starting from the first line subsequent the end of the title and ending with the last line preceding the first marker; and (3) a TSDS of one or more SSDS(s). Each of the SSDS(s) comprises: (a) a marker caption of the marker identifying the section/subsection (hereinafter "initial marker caption"), wherein the initial marker caption starts from the beginning of line of the document string containing the marker and ends with the last character of the marker; (b) optionally a heading, equal to a substring of the document string adjacent to the end of the initial marker caption of prior point (a), the substring ending at the end of the line containing the marker (in the case where the substring exists); (c) optionally a body, equal to a substring of the document string adjacent to (i) the end of the heading of prior point (b), if the heading exists, and (ii) the end of the initial marker caption (otherwise)—the substring ending at the end of the section/subsection (where the substring exists); and (d) optionally a subsection array of SSDSs, each of which is related to a subsection having the section/subsection as the parent, where at least one subsection of the section/subsection exists.

Following the flow 100 of FIG. 1, the output data from block 122 is returned, in most cases to the user but not necessarily so, in the block 124 and finally the flow 100 ends in the block 126.

FIG. 12 shows a graphical representation of (1) the TSDS generated from the best-fit marker sequence found, and (2) the related sections and subsections in the input document string, which is shown in detail in element 1202 of FIG. 12. The document depicted in FIG. 12 has a different maximum line width due to different space constraints. Each marker of the best-fit marker sequence is highlighted with a circle (such as element 1206) in the document, and the related sections and subsections are depicted in the Figure with section/subsection wrappers similar to element 1204.

Figure 13:
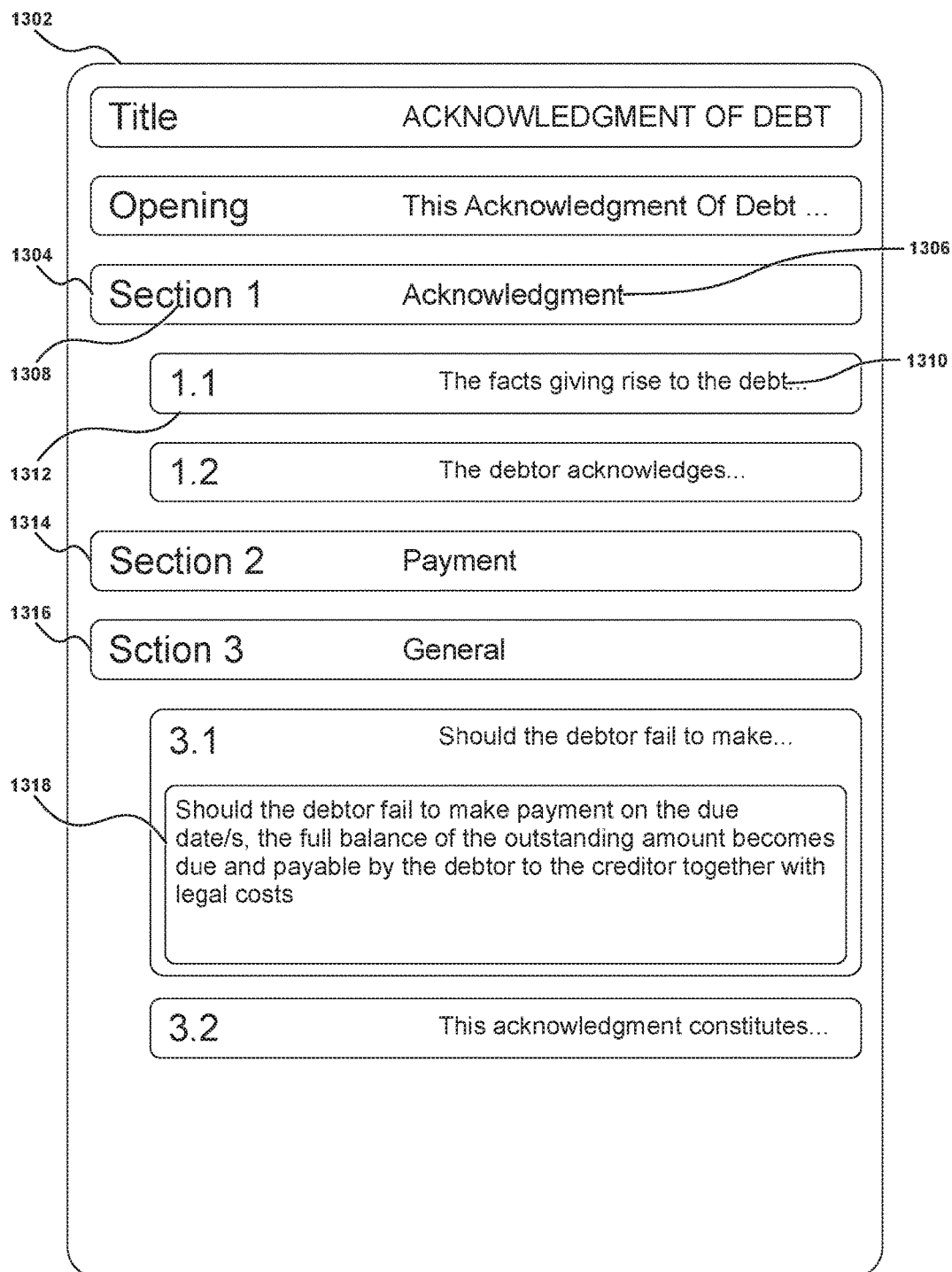
FIG. 13 illustrates an example visualization of an output of a computer application implementing embodiments of the invention that process the first sample input document string.

For the first fact pattern used to illustrate Example 1, embodiments of the invention are assumed to be utilized to receive the output data and display it on a device screen 1302 depicted in FIG. 13. In FIG. 13, each section of the TSDS is displayed in a panel as element 1304 whereas each subsection of the TSDS is displayed in a panel as the element 1312. Additionally, the title of the document and the opening are displayed in two panels at the top of the screen. Each panel, except the title, can be displayed in a collapsed and expanded form, switchable one to the other through an action of the reader.

In the collapsed form: (1) at the left of the panel, the initial marker caption (element 1308 is displayed; and (2) at the right of the initial marker caption (a) the first words of the heading (element 1306) are displayed, if the heading exists; otherwise, (b) the first words of the body (element 1310) are displayed, if the body exists.

In the expanded form: (1) a sub-panel with the full content of the body, if present, is further displayed under the initial marker caption and the heading (element 1318); and (2) the subsections of each section/subsection are displayed under the panel.

In FIG. 13: the panels related to the sections "1" and "3" (elements 1304 and 1316) are expanded whereas the panel related to the section "2" (element 1314) is collapsed. The panel related to subsection "3.1" is expanded whereas the other panels are collapsed.

The implementation of the eligibility calculation, and particularly of the best-fit function "bFF", described in this first fact pattern for illustrating Example 1 is efficient and fit for the purpose, despite being one of the simplest possible.

In greater detail, the "mS" found in the block 108 of FIG. 1 has the first two marker sequences of the same length and the last one of them is correctly recognized by Example 1 as the best-fit marker sequence, but this correct interpretation could be seen as bound up with the structure of the document in FIG. 5 and consequently lacking in generality. That is to say, Example 1 works well with the first fact pattern for illustrating Example 1 because in the document of FIG. 5, the first "Feb. 1" precedes "Section 1. Acknowledgment", which illustrates that embodiments disclosed herein work correctly. The second fact pattern used to illustrate Example 1 shows that Example 1 (namely, the best-fit function described therein) does not work with the second sample document depicted in FIG. 6, but that a modification to Example 1 (referred to as Example 2) allows embodiments disclosed herein to overcome the difficulties of working with documents such as the one in FIG. 6.

Second Fact Pattern Used to Illustrate Example 1

The below-described second fact pattern used to illustrate Example 1 is a further borderline case, showing how embodiments of the invention can be tuned to correctly interpret an arbitrarily high number of working cases simply by utilizing alternative implementations of the eligibility calculation.

The document string processed in this second fact pattern is based on the second sample document, shown in FIG. 6, which is purposely organized so that the identification of its sections is misinterpreted by Example 1. This shows that it is possible, in some embodiments of the invention, to implement a number of more general implementations of "bFF", with a wider range of work cases correctly interpreted, including the document string of this second fact pattern.

The document string of this second fact pattern is nearly the same as the document illustrated in FIG. 5. The only difference in the documents illustrated in FIGS. 5 and 6 is that the first sentence of the document of FIG. 6, after the title of the document string (i.e., line 604 beginning with the text "This Acknowledgment Of Debt"), is shifted forward to the first section (i.e., line 602 containing the text "Section 1. Acknowledgment:").

If the document string generated from the second sample document of FIG. 6 is processed with the flow 100 of FIG. 1, as was the first fact pattern described above, significant differences from the first fact pattern's partial and final results are obtained. Comparing the final result of the first identifying procedure—i.e., the output of block 108, which is described in detail with reference to FIG. 3—between the first fact pattern and the second fact pattern, the final results are quite similar. This output of the second fact pattern—whose first two sequence arrays are illustrated in Table 1 below—is similar to the output of block 108 when the first fact pattern is used (i.e., using the first sample document of FIG. 5 as the document input string).

TABLE 1 mS[ 0 ] = ["1.", "1.1", "1.2", "2.", "2.1", "2.2", "3", "3.1", "3.2"];
mS[ 1 ] = ["1", "1.1", "1.2", "2.", "2.1", "2.2", "3", "3.1", "3.2"].

In comparing the (1) output of block 108 when the first fact pattern illustrated as reference 1002 of FIG. 10, to (2) the output of block 108 when the second fact pattern illustrated in Table 1, the first marker of "mS[0]" of Table 1 (i.e., "1.") identifies the section "1." of the document of FIG. 6, whereas the first marker of "mS[1]" of Table 1 (i.e., "1") is related to the string "1" of the text "Feb. 1" of the document of FIG. 6.

In the loop of the blocks in flow 100 from 112 to 120, the same actions as in the first fact pattern are performed. Thus, the sequence array "mS[1]" is still selected as best-fit marker sequence in both the first and second fact patterns, because the sequence array "mS[1]" has the highest index among the longest sequence arrays in both cases. But, note that, in this second fact pattern, the result of selecting "mS[1]" as best-fit marker sequence is a misinterpretation of the sections of the document, since the first marker "1" of "mS[1]" in this case identifies no section/subsection, but rather stems from the "1" of the string "Feb. 1, 2017".

Example 2

To avoid misinterpretations like the one described in the second fact pattern above, another embodiment, referred to herein as Example 2, includes several modifications to the embodiment of Example 1.

To implement an effective solution, several alternative guidelines may be followed. For example, one of the following implementations of the best-fit function can be utilized: (1) a best-fit function returning, for each marker sequence, the weighted average between (a) the total number of markers—as in the first implementation—; and (b) an index of homogeneity of the positions of the markers of the sections relative to their containing lines (hereinafter "line position"); and (2) a best-fit function returning, for each marker sequence, the weighted average between (a) the total number of markers; and (b) an index based on the maximum number of equal characters immediately preceding the markers of the sections (hereinafter "maximum pre-characters number").

Both the index of homogeneity and the maximum pre-characters number are calculated only on the markers of the sections (hereinafter "section markers") of each marker sequence, since the markers of the subsections have generally a line position and maximum pre-characters number different from the ones of the sections. It is also possible to implement alternative and more accurate indexes, for example, by calculating the average of the index calculated on the section markers and the indexes calculated on the markers of each nesting level of subsections.

Embodiments of the invention may detect whether a marker identifies a section or a subsection—and, in case of the marker identifying a subsection, also to retrieve the nesting level of the subsection—, for example, by detecting the number of occurrences of the dot (i.e., punctuation period) in the trimmed marker of the marker.

First Fact Pattern Used to Illustrate Example 2

The below-described fact pattern illustrates the performance of Example 2 using, as the source of the document input string, the same document (FIG. 6) of the second fact pattern used to illustrate Example 1. In this fact pattern, the index of homogeneity based on the line position of the sequence array "mS[0]" is greater than the one of "mS[1]", because, in "mS[0]", the line position of the first section marker "1." is equal to 9—given that 9 is the position of "1." in the string "Section 1. Acknowledgment:". The value 9 is nearer to those of the other section markers, which are equal to 9 for the "Section 2" and to 8 for the "Sction 3". In "mS[1]", the line position of the first section marker "1" is equal to 79. The value 79 is significantly different from the line positions of the other section markers related to "mS[1]".

Assuming that the index of homogeneity of the line positions (IHLP) calculated for "mS[0]" is IHLP(mS[0]) and that the total number of markers (TNM) is TNM(mS[0]), then IHLP(mS[0])>IHLP(mS[1]) and TNM(mS[0])=TNM(mS[1]), given that the values of TNM for both "mS[0]" and "mS[1]" are equal to 9. The weighted average (WA) between IHLP and TNM is WA(mS[0])=(IHLP(mS[0])*K+TNM(mS[0])*H)/(K+H), where K is the weight of IHLP and H is the weight of TNM in the weighted average. Thus, WA(mS[0])>WA(mS[1]), if K>0 and H>=0. It follows that, with adequate values pre-assigned to the weights in the weighted average, the weighted average WA(mS[0]) is the maximum best-fit value found, and that "mS[0]" is the best-fit marker sequence. Consequently, the marker sequence related to sequence array "mS[0]" is correctly identified by Example 2 as the best-fit marker sequence.

In reference to FIG. 6, the same result is achieved if an index based on the maximum pre-characters number is used in the best-fit function. Limited to the section markers of the section array "mS[0]", the maximum number of immediately preceding equal characters is 6, i.e., the length of the string "ction" immediately preceding all the section markers, wherein the string has a space character as ending character. For the section markers of "mS[1]", the maximum number is 1, because only the space " " is common to all the section markers. Again in reference to FIG. 6, to calculate the maximum pre-characters number of "mS[1]", the immediately preceding characters in common in all the three section markers of "mS[1]", i.e. "Feb." (followed by marker "1"), "Section" (followed by marker "2."), and "Sction" (followed by marker "3"), are checked. The result is simply the ending space " ", because the characters immediately preceding the common ending space of the respective markers, "." "n", and "n", are not all equal. Thus, the maximum pre-characters number, MPN(mS[1]), is 1, i.e., the length of the single space " ". Therefore, with considerations analogous to those for the index of homogeneity, the sequence array "mS[0]" is correctly selected as best-fit marker sequence also if an index based on maximum pre-characters number is used.

The difference between the second fact pattern of Example 1 and the first fact pattern of Example 2 is that the sentence starting with "This Acknowledgment Of Debt" is correctly recognized as shifted into the "Section 1". Due to the exchange of the lines 602 and 604, the processing of the first fact pattern of Example 2 gives the same result as the first fact pattern of Example 1, except for the exchanged line 602 and 604), which is moved into Section 1 in FIG. 6 according to its position in Example 2. That is, the output of the first fact pattern illustrating Example 2 results in "Section 1" beginning with:

Section 1. Acknowledgment: [EOL]
This Acknowledgment Of Debt ("the Acknowledgment") is entered into as of Feb. 1, 2017 (the "Effective Date") between Johnny Doe ("Creditor") and James Roe ("Debtor").
[EOL]
. . .

Second Fact Pattern Used to Illustrate Example 2

As a further proof of the non-dependence of embodiments of the invention on the formatting and on the style of the input documents, the process described as Example 2 is applied to the unformatted input document string generated from the third sample document of FIG. 7, which is obtained by removing all the end of lines from the document of FIG. 6. In other words, the document string of this second fact pattern used to illustrate Example 2 is a single line with no carriage return (which typically results in an EOL), even if in FIG. 7 it is depicted in multiple lines due to space constraints.

It is noted that the first identifying procedure described with reference to FIG. 1 is not based on the format of the document and, particularly, on the presence of the end of lines. For this reason, the result of the processing of the document string of FIG. 7 in the block 108 of FIG. 1 is still the same of the processing of the document string of FIG. 6, i.e., the result illustrated in reference 1002 of FIG. 10 and modified as in Table 1.

Assuming that, in this second fact pattern used to illustrate Example 2, the best-fit function is implemented with the index based on the maximum pre-characters number utilized in the first fact pattern used to illustrate Example 2, the document string of FIG. 7 is processed analogously as the document of said Example 3, given that the values of the maximum pre-characters number indexes of the markers are minimally affected by the removing of the EOLs. Consequently, the sequence array "mS[1]" is correctly selected as best-fit marker sequence. The markers of the best-fit marker sequence are outlined in FIG. 7 with outlines such as 702.

Example 3

This Example 3 is a modified version of Example 1, set forth above. In a few borderline cases of document strings, the set of sequence arrays provided by the first identifying procedure described with reference to FIG. 1 may not include some sequence arrays that are relevant for the purposes of a correct hierarchies' identification. An example of borderline case is provided in the document string generated from the sample document depicted in FIG. 8, which is nearly the same as the document string generated from the sample document of FIG. 5. The most notable modification of document in FIG. 5 consists in adding the line beginning with "2.3 The present terms of payment" to the end of "Section 2", said line containing a document reference to the "Section 3"—outlined by 802. It is also noted that, differently from FIG. 5 and FIG. 6, (1) the document in FIG. 8 does not include the page footers, containing the page numbers, which are treated as removed from the document string in the pre-treatment process performed in block 106 of FIG. 1; and (2) the word "Section" immediately preceding the section marker "3." is correctly written in the document.

In the document string generated from the document of FIG. 8, the markers outlined by 802 and 804 are related, respectively, to a document reference to "Section 3" of the document, and to "Section 3" itself (hereinafter, a marker outlined by an element E of a Figure is referred to as "marker E"). If the first identifying procedure described in Example 1 processes the document of in FIG. 8, the marker 802 is appended to a sequence array, whereas the marker 804 is not. In other words, a certain sequence array "mS[y]" is populated by the first identifying procedure (flow 300 of FIG. 3) as follows:

mS[y]=["1.", . . . , "2.2", "2.3", "3.", "3.1", . . . ], wherein the element "3." of "mS[y]" is related to the marker 802, which identifies a document reference to "Section 3", instead of "Section 3" itself. On the other hand, the marker 804 is encountered by the string pointer and then rejected—since its place in "mS[y]" is taken by the marker 802—, thus the marker 804 is not available to be selected in any eligible marker sequence and this leads to a misinterpretation of the sections of the document.

A second implementation of the identifying procedure (hereinafter "second identifying procedure") is described below. This second implementation of the identifying procedure extends the range of documents correctly interpreted by embodiments of the invention to borderline cases such as the one mentioned in the immediately preceding two paragraphs. In other words, this second implementation of the identifying procedure, in some cases, provides a more accurate result than does the first implementation of the identifying procedure. Changes between the first and second implementations of the identifying procedure include: (a) adding a third marker form—defined below—to the marker forms searched in the document; and (b) adding a third identifying-procedure operation—also defined below—to the identifying-procedure operations. A target marker is in the third marker form if it is consecutively congruent to one or more congruent branch elements of one ore more sequence arrays (hereinafter "forked sequence array"), wherein each congruent branch element is not the last element of the forked sequence array. The third identifying-procedure operation (1) is performed if the target marker found by the second identifying procedure is in the third marker form, and (2) appends a branch sequence array to "mS" for each forked sequence array, wherein the branch sequence array includes (i) the elements of the forked sequence array preceding the last congruent branch element (if such elements exist), (ii) the last congruent branch element, and (iii) the target marker.

Figure 4:
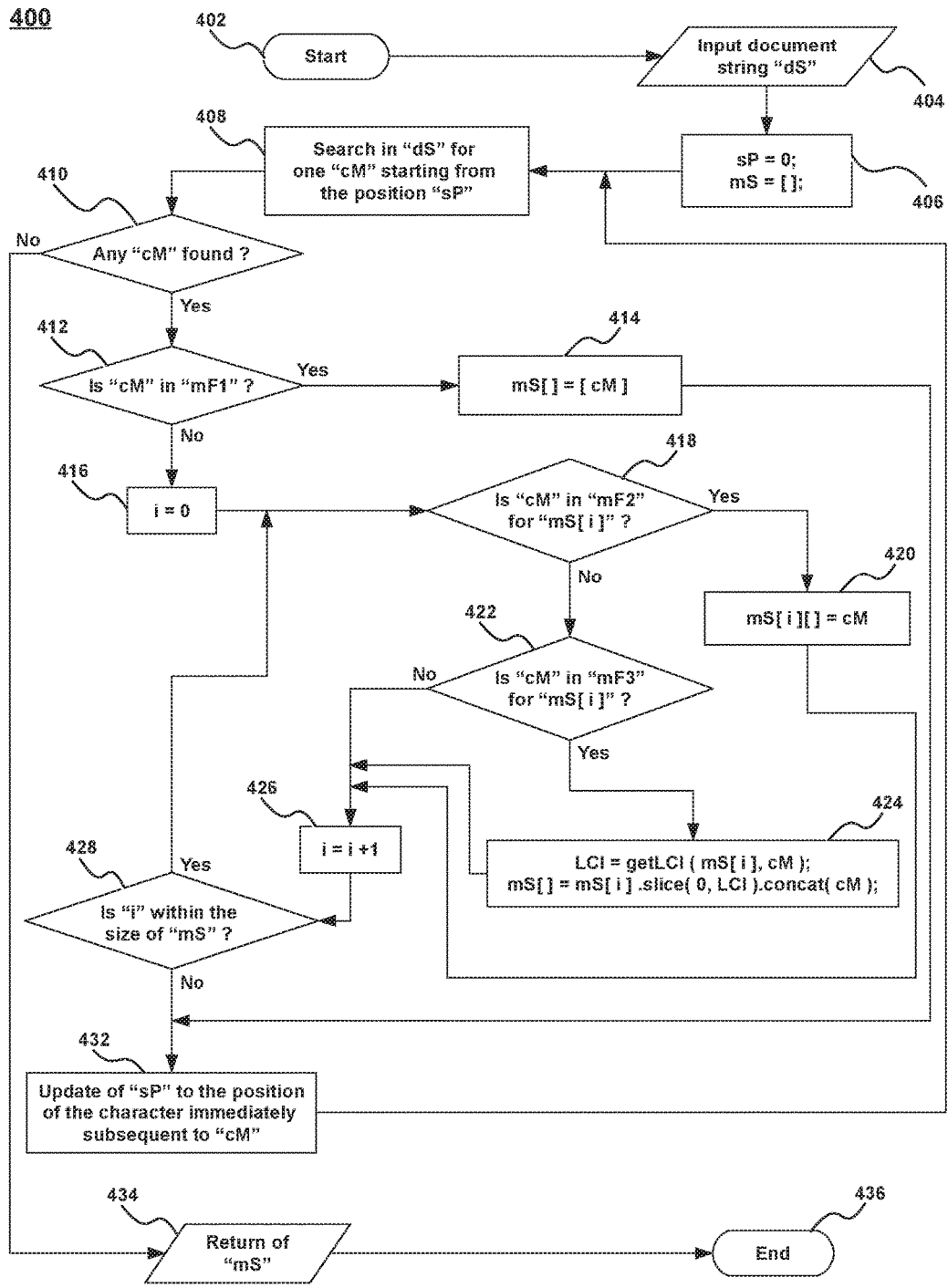
FIG. 4 is a flow chart illustrating example operations of a second implementation of an identifying procedure for identifying an array of marker sequences according to embodiments of the invention.

The second identifying procedure is depicted as flow 400 in FIG. 4. It is noted that a number of the operational blocks in the flow 400 of FIG. 4 are equivalent to the same operational blocks of the flow 300 of the first identifying procedure depicted in FIG. 3. Namely, the blocks in each block couple of the following list of block couples are similar or equivalent: [402, 302], [404, 304], [406, 306], [408, 308], [410, 310], [412, 312], [414, 314], [416, 316], [418, 320], [420, 322], [426, 324], [428, 326], [432, 328], [434, 332], and [436, 334]. Therefore, the description of the operations of the blocks 402, 404, 406, 408, 410, 412, 414, 416, 418, 420, 426, 428, 432, 434, and 436 of FIG. 4 is analogous to the equivalent block of the first identifying procedure illustrated in FIG. 3, and thus is omitted for brevity.

Notable differences between the flow 300 and the flow 400 are in the second search form loop of the second identifying procedure—which includes the blocks 418, 420, 422, 424, 426, and 428—, in comparison to the first search form loop (blocks 320, 322, 324, and 326) of the flow 300. The operation of the second search form loop is (1) detecting and appending to "mS" the markers in the second marker form—similarly to the operation of the first search form loop—, (2) detecting the markers in the third marker form, and (3) appending a branch sequence array to "mS" for each forked sequence array found.

Similarly to the flow 300 in FIG. 3, block 418 of the flow 400 detects whether "cM" is in the second marker form. When the result of the test of block 418 is positive, the control of flow 400 passes to block 420—in which "cM" is appended to the sequence array "mS[i]"—, analogously as in the flow 300 of FIG. 3. Otherwise, the control of flow passes to block 422, which detects whether "cM" is in the third marker form (referred to as "mF3" in FIG. 4) for "mS[i]", i.e., if "cM" is consecutively congruent to at least one congruent branch element of "mS[i]".

For example, at a particular stage a marker "2.1" is in the third marker form for a sequence array "mS[1]" such that "mS[1]"=["1", "2", "3", "3.1" ], because "2.1" is consecutively congruent to the marker "2", which is the second (thus not the last) marker of "mS[1]". If the marker "2" was the last marker of "mS[1]", the marker "2.1" would be in the second marker form for "mS[1]".

If the result of the test of block 422 is positive, the control of flow 400 passes to block 424. In this case, following the notation of the description of the second identifying procedure, "mS[i]" is renamed as the forked sequence array, and "cM" is renamed as the target marker. In the block 424, the following operations are performed: (1) the last congruent index "LCI" of the last congruent branch element of "mS[i]" is retrieved through a call to a function "getLCI(mS[i], cM)"—described in detail below —, and (2) a branch sequence array is appended to the array "mS", wherein the branch sequence array is the result of the concatenation of (a) the subsequence of "mS[i]" starting from the first element of "mS[i]" and ending with the element of "mS[i]" that has "LCI" as its index; and (b) the target marker "cM". It is noted that, following the syntax of the Javascript language, in block 424 the concatenation is implemented with the "arr.concat(elm)" object method, which appends the argument "elm" to the caller array "arr". The extraction of a subsequence array is implemented with the "arr.slice(begin, end)" object method, which extracts a subsequence of elements from the caller array "arr", wherein said subsequence starts with the element indexed with the argument "begin" and ends with the element indexed with the argument "end".

After block 424, the flow 400 passes to block 426 and, subsequently, to block 428, which is the closing-loop block of the second search form loop.

For example, if the second identifying procedure processes the document string generated from the document in FIG. 8, block 408 encounters the marker 804 of FIG. 8—having a marker content of "3."—, and assigns it to "cM" at a certain step of the execution of said procedure. It is assumed that, at the same certain step of the execution of the second identifying procedure, a sequence array "mS[w]" includes the following markers:

mS[w]=["1.", "1.1", "1.2", "2.", "2.1", "2.2", "2.3", "3."], wherein the last element "3." of "mS[w]" was appended to the array when the marker 802 was identified. Subsequently, the flow 400 enters the second search form loop, and—after performing a number of loop cycles until the value of the iterating index "i" equals "w"—passes to block 418.

The result of the "mF2" test in block 418 is negative since "cM" (i.e., "3.") is not in the second marker form for "mS[w]", thus the flow passes to block 422.

The block 422 detects that the marker 804 is in the third marker form for "mS[w]", given that "3." is consecutively congruent to four congruent branch elements of "mS[w]"—i.e., "2", "2.1", "2.2", and "2.3"—and thus the flow passes to block 424.

In block 424, function "getLCI" returns the zero-based index (i.e., 6) of the last congruent branch element (i.e., "2.3") in "mS[w]". Then, in the same block 424, branch sequence array "mS[z]" is appended to "mS", wherein "mS[z]" includes (i) the markers of "mS[w]" that have the index in the range of 0 and 6, and (ii) "3."—i.e., "cM".

Branch sequence array "mS[z]" is thus as follows:

mS[z]=["1.", "1.1", "1.2", "2.", "2.1", "2.2", "2.3", "3."], wherein it is noted that, although the marker contents of "mS[z]" are the same as the ones of "mS[w]", the last marker of "mS[z]" is marker 804 of FIG. 8, whereas the last marker of "mS[w]" is marker 802 of FIG. 8.

It is noted that in the implementation of function "getLCI"—described below—it is taken into account that the last element of "mS[i]" cannot be a congruent branch element for "cM" because if, absurdly, the last element was in that form, "mS[i]" would be in the second marker form and thus the flow 400 would pass from block 418 to 420 without executing blocks 422 and 424. For example, if the last element of "mS[i]" was "2.1", and "cM" was "3", then block 418 would detect that "cM" was in "mF2" for "mS[i]" and thus the flow 400 would pass to block 420—in which marker "3" would be appended to "mS[i]".

Function "getLCI" performs the following operations: (1) it scans the array "mS[i]" in descending order starting from its penultimate element—whose index is equal to the length of the array less 2—; (2) it breaks the scanning loop as soon as an element "mS[i][j]" of "mS[i]" is found, wherein "cM" is consecutively congruent to "mS[i][j]"; and then (3) it returns "j".

An example of Javascript code implementing function "getLCI" is

```
function getLCI( mSI, cM ) {
    var penultimateIndex = mS.length –2,
        j;
    for ( j = penultimateIndex; j >= 0; j-- ) {
        if ( isConsecutiveCongruent( mSI[ j ], cM ) ) {
            return j;
        }
    }
}
```

In the above implementation of "getLCI" it is noted that (1) "mS[i]" is renamed as "mSI" as it is in form of array element which is passed as parameter to the function; (2) it is assumed that the length of "mSI" is greater than 1 (given that a "mSI" composed of only one element may not be in the third marker form); and (3) a function "isConsecutiveCongruent(a, b)" is utilized in order to detect if a marker "b" is consecutive congruent to a marker "a".

First Fact Pattern Used to Illustrate Example 3

This fact pattern uses the document illustrated in FIG. 8. If the second identifying procedure (flow 400 of FIG. 4) processes the document string created from the fourth sample document in FIG. 8, the steps from 1 to 6 are nearly the same of the steps from 1 to 6 (illustrated in FIG. 9) of the first identifying procedure (FIG. 3) processing the document string created from the document of FIG. 5. Therefore, a description of the notable positions of the string pointer—when the second identifying procedure is executed—begins from the step 7-B (depicted in FIG. 11), in which it is assumed that the immediately preceding step performed by the procedure is the step 6 (depicted in FIG. 9).

In step 7-B, the string pointer encounters the string "1.1" of the document error "1.1 00", and said string "1.1" is recognized as in the third marker form, given that it is consecutively congruent to the marker "1" of "mS[0]" and to the marker "1." of "mS[1]"—as shown in step 6 of FIG. 9. Since the forked sequence arrays "mS[0]" and "mS[1]" are identified, for each of them a branch sequence array is appended to "mS" by the second identifying procedure (flow 400 of FIG. 4). Therefore, (1) branch sequence array "mS [3]" is appended to "mS", wherein "mS[3]" includes the last congruent branch element "1" of "mS[0]" and the target marker "1.1", and (2) branch sequence array "mS[4]" is further appended to "mS", wherein "mS[4]" includes the last congruent branch element "1." of "mS[1]" and the target marker "1.1". It is noted that both the branch sequence arrays appended in this step 7-B have no markers of the forked sequence arrays preceding the last congruent branch element—given that in this case the last congruent branch element "1." is also the first marker of the forked sequence arrays "mS[0]" and "mS[1]".

In steps 8-B, 9-B, 10-B and 12-B, not depicted in the FIG. 11, the strings (i) "2." of "Section 2. Payment", (i) "2.1" of "2.1 The debtor agrees", (iii) "2.2" of "2.2 The first monthly installment", and (iv) "2.3" of "2.3 The present terms of payment", are recognized as markers of the second marker form. Each of said markers is thus sequentially appended to the sequence arrays "mS[0]", "mS[1]", "mS[3]" and "mS [4]".

In step 11-B, also not depicted in the FIG. 11, the string "1" of "commence on Jan. 1, 2018" is recognized as in the form of first-element string, and thus stored in a further sequence array "mS[5]".

In the step 13-B, illustrated in FIG. 11, the string "3." outlined by 802 in FIG. 8—which is the document reference to "Section 3." from the string "the restrictions of the Section 3."—is also recognized as a marker of the second marker form and appended to "mS[0]", "mS[1]", "mS[3]" and "mS[4]". In FIG. 11, the localization label depicted at the right of the marker appended in this step 13-B is "{Ref.}".

The step 14-B is the most indicative step to show the effectiveness of the second identifying procedure (FIG. 4) compared to the first identifying procedure (FIG. 3) when processing the borderline case of this fact pattern. In this step 14-B, the string "3." of "Section 3. General"—outlined by 804—is recognized as in the third marker form, and the forked sequence arrays identified by the procedure are "mS[0]", "mS[1]", "mS[3]" and "mS[4]". For each of the forked sequence arrays identified in this step, a branch sequence array is appended to "mS", wherein each branch sequence array includes: (i) the markers preceding the last congruent branch element "2.3", (ii) the last congruent branch element "2.3", and (iii) the target element "3.". The branch sequence arrays appended in this step 14-B are thus "mS[6]", "mS[7]", "mS[8]" and "mS[9]".

The subsequent step 15-B is omitted for brevity from the representation in FIG. 11. In this step 15-B, the marker "3.1" is recognized as marker of the second marker form and appended to "mS[0]", "mS[1]", "mS[3]", "mS[4]", "mS[6]", "mS[7]", "mS[8]" and "mS[9]".

In the final step 16-B, which is also the output of the second identifying procedure—i.e., of block 108 of FIG. 1—, the marker "3.2" is in turn recognized as marker of the second marker form and appended to "mS[0]", "mS[1]", "mS[3]", "mS[4]", "mS[6]", "mS[7]", "mS[8]" and "mS[9]".

To identify the best-fit marker sequence in this fact pattern, the weighted average between (a) the total number of markers, and (b) the index based on the maximum pre-characters number of the sections markers is used in the best-fit function, as described in Example 2. Particularly, in this example it is shown that the pre-characters also includes non-visible characters such as the EOL.

By analyzing the output of the second identifying procedure for this fact pattern, it turns out that the total number of markers of the sequence arrays are as in Table 2:

TABLE 2

| |
|---|
| TNM( mS[ 0 ] ) = 10; |
| TNM( mS[ 1 ] ) = 10; |
| TNM( mS[ 6 ] ) = 10; |
| TNM( mS[ 7 ] ) = 10; |
| TNM( mS[ 3 ] ) = 9; |
| TNM( mS[ 4 ] ) = 9; |
| TNM( mS[ 8 ] ) = 9; |
| TNM( mS[ 9 ] ) = 9; |
| TNM( mS[ 2 ] ) = 2; |
| TNM( mS[ 5 ] ) = 1. |

The values of maximum pre-characters number MPN of the section markers of the sequence arrays are calculated as described below. The sequence arrays "mS[0]" and "mS[3]" have (i) the first section marker "1" which is immediately preceded by the characters "Feb.", (ii) the second section marker "2." which is immediately preceded by ".[EOL][EOL] Section", and (iii) the third section marker "3."—of the document reference outlined by 802—which is immediately preceded by "the Section". Thus, the immediately preceding characters in common in all of the three sections are the single space " ", which has the length of 1 character—i.e., MPN(mS[0])=1 and MPN(mS[3])=1. For analogous reasons, it turns out that MPN is equal to 1 also for "mS[6]" and "mS[8]". The sequence arrays "mS[1]" and "mS[4]" include (i) the section markers "1." and "2.", which are both immediately preceded by the characters ".[EOL][EOL]Section"; and (ii) the section marker "3." of the document reference, which is immediately preceded by "the Section" Therefore, the immediately preceding characters in common in the three section markers of "mS[1]" and "mS[4]" are "Section"—i.e., MPN(mS[1])=8 and MPN(mS [4])=8. The section markers "1.", "2.", and "3." of "mS[7]" and "mS[9]" are all immediately preceded by the characters ".[EOL][EOL]Section", whose length is 11. The value of MPN(mS[7]) and MPN(mS[9]) is then 11. The section markers "i)" and "ii)" of the sequence array "mS[2]" are immediately preceded respectively by the strings "debt are:[EOL]" and "2015[EOL]" (each of which ends with 4 space characters), thus the immediately preceding characters in common are "[EOL]", and then MPN(mS[2])=5. Finally, it is noted that the maximum pre-characters number cannot be calculated for "mS[5]" since the number of section markers of this sequence array is less than 2.

The maximum pre-characters number MPN of the sequence arrays are thus as in Table 3:

TABLE 3

| |
|---|
| MPN( mS[ 7 ] ) = 11; |
| MPN( mS[ 9 ] ) = 11; |
| MPN( mS[ 1 ] ) = 8; |
| MPN( mS[ 4 ] ) = 8; |
| MPN( mS[ 2 ] ) = 5; |
| MPN( mS[ 0 ] ) = 1; |
| MPN( mS[ 3 ] ) = 1; |
| MPN( mS[ 6 ] ) = 1; |
| MPN( mS[ 8 ] ) = 1. |

With adequate values of the weighted average of the best-fit function, the best-fit marker sequence is the one having the maximum values of MPN in Table 3 and of TNM in Table 2, i.e. "mS[7]". Therefore, the sequence array "mS[7]" turns out to be the marker sequence correctly interpreted by this embodiment of the invention as the best-fit marker sequence, and then said sequence array is included in the output data analogously as in the first and second fact patterns illustrating Example 1, described above.

Second Fact Pattern Used to Illustrate Example 3

Figure 20:
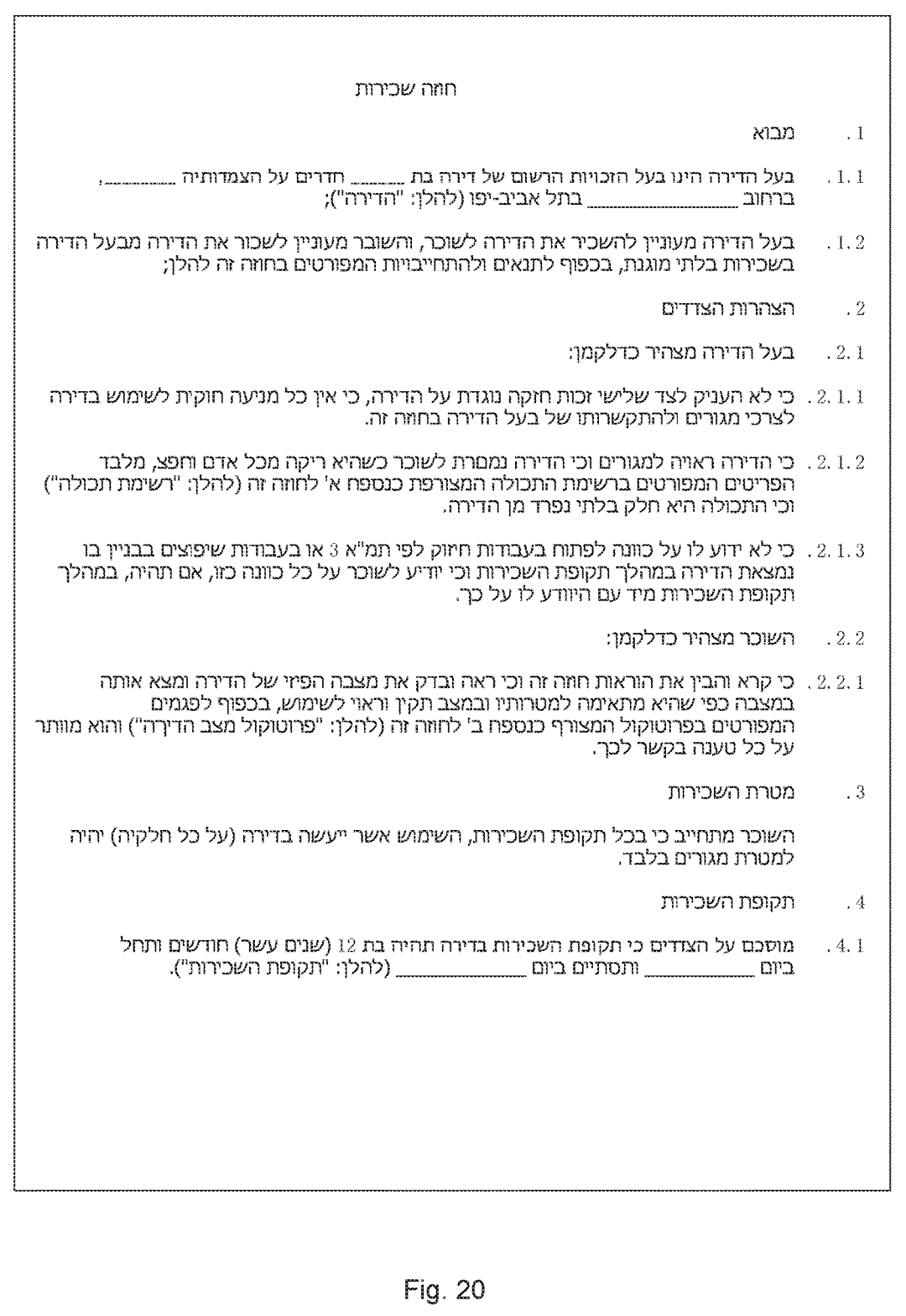
Figure 21:
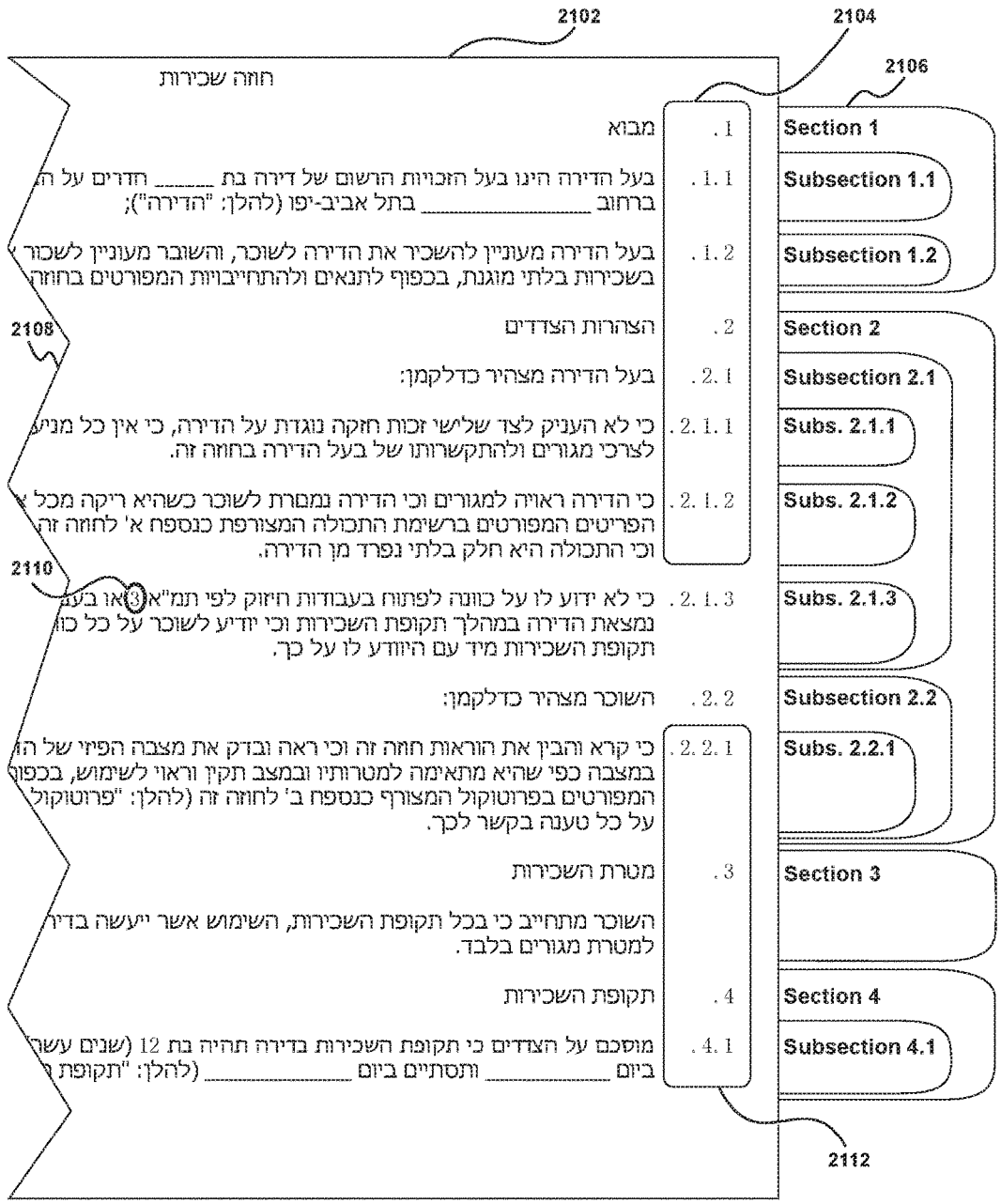
FIG. 21 is a representation of an example result of the processing of the seventh sample input document string according to embodiments of the invention.

In addition to processing left-to-right languages, such as English, embodiments of the invention also process documents in right-to-left languages. The document string in FIG. 20 is a document in Hebrew language, which is a right-to-left language, in which the markers of the sections and subsections are aligned to the right. As illustrated in this fact pattern, embodiments of the invention that accord to Example 3, process the document of FIG. 20, and generate a TSDS depicted with elements such as 2106 in FIG. 21. In FIG. 21, for space constraints, the document 2102 is only partially shown, with a cut-line illustrated as 2108.

The document string of this second fact pattern is processed by the second identifying procedure (FIG. 4) with the following notable steps of the procedure's execution:

In the initial steps, the markers from "0.1" to "0.2.1.2" (outlined with 2104 in the FIG. 21) are appended to a first sequence array mS[0]=["0.1", "0.1.1", "0.1.2", "0.2", "0.2.1", "0.2.1.1", "0.2.1.2"]

In a immediate subsequent step, the marker "3" (outlined with 2110) is also appended to "mS[0]" as it is recognized of the second marker form. Thus, at this stage the first sequence array is mS[0]=["0.1", "0.1.1", "0.1.2", "0.2", "0.2.1", "0.2.1.1", "0.2.1.2", "3" ]

In a further immediate subsequent step, the target marker "0.2.1.3" is recognized as in the third marker form, since it is consecutively congruent to the congruent branch element "0.2.1.2" of "mS[0]". Consequently, the branch sequence array "mS[1]" is appended to "mS", wherein "mS[1]" is composed of (i) the markers preceding the last congruent branch element "0.2.1.2", (ii) "2.1.2", and (iii) the target marker "2.1.3"; i.e., mS[1]=["0.1", "0.1.1", "0.1.2", "0.2", "0.2.1", "0.2.1.1", "0.2.1.2", "0.2.1.3" ]

The subsequent marker "0.2.2" is recognized as (i) consecutively congruent to "mS[1]" (i.e., in the second marker form), and thus appended to "mS[1]"; and (ii) again, consecutively congruent to the congruent branch elements "0.2.1", "0.2.1.1", and "0.2.1.2" of "mS[0]" (i.e., in the third marker form). Following the implementation of the second identifying procedure, a branch sequence array "mS[2]" is appended to "mS", wherein mS[2]=["0.1", "0.1.1", "0.1.2", "0.2", "0.2.1", "0.2.1.1", "0.2.1.2", "0.2.2" ].

Nevertheless, at this step it turns out that
mS[1]=["0.1", "0.1.1", "0.1.2", "0.2", "0.2.1", "0.2.1.1", "0.2.1.2", "0.2.1.3", "0.2.2" ],
and thus that "mS[2]" is a subset array of "mS[1]", given that each marker of "mS[2]" is also in the superset array "mS[1]".

It is noted that in certain implementations of the second identifying procedure of FIG. 4, the subset branch sequence arrays are not appended to "mS" to improve the performance, since their eligibility value, by the definition of eligibility calculation of said certain implementations, is less than the eligibility value of the corresponding superset sequence arrays.

The subsequent markers that are recognized as in the second marker form (outlined with 2112), are appended in sequence to both the sequence arrays "mS[0]" and "mS[1]". The output of block 108 of FIG. 1—in which the subset branch sequence arrays are omitted—is then the following:

mS[0]=["0.1", "0.1.1", "0.1.2", "0.2", "0.2.1", "0.2.1.1", "0.2.1.2", "3", "0.4", "0.4.1" ];
mS[1]=["0.1", "0.1.1", "0.1.2", "0.2", "0.2.1", "0.2.1.1", "0.2.1.2", "0.2.1.3", "0.2.2", "0.2.2.1", "0.3", "0.4", "0.4.1" ].

By using the first implementation of best-fit function described in this disclosure—i.e. the function returning TNM( )—, "mS[1]" is identified as best-fit marker sequence. Following the flow 100 of FIG. 1, the TSDS depicted with elements such as 2106 of FIG. 21 is generated. It is noted that said TSDS correctly matches the section/subsection structure of the document.

Example 4

Example 4 uses a version of the eligibility calculation belonging to the multiple result category. This Example 4 assumes that: (1) each of the eligible marker sequences returned by Example 4 identifies a section hierarchy in the document string—the eligible marker sequences identifying the hierarchies are hereinafter referred to as "hierarchy marker sequences"—; (2) each section and subsection—identified by an identifying eligible marker of an eligible marker sequence—begins from the identifying eligible marker, and ends (a) one character before the closest subsequent eligible marker of the identifying eligible marker—also possibly in an eligible marker sequence different from that of the identifying eligible marker—if the closest subsequent eligible marker exists, and (b) at the end of the document string, otherwise; (3) a best-fit marker sequence (identifying the master hierarchy of the document) is selected, on the basis of the eligibility value, among the eligible marker sequences identified; and (4) embodiments of the invention identify the numbered lists in the document string, and the marker sequences identifying the numbered lists are hereinafter referred to as "numbered list marker sequences".

Figure 2:
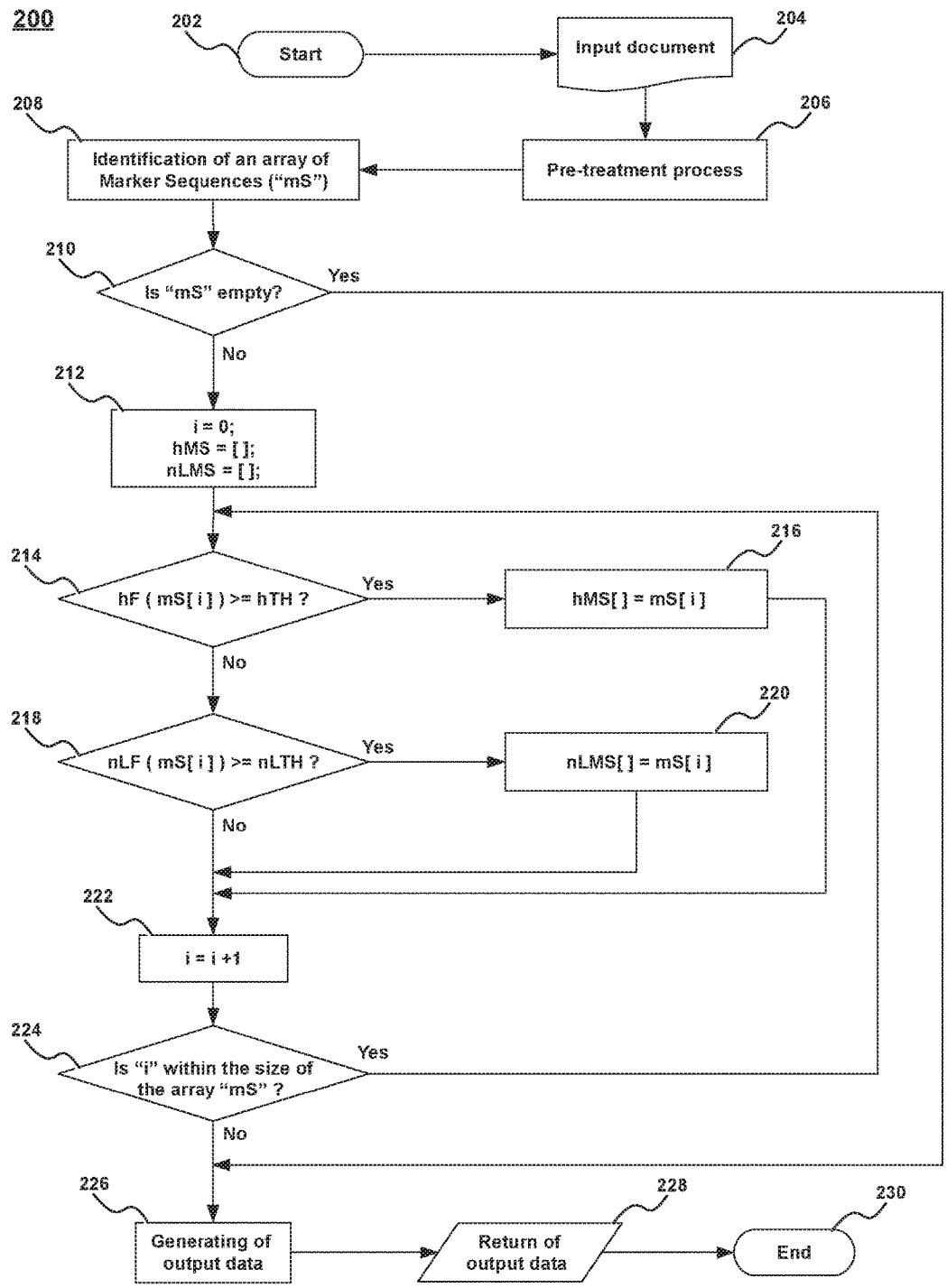
FIG. 2 is a flow chart illustrating example operations of a system for identifying data elements in data structures according to other embodiments of the invention in which multiple eligible marker sequences can be identified and returned.

Example 4 produces outputs different from the prior Examples 1, 2 and 3, thanks to a newly described flow 200, depicted in FIG. 2, which differs from the flow 100 of FIG. 1 used in prior Examples. Many corresponding operational blocks between flows 100 and 200 of FIGS. 1 and 2 operate in the same or similar manner, and are not described with reference to FIG. 2 for brevity.

Operational block 212, in addition to initializing the iterating index "i" similarly to the block 112, performs (1) initializing as empty an array "hMS", in which the hierarchy marker sequences found are intended to be stored; and (2) initializing as empty an array "nLMS", in which the numbered list marker sequences are intended to be stored.

Operational block 214 in principle is equivalent to FIG. 1, i.e., block 214 has the same form as block 114 of FIG. 1, but with two component replacements: "bFF" is replaced by "hF"; and "bestFit" is replaced by "hTH". In this block 214, the hierarchy function "hF", having similar properties to the above-described "bFF", returns the eligibility value—renamed "hierarchy value"—of the marker sequences. If the hierarchy value is greater than or equal to a predefined threshold value for the hierarchies (labeled "hTH" in FIG. 2), the control of flow 200 passes to block 216, otherwise it passes to block 218. Comparing "bestFit" with "hTH", "bestFit" can be updated at each iteration whereas "hTH" is constant.

Operational block 216 (as well as its analogous block 220, described below), constitutes an important distinction between the two flows of FIGS. 1 and 2. Namely, in block 216, the sequence array "mS[i]" of the currently iterating-over marker sequence is stored directly in the array "hMS". This means that, differently from Example 1, all the marker sequences passing the test in block 214 are identified as hierarchy marker sequences.

The operations of subsequent blocks 218 and 220 respectively differ from those of blocks 214 and 216, in the objective of blocks 218 and 220. Namely, block 218 has the same form as block 214, and block 220 has the same form as block 216, whereby while blocks 214 and 216 populate arrays of hierarchy marker sequences "hMS", blocks 218 and 220 populate arrays of numbered list marker sequences "nLMS".

In block 218, an eligibility function (in this case renamed as "numbered list function") "nLF" returns the eligibility value (in this case renamed "numbered list value") of the marker sequences. If the numbered list value is greater than or equal to a predefined threshold value for the numbered lists, i.e., "nLTH" in FIG. 2, the currently iterating-over marker sequence is identified as an item of a numbered list and the control of flow 200 passes to block 220. Otherwise, the control of flow passes to block 222.

In block 220, the sequence array "mS[i]" of the currently iterating-over marker sequence is stored in the array "nLMS", then the control of flow passes to block 222.

After block 216, the control of flow 200 passes to block 222 instead of to block 218. This flow control prevents the occurrence of one marker sequence identified as both a hierarchy marker sequences and a numbered list marker sequence.

Both the hierarchy function "hF" and the numbered list function "nLF" are implemented as eligibility functions and are both implementations of the eligibility calculation. The hierarchy and number listed functions are not strictly defined and their implementations may generally differ from one another and from the "bFF".

Block 226 differs in its operation compared to corresponding block 122. The output data generated in block 226 includes: (1) for each eligible marker of each hierarchy marker sequence, a TSDS analogous to the one described for block 122; and (2) for each eligible marker of each numbered list marker sequence, a numbered-list data structure nearly similar to TSDS, except for the headings, which are not provided for the items of the numbered lists.

Fact Pattern Used to Illustrate Example 4

This fact pattern used to illustrate Example 4 makes reference to the Example 4 and the fifth sample document shown in FIG. 14. Similarly to the documents in FIG. 5 and FIG. 6, the document in FIG. 14 is assumed to be equal to the input document string solely for simplicity of exposition. Differently from FIGS. 5 and 6, the document in FIG. 14 (1) does not show the end of line (EOL) for clarity of the drawing, and (2) does not include the page footers, containing the page numbers, which are treated as removed from the document string in a pre-treatment process (operational block 206 of FIG. 2).

Relevant aspects of the document in this fact pattern include: (1) the sections and subsections belong to multiple hierarchies: (a) "TABLE OF CONTENTS", (b) "DEFINITIONS AND INTERPRETATIONS", (c) "LEASE AGREEMENT", (which is the master hierarchy of the contract), and (d) "GENERAL"; (2) subsection identifiers with a mixed numbering system (i.e., Roman numerals and decimal) are utilized in the hierarchy "GENERAL"; (3) two nesting levels of subsections are present in section "5" of the hierarchy "LEASE AGREEMENT"; (4) two numbered lists are present, the first in section "B)" of "DEFINITIONS AND INTERPRETATIONS", and the second in section "1" of "LEASE AGREEMENT"; (5) a sequence of numbers susceptible to false identification as an eligible marker sequence is present in section "3" of "LEASE AGREEMENT"; and (6) the internal reference "clause 3" to the section "3" of "LEASE AGREEMENT" is present in section "C)" of "DEFINITIONS AND INTERPRETATIONS".

The sequence of numbers susceptible to false identification as an eligible marker sequence, discussed in the immediately prior paragraph as point (5), includes (a) the number "1" in "Sep. 1, 2017", (b) the number "2" in "continue for 2 year/s", and (c) the number "3" in "and 3 months".

The expected result of this fact pattern is the correct identification of: (i) the hierarchies and the sections and subsections (where they exist) related to each of the hierarchies, described as relevant aspect (1) two paragraphs prior; (ii) the master hierarchy mentioned in relevant aspect (1) two paragraphs prior; and (iii) the two numbered lists described as relevant aspect (4) two paragraphs prior.

This fact pattern uses an alternative version of the first identifying procedure of operational block 208 described below. In the alternative version of the first identifying procedure, block 320 of FIG. 3 is replaced by a block 320A, in which the result of the test is positive if (1) "cM" is in the second marker form for the sequence array "mS[i]", and (2) the marker enclosure of "cM" is equal to the marker enclosure(s) of the marker(s) of the sequence array "mS[i]"—hereinafter the condition described at point (2) of this paragraph is referred to as "uniformity closure condition". In other words, in the alternative version of the first identifying procedure a marker is appended to a marker sequence only if the marker has the same marker enclosure of the other markers that are already present in the marker sequence.

It is noted that in certain input documents—such as the document of FIG. 5—, the uniformity closure condition is generally too selective to produce the best results. In greater detail, if the alternative version of the first identifying procedure was utilized to process the document string generated from the sample document in FIG. 5 in the first fact pattern of Example 1, the marker "3" would not be added to the sequence array "mS[0]" because, due to a document error in the document of FIG. 6, the marker is written as "3"—lacking a period punctuation in the phrase "Sction 3"—instead of "3.". Thus Example 1 would incur misinterpretations. Nevertheless, certain embodiments of the invention (e.g., working in scenarios in which the sources of the document strings are considered sufficiently guaranteed against the presence of document errors) may utilize the uniformity closure condition in the identifying procedure in order to, for example, achieve better performances by excluding from the marker sequence set some marker sequences that do not identify any hierarchy or numbered list in the document.

This fact pattern uses the alternative version of the first identifying procedure of operational block 208, whose output is illustrated in Table 4.

TABLE 4 mS[ 0 ] = ["1", "2", "3"];
mS[ 1 ] = ["1", "2", "3"];
mS[ 2 ] = ["1.", "2.", "3.", "4.", "5.", "5.1.", "5.1.1.", "5.1.2.", "5.2.", "6."];
mS[ 3 ] = ["I.", "II."];
mS[ 4 ] = ["A)", "B)", "C)"];
mS[ 5 ] = ["i)", "ii)", "iii)", "iv)"];
mS[ 6 ] = ["1.", "2.", "3.", "4.", "5.", "5.1.", "5.1.1.", "5.1.2.", "5.2.", "6."];
mS[ 7 ] = ["a)", "b)"];
mS[ 8 ] = ["1", "2", "3"];
mS[ 9 ] = ["I.", "II.", "II.1.", "II.2.", "III.3."].

The content of the array "mS" of Table 4 is described in details below.

A sequence with the markers of a first set of page numbers of the table of contents (corresponding to the page numbers of the entries "DEFINITIONS AND INTERPRETATIONS", "1. Parties" and "6. Payments" in the table of contents) is stored in the first sequence array of "mS"—i.e., "mS[0]".

In the second sequence array—i.e., "mS[1]"—, an additional sequence with the markers of a second set of page numbers of the table of contents (corresponding to the page numbers of the entries "LEASE AGREEMENT", "1. Parties" and "6. Payments") is stored.

The markers of the entries of the table of contents between the entries "LEASE AGREEMENT" and "GENERAL" are stored in "mS[2]".

The markers of the entries of the table of contents subsequent to the entry "GENERAL" are stored in "mS[3]".

The markers of the hierarchy "DEFINITIONS AND INTERPRETATIONS" in the body of the document are stored in the subsequent sequence array "mS[4]".

The markers of the numbered list in the section "B)" of the hierarchy "DEFINITIONS AND INTERPRETATIONS" are stored in "mS[5]".

The sequence related to the hierarchy "LEASE AGREEMENT" in the body of the document is stored in "mS[6]".

The sequence array subsequently stored—i.e., "mS[7]"—identifies the markers of the numbered list of the parties of the agreement (in the section "1." of the hierarchy "LEASE AGREEMENT").

The markers related to the sequence of numbers mentioned in the point (5) of the relevant aspects of the document are stored in the subsequent sequence array "mS[8]".

The sequence of the markers of the hierarchy "GENERAL" in the body of the document is stored in the last sequence array "mS[9]".

If the hierarchy function were to be implemented with criteria similar to the criteria described above that used the best-fit function, a potential for generating errors would exist, especially in recognizing the sequence array "mS[6]"—related to the hierarchy "LEASE AGREEMENT"—as the master hierarchy. This tendency to false interpretation is because (1) the marker contents of the markers in the sequence array "mS[6]" are exactly the same as the ones in the sequence array "mS[2]", related to the "LEASE AGREEMENT" entries of the table of contents, and (2) the hierarchy values, calculated utilizing the eligibility functions of any of the implementations described hereinbefore, are equal for both sequence arrays, "mS[2]" and "mS[6]".

For example, if the implementation of "bFF" of Example 1 is used as hierarchy function, it turns out that bFF(mS[2])=bFF(mS[6]), since the number of elements in the sequence array "mS[2]" is same as that of "mS[6]", i.e., TNM(mS[2])=TNM(mS[6])=10. In this latter case, the criterion of returning the last marker found—adopted in Example 1—returns the correct result of identifying "mS[6]" as master hierarchy, since the array index of "mS[6]" is greater than that of "mS[2]". If the implementation of "bFF" of Example 2—based on the index of homogeneity or the maximum pre-characters number—is used, it turns out that IHLP(mS[2])=IHLP(mS[6]) and MPN(mS[2])=MPN(mS[6]), since both the line position and the immediately preceding characters of each section marker in "mS[2]" are the same of the corresponding section marker in "mS[6]". Consequently, the master hierarchy "mS[6]" cannot be correctly identified with embodiments according to Example 2.

Example 5

Example 5 is a modified version of Example 4, set forth above. This Example 5 describes a hierarchy function to show the generality of embodiments of the invention, which include numerous alternative implementations and embodiments. This Example 5 also shows that the embodiments' efficiency generally increases with the complexity of the eligibility calculation.

The hierarchy function in Example 5 returns a weighted average of (1) the total number of initial markers in a marker sequence (hereinafter "initial marker number"), having no visible character between the end of line immediately preceding each of the initial marker and the initial marker itself; and (2) a coefficient of uniform occupancy (hereinafter "uniform occupancy coefficient") of the marker sequence in the document string. The uniform occupancy coefficient (a) is calculated for marker sequences of at least two markers, (b) tends to 1 for the marker sequences having evenly distributed markers across the length of the document string, and (c) tends to 0 for the marker sequences having markers concentrated around one position in the document string.

Furthermore, Example 5 assumes that (1) the weights of the weighted average of the hierarchy function are pre-assigned with adequate values; and (2) for the calculation of the uniform occupancy coefficient, the length of repeated dots in the table of contents is not taken into account. Disregarding the length of repeated dots does not affect the generality of embodiments according to Example 5, since the repeated dots are in a category of graphic elements commonly used and thus easy automatically recognize in document strings.

Fact Pattern Used to Illustrate Example 5

The below-described fact pattern illustrates the performance of the Example 5, using the same document (FIG. 14) of fact pattern used to illustrate Example 4 as the source of the document input string. In this fact pattern, the output of operational block 208 is the same as the output of operational block 208—i.e., the sequence arrays of Table 4.

Analyzing the values of the operands of the weighted average WA of the hierarchy function of the Example 5 applied to the document in FIG. 14, it turns out that the initial marker number IMN of the marker sequences related to "mS[0]", "mS[1]", "mS[5]", "mS[7]", and "mS[8]" of Table 4 is "0". The initial marker number of "mS[2]", "mS[3]", "mS[4]", "mS[6]", and "mS[9]" of Table 4 is equal to the total number of markers in each marker sequence—and consequently "mS[2]" and "mS[6]" have the greatest values of IMN. Thus, with adequate values pre-assigned to the weights and the threshold "hTH", described in detail below, a hierarchy value of each of the former group of marker sequences is greater than the hierarchy value of each of the latter.

Furthermore, if WA(mS[2]) is compared to WA(mS[6]), it turns out that (1) the initial marker number is equal for the two sequence arrays, i.e., IMN(mS[2])=10 and IMN(mS[6])= 10; and (2) the value of the uniform occupancy coefficient UOC of "mS[6]" is greater than the one of "mS[2]", as shown hereinafter in this paragraph. Assuming for this fact pattern that an occupancy substring of a marker sequence is the shortest substring of the document string that contains the markers of the marker sequence, it turns out that (a) the markers in "mS[2]" are evenly distributed along the occupancy substring of "mS[2]", (b) the markers in "mS[6]" are evenly distributed along the occupancy substring of "mS[6]", and (c) the occupancy substring of "mS[6]" is longer than the occupancy substring of "mS[2]" (given that the repeated dots of the table of contents of the document in FIG. 14 are not taken into account in the calculation of the length of the occupancy substring). Consequently, the hierarchy value of "mS[6]" returned by the hierarchy function is greater than the hierarchy value of "mS[2]".

Figures 30, 31:
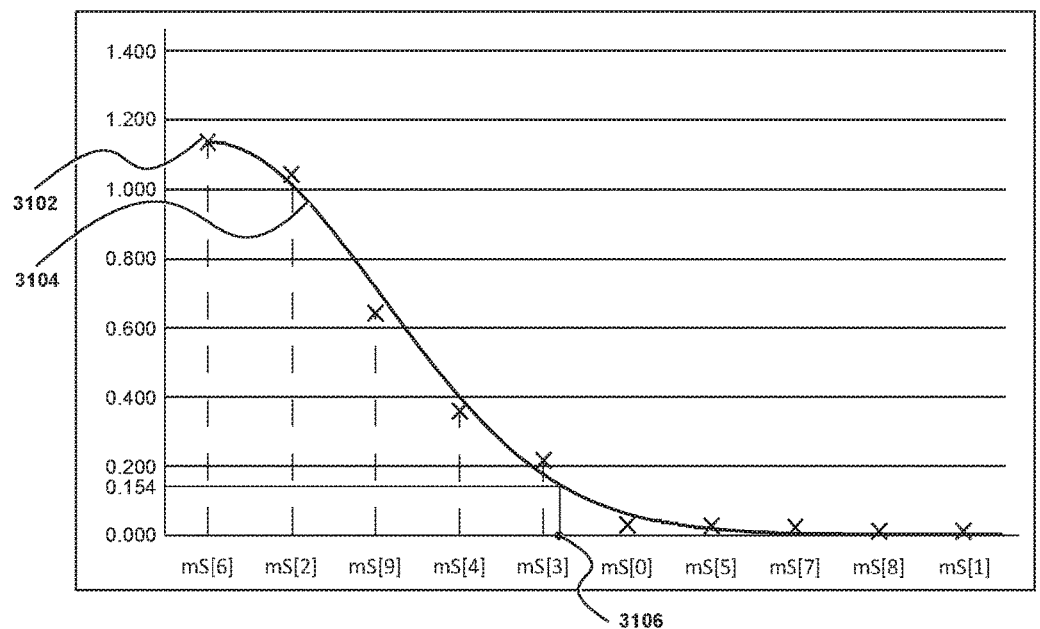
FIG. 30 is a table illustrating examples of intermediate-calculation values utilized by embodiments of the invention that process while processing the fifth sample input document string.
FIG. 31 is a graph illustrating intermediate-calculation aspects of an example of implementation of an adaptive threshold calculation technique.

Examples of values of the weighted average WA are depicted in the table of FIG. 30, wherein it is assumed that (1) the weight of IMN in the weighted average is assigned the value 0.1, (2) the weight of UOC is assigned the value 0.9, and (3) the threshold "hTH" is assigned the value 0.1. Namely, in each row under the heading of table of FIG. 30 are depicted (i) the values of the weighted average WA (which is calculated between IMN and UOC), (ii) the total number of markers TNM, (iii) the initial marker number IMN, (iv) the uniform occupancy coefficient UOC, and (v) a number of intermediate values utilized in order to calculate UOC—described in details hereinafter—, for each marker sequence of this fact pattern. In greater details, UOC is the result of the multiplication of (1) an occupancy character coefficient OCC, by (2) a uniformity coefficient UC of each marker sequence. The value of OCC is the result of the division of (i) the length OSL of the occupancy substring of the marker sequence in a pre-worked document string, by (ii) the total number of characters TNC of the pre-worked document string (i.e., 2,056), wherein the pre-worked document string is obtained by removing the repeated dots in the table of contents from the document string in FIG. 14. The value of UC is a coefficient which is calculated as the integer number "1" less the average of the offset coefficients OSC—described hereinafter—of the inner markers of the marker sequence, wherein an inner marker of a marker sequence SQ is a marker (a) subsequent to the first maker, and (b) antecedent to the last marker of SQ. The offset coefficient OSC of an inner marker MJ of the marker sequence SQ is calculated as OSC(SQ, J)=ABS(EDL(SQ)*J−(PM(SQ, J)−PM(SQ, 0)))/EDL(SQ), wherein (1) ABS is the absolute value function; (2) an evenly-distributed length EDL(SQ) is calculated as EDL(SQ)=OSL(SQ)/(TNM(SQ)−1), where (2-a) OSL(SQ) is the length of the occupancy substring of SQ in the pre-worked document string, and (2-b) TNM(SQ) is the total number of markers in SQ; (3) J is the zero-based index of MJ in SQ; and (4) the function PM(SQ, h) returns the position of the h-indexed marker—where the index "h" is intended to be zero-based—of the marker sequence SQ in the pre-worked document string. In other words, the offset coefficients OSC are proportional to the distance between (i) the positions of the inner markers of a marker sequence, and (ii) the positions the corresponding inner markers of an evenly distributed marker sequence having the same occupancy substring of the marker sequence. It is noted that if the total number of markers of a certain marker sequence is equal to 1 or 2, it is assumed that UC=1.0 for that marker sequence.

For example, the values related to "mS[9]" in the table of FIG. 30 are calculated as described below.

TNM(mS[9])=5, given that sequence array "mS[9]" has five elements.

IMN(mS[9])=5, given that each marker related to the sequence array "mS[9]" has no visible character between the end of line immediately preceding each of the initial marker and the initial marker itself.

OSL(mS[9])=500, because the occupancy substring of "mS[9]" is 500 character long, where (i) the occupancy substring of "mS[9]" starts at the beginning position of the marker "I." and ends at the ending position of the marker "II.3." in the pre-worked document string, and (ii) each EOL in the occupancy substring is counted as 1 character long.

The value 0.243 of OCC(mS[9]) is the result of the division of OSL(mS[9]) by TNC—i.e., 2,056.

The value 0.643 of UC(mS[9]) is the result of UC(mS[9])=1−AVG (OSC(mS[9], 1), OSC(mS[9], 2), OSC(mS[9], 3)), where (1) AVG is the average—i.e., the arithmetic mean—function, and (2) OSC(mS[9], 1), OSC(mS[9], 2), and OSC(mS[9], 3) are the offset coefficients respectively of the inner markers "II.", "II.1.", and "II.2.", whose calculation is described in details below.

Namely, (a) OSC(mS[9], 1)=ABS(EDL(mS[9])−(PM(mS[9], 1)−PM(mS[9], 0)))/EDL(mS[9]); (b) OSC(mS[9], 2)=ABS(EDL(mS[9])*2−(PM(mS[9], 2)−PM(mS[9], 0)))/EDL(mS[9]); and (c) OSC(mS[9], 3)=ABS(EDL(mS[9])*3−(PM(mS[9], 3)−PM(mS[9], 0)))/EDL(mS[9]). It turns out that (i) EDL(mS[9])=OSL(mS[9])/(TNM(mS[9])−1), i.e., EDL(mS[9])=125.0; (ii) PM(mS[9], 1)−PM(mS[9], 0)=145; (iii) PM(mS[9], 2)−PM(mS[9], 0)=173; and (iv) PM(mS[9], 3)−PM(mS[9], 0)=338. By replacing the values of the functions EDL and PM in the expressions (a), (b) and (c) above, it turns out that OSC(mS[9], 1)=0.160, OSC(mS[9], 2)=0.616, OSC(mS[9], 3)=0.296, and that the average of these three OSC values is 0.357.

UOC(mS[9])=OCC(mS[9])*UC(mS[9]), i.e., UOC(mS[9])=0.156.

WA(mS[9])=0.1*IMN(mS[9])+0.9*UOC(mS[9]), i.e., WA(mS[9])=0.641

Consequently, (1) the marker sequences related to "mS[2]", "mS[3]", "mS[4]", "mS[6]", and "mS[9]" of Table 4 are correctly interpreted as hierarchy marker sequences by embodiments of the invention that implement Example 5—given that the hierarchy values of WA calculated for said marker sequences are greater or equal than the threshold "hTH", i.e., 0.1—, whereas the other marker sequences related to "mS[0]", "mS[1]", "mS[5]", "mS[7]", and "mS[8]" of Table 4 are not identified as such; and (2) the marker sequence related to "mS[6]" is identified by Example 5 as the master hierarchy, given that said marker sequence has the greatest hierarchy value of WA—i.e., 1.139—among the hierarchy marker sequences.

Examples 6 and 6-B—for Numbered Lists

As a further proof of the generality of embodiments of the invention, an ability to correctly identify numbered lists in a document can be conferred merely by a modification of the eligibility calculation.

Example 6 is a modified version of Example 5, set forth above. In Example 6, the numbered list value of block 218 of FIG. 2 is calculated through the numbered list function nLF as an index based on the number of characters in common at the beginning and at the end of each sequential marker (hereinafter "common characters index"). The common characters index, for example, is zero (0) if the marker sequence includes the markers "1", "2" and "3", i.e., having no characters in common. The common characters index, for example, is equal to 2 if the marker sequence includes the markers "(a)", "(b)" and "(c)", since these markers have the characters, "(", at their beginning, and ")", at their end, in common.

Example 6-B is a modified version of Example 6 described in the immediately prior paragraph. Differently from Example 6, Example 6-B is utilized to identify numbered lists in a document without identifying its sections and subsections.

A modified flow 200-B utilized in Example 6-B is similar to flow 200 of FIG. 2, where (1) blocks from 202 to 212 are equivalent to blocks from 202-B to 212-B, and (2) blocks from 218 to 230 are equivalent to blocks from 218-B to 230-B of flow 200-B. In other words, blocks 214 and 216 are omitted from flow 200-B, so that said flow 200-B, after the initializing performed in block 212-B, passes to block 218-B, in which a numbered list function "nLF" returns the eligibility value of the marker sequences, analogously to flow 200. Yet analogously to flow 200, if the result of the test performed in 218-B is positive, the flow 200-B passes to block 220-B, otherwise it passes to block 222-B.

Fact Pattern Used to Illustrate Example 6

Example 6 can be applied to the document in FIG. 14 to identify the numbered lists present therein. Per the description of the flow 200 of FIG. 2, only the marker sequences that have not been identified as hierarchy marker sequences are candidates for identification as numbered list marker sequences. Given that, in this example, the marker sequences related to "mS[2]", "mS[3]", "mS[4]", "mS[6]", and "mS[9]" of Table 4 are interpreted as hierarchy marker sequences, the marker sequences related to "mS[0]", "mS[1]", "mS[5]", "mS[7]", and "mS[8]" of Table 4, are candidates for identification as numbered list marker sequences.

Among these marker sequences, the numbered list value returned by the numbered list function is greater for the marker sequences related to "mS[5]" and "mS[7]", whose common characters index is 1, since each ends with ")", than the numbered list values returned for the marker sequences related to "mS[0]", "mS[1]" and "mS[8]", whose common characters index is 0.

Therefore, assuming an adequate value pre-assigned to the threshold "nLTH" (e.g., 1), the set of operations executed in Example 6 correctly discriminates between the marker sequences related to "mS[5]" and "mS[7]", identified as numbered lists, and the remaining marker sequences.

Once that the marker sequences of the hierarchies—with the related sections and subsections—and of the numbered lists are identified, the internal reference "clause 3" of the document in FIG. 14 is identified through an Example 7 that includes a technique for identifying the internal references, described below.

Example 7—Internal Reference Identification

Example 7 is a modified version of Example 6, set forth above. As well as the identifying of hierarchy(s) and numbered list(s) as in Example 6, Example 7 identifies as internal references a number of reference substrings of the document string. For this Example, each reference substring must not be an eligible sequential marker, such as a marker of a hierarchy marker sequence or a numbered list marker sequence. Also, each reference substring must be equal to (1) a marker content of, or (2) a trimmed marker of an eligible sequential marker.

A reference substring array "rSA"—which includes the reference substrings—is obtained by (1) storing in a "cMA" array the candidate markers "cM" encountered by (1-a) block 308 of FIG. 3, and (1-b) block 408 of FIG. 4 in the first and second identifying procedure; and (2) storing in "rSA", after that the eligible marker sequence(s) are selected, the marker(s) "cME" of the array "cMA" that verify the reference conditions below. The reference conditions include (i) the marker "cME" is not included in any eligible marker sequence(s); and (ii) the marker content of "cME" is equal to (ii-1) a marker content of, or (ii-2) a trimmed marker of at least a referred marker "rM" of an eligible marker sequence.

It is noted that Example 7 additionally recognizes strings that are not intended to act as strings to be internal references. This situation, or defect, can be tolerated in some embodiments. For example, Example 7, if applied to the document in the FIG. 14, correctly-interprets reference "clause 3" in the section "C)" of "DEFINITIONS AND INTERPRETATIONS". However, Example 7, when applied to the document in the FIG. 14, also misidentifies as internal references some of the page numbers on the table of contents and the markers related to sequence array "mS[8]" of Table 4.

In other words, Example 7 can incur in false positive results. Such false positives include text of the document string not intended by the writer of the document to be internal references, but may be misidentified by the technique of Example 7 as such.

Example 8—Internal Reference Identification

Example 8 is a modified version of Example 7, set forth above. Example 8 identifies the internal references without incurring false positive results. Just as in Example 7, each reference substring must not be an eligible sequential marker, such as a marker of a hierarchy marker sequence or a numbered list marker sequence. Also as in Example 7, each reference substring must be equal to (1) a marker content of, or (2) a trimmed marker of an eligible sequential marker. In addition, for this Example 8, each reference substring must be immediately preceded by a keyword of a predefined cross-language reference keyword list. Some examples of items in the keyword list are "section", "article", "articulo", "clause" and "sezione". In other words, in this Example 8 a further third reference condition is added, where the third reference condition is verified if the marker "cME" is immediately preceded by a string that is included in a predefined reference keyword array "rKA".

Applying Example 8 to the document in FIG. 14, only the internal reference "clause 3" is correctly identified, whereas the false positive results of Example 7 are not.

Fact Pattern Used to Illustrate Example 5, 6, and 8—User Interface

Figure 15:
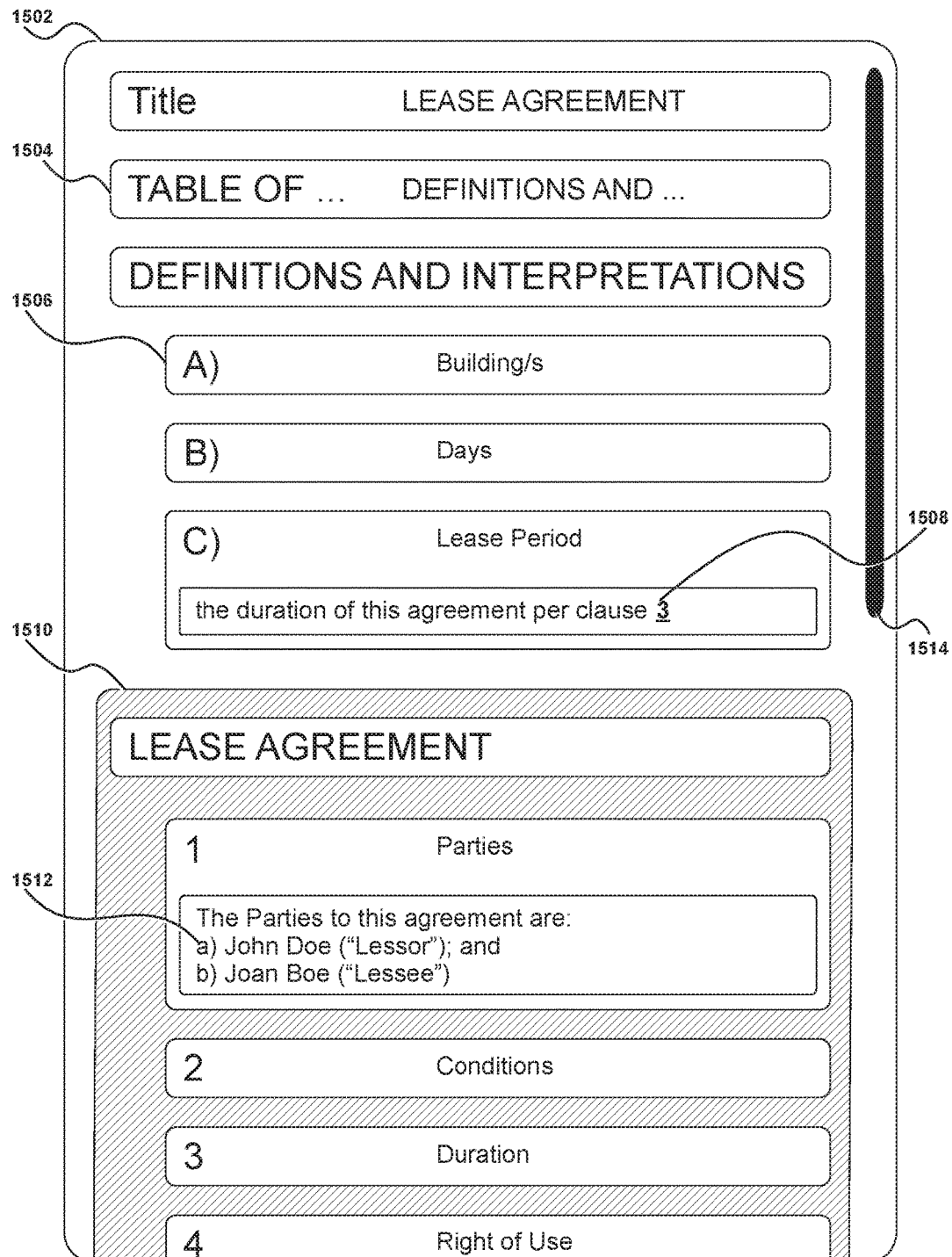
FIG. 15 illustrates an example visualization of an output of a computer application implementing embodiments of the invention that process the fifth sample input document string.

Examples 5, 6, and 8 may be visualized using a user interface, such as that illustrated in FIG. 15. The output screen 1502 of FIG. 15 was produced by operations running on a computer or other processor that receives (1) the output data of this fact pattern related to the section hierarchies, and (2) the internal reference data identified by Example 8.

The output screen 1502, which may be an example screen of a mobile phone, personal computer, or other visualization device, includes a number of hierarchies identified in the output data, as displayed in panels as element 1504. A number of sections identified are displayed in panels as element 1506, which are shorter in width than panel 1504. The hierarchy "GENERAL" with its sections and subsections as well as Section "6" of the hierarchy "LEASE AGREEMENT" are not shown in FIG. 15 due to space constraints. Also, the title of the document in FIG. 15 is displayed in a panel at the top of the screen 1502. Each panel, except the one with the title, can be displayed in a collapsed and expanded form analogously to the visualization depicted for FIG. 13.

FIG. 15 illustrates that the panel related to the hierarchy having the initial marker caption "TABLE OF . . . " is collapsed. The panels, related to the hierarchies with the initial marker captions "DEFINITIONS AND INTERPRETATIONS" and "LEASE AGREEMENT" are expanded, meaning that sub-panels falling under the captions appear on the screen 1502. The panels related to the sections "C)" of "DEFINITIONS AND INTERPRETATIONS" and to the section "1." of "LEASE AGREEMENT" are further expanded. The panels related to the sections "A)" and "B)" of "DEFINITIONS AND INTERPRETATIONS", and to the sections "2.", "3.", "4." and "5." of "LEASE AGREEMENT" are collapsed. In the body of the section "C)", an internal reference to the section "3." of "LEASE AGREEMENT" is rendered as a link, as indicated in 1508. The master hierarchy "LEASE AGREEMENT" is displayed in a colored (or otherwise distinctive) panel, as indicated in 1510, for example, to make the master hierarchy stand out from the other panels. The numbered list of the parties in the section "1." of the hierarchy "LEASE AGREEMENT" is displayed in an extended form, as indicated in 1512. The colored panel of the master hierarchy is partially cut out the device screen 1502, and the reader can visualized the content hidden, for example, through a scroll action on the scroll bar 1514.

If the reader performs an action on the link in block 1508, the application automatically performs the following operations: (a) if the hierarchy "LEASE AGREEMENT" is collapsed, the hierarchy is switched to the expanded form; (b) if section "3." is collapsed, section "3." is expanded; (c) if section "3." is out of the view, section "3." is brought back into view; and (d) section "3." is highlighted with a color different (or otherwise distinguishable) from the background for a few seconds, or other time period, after the action of the reader.

Example 9

Figure 27:
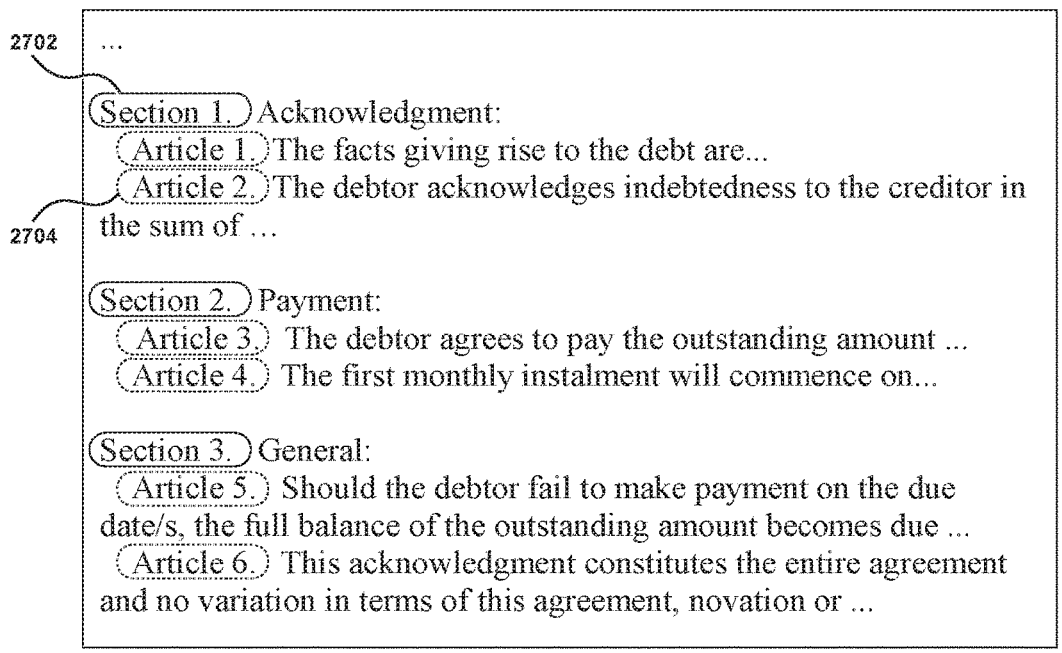
FIG. 27 is a representation of an extract of an eighth sample document that may be processed using embodiments of the invention.

Example 9, which is a modification of Example 4, shows the generality of embodiments of the invention when processing documents in which the markers of the subsections (hereinafter "subsection markers") follow a consecutive numeration across the section markers. The extract of document in FIG. 27 shows an example of subsection markers (which are immediately preceded by the word "Article") that follow a consecutive numeration across the section markers (which are immediately preceded by the word "Section"). In the FIG. 27, the occurrences of word "Section" followed by the section markers are outlined by solid outlines such as 2702, whereas occurrences of "Article" followed by the subsection markers are outlined by dashed outlines such as 2704. The structure of sections and subsections of the extract is the following: "Section 1." has two subsections "Article 1." and "Article 2."; "Section 2." has two subsections "Article 3." and "Article 4."; and "Section 3." has two subsections "Article 5." and "Article 6.".

The hierarchy function of Example 9 returns a weighted average of (1) the index of homogeneity of the line positions; and (2) the uniform occupancy coefficient. Example 9, after identifying the hierarchy marker sequences, uses a hierarchy combining technique described in this paragraph. The hierarchy-combining technique first detects if a positional overlap condition applies to two or more hierarchy marker sequences, wherein the positional overlap condition is verified for two marker sequences S1 and S2 if the position of at least one marker of S1 is between the position of two markers of S2. If the positional overlap condition is verified for two hierarchy marker sequences S1 and S2, the hierarchy combining technique combines the markers of S1 and S2 basing on their position so that to obtain a third hierarchy marker sequence S3, which includes the markers of S1 and S2.

When subsection markers follow a consecutive numeration, an implementation of the congruence function is based on the marker positions—instead of on the dot-notation of the marker contents as described in the Examples hereinbefore—to retrieve the relationships between the consecutive couples of markers of S3.

For example, if embodiments of the invention according to Example 9 processes a document having the extract as illustrated in FIG. 27—assuming that (a) the weights of the weighted average of the hierarchy function, and (b) the threshold "hTH" are pre-assigned with adequate values—, the set of hierarchy marker sequences includes (i) a section marker sequence including the section markers, and (ii) a subsection marker sequence including the subsection markers. Namely, the section marker sequence includes the section markers "1.", "2.", and "3.", whereas the subsection marker sequence includes the subsection markers "1.", "2.", "3.", "4.", "5.", and "6."

Basing on the marker positions—e.g., position of subsection marker "1." is between positions of section markers "1." and "2."—, the positional overlap condition is verified for the section marker sequence and the subsection marker sequence. Thus, a combined marker sequence is obtained, the combined marker sequence comprising the markers "1." (section), "1." (subsection), "2." (subsection), "2." (section), "3." (subsection), "4." (subsection), "3." (section), "5." (subsection), and "6." (subsection). Then, the TSDS is generated using the congruence function mentioned two paragraphs prior. It is noted that the TSDS generated reflects the structure of sections and subsections of the extract of document in FIG. 27.

Fact Pattern Used to Illustrate Example 9

Figure 16:
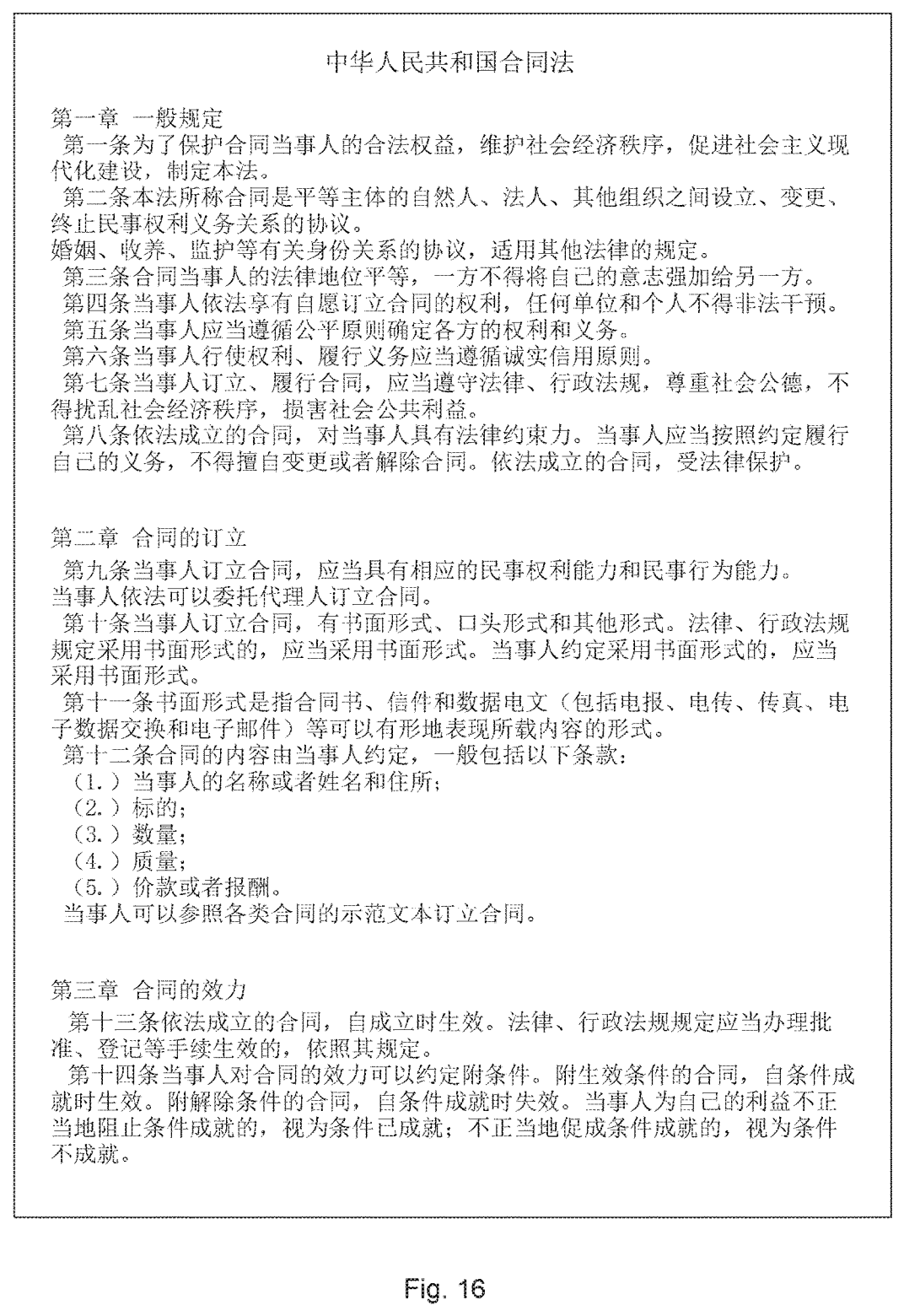

As a further example of processing a document with non-alphabetic character set, in this fact pattern a document string in Chinese Mandarin language—depicted as the sixth sample document of FIG. 16—is processed with embodiments of the invention according to Examples 9 and 6. A further peculiarity of the document illustrated in FIG. 16 is in its section/subsection structure—shown in 1802 of FIG. 18, wherein the document string is partially cut out with the cut line 1814 due to space constraints—, which comprises a number of subsection markers that follow the consecutive numeration across the section markers. Solely for explanatory purposes rather than limitation, each Chinese logogram is assumed to take up one position of the input document string of Example 9.

Figure 18:
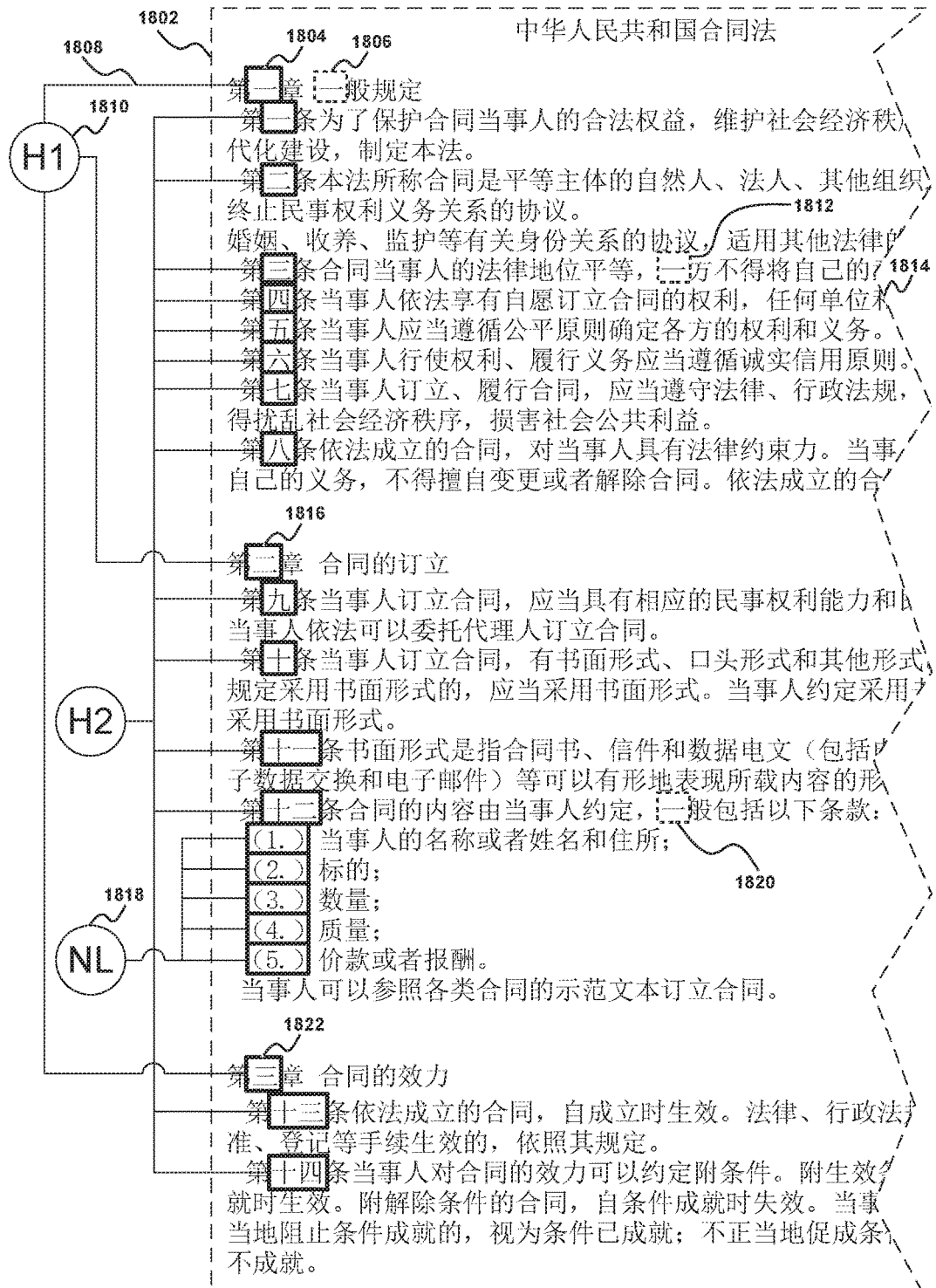
FIG. 18 is a representation of an example result of the processing of the sixth sample input document string according to embodiments of the invention.

In the document depicted in FIG. 18, the markers that identify (1) the sections, (2) the subsections, and (3) the numbered list of the document are outlined with solid marker outlines such as 1804. Furthermore, through connectors such as 1808, (i) the outlines of the section markers are connected with element "H1" (i.e., 1810), (ii) the outlines of the subsection markers are connected with element "H2", and (iii) the outlines of the markers of the numbered list (hereinafter "numbered list markers") are connected with element "NL" (i.e., 1818).

Embodiments of the invention according to Example 9 identify the marker sequences connected with "H1" and "H2" as hierarchy marker sequences, as described below.

The sequence arrays depicted in FIG. 17 are the output of the second identifying procedure, described above with reference to FIG. 4. In FIG. 17, each sequence array is depicted with a sequence table such as 1706, which differs from analogous representations of the sequence arrays in FIGS. 9, 10 and 11. Each sequence table illustrated in FIG. 17 includes (i) an identifier of the depicted sequence array (which is placed at the top), (ii) the marker contents of the markers of the sequence array (which are depicted in a left column), and (iii) a context superstring of the corresponding markers of the left column (which is depicted in a right column).

It is noted that the document illustrated in FIG. 16 follows a precisely-defined format with regards to the spaces preceding the markers, and for this reason (1) the section markers, (2) the subsection markers, and (3) the numbered list markers of 1706 can be distinguished one from the others by the human eye, even without knowing the Chinese Mandarin language. Namely, the context superstrings of the section markers (e.g., the string outlined by 1708) have no spaces at their beginning, whereas the context superstrings of the subsection markers (e.g. the string outlined by 1702) have a single space at their beginning. The context superstrings of the numbered list markers (e.g. the string outlined by 1710) can be distinguished from the other markers since they have two spaces at their beginning, and also because they include numeric characters. Lastly, the context superstrings of the markers not belonging to the marker categories of (a) section markers, (b) subsection markers, and (c) numbered list markers (e.g. the string outlined by 1704), can be distinguished from the other markers based on the presence of ellipses (i.e., " . . . ") at their beginning. Hereinafter, the markers not belonging to the marker categories listed in this paragraph are referred to as "text markers".

Some relevant aspects of the execution of the second identifying procedure (FIG. 4) and of its output are described below.

As illustrated in FIG. 17, the first sequence array "mS[0]" has (1) a section marker as first element of the array, and (2) a sequence of subsection markers as subsequent elements. The subsequent sequence array "mS[1]" has (1) the text marker 1806—outlined in FIG. 18—as first element, and (2) the same sequence of subsection markers of "mS[0]" as subsequent elements. On the other hand, sequence array "mS[2]" is entirely composed of a sequence of subsection markers. It is noted that the elements subsequent to the first element of the sequence arrays "mS[0]", "mS[1]" and "mS "[2]" are recognized of the second marker form and thus sequentially appended to said sequence arrays by the second identifying procedure.

Sequence array "mS[3]" is composed of the text marker 1812 and of two subsequent section markers. Similarly to "mS[3]", "mS[4]" is also composed of a text marker—which is not visible in 1802 due to space constraints—, and two subsequent section markers, which are the same section markers of "mS[3]".

With reference back to FIG. 4, when the flow 400 is applied to the document of FIG. 6, operational block 422 will, at the appropriate time, identify the section marker 1816 as according to the third marker form, and thus for each of a set of forked sequence arrays identified in FIG. 17—i.e., "mS[0]", "mS[1]" and "mS[2]"—a branch sequence array is appended to "mS". Namely, (1) branch sequence array "mS[5]" includes the first element of "mS[0]" and 1816, (2) branch sequence array "mS[6]" includes the first element of "mS[1]" and 1816, and (3) branch sequence array "mS[7]" includes the first element of "mS[2]" and 1816. In a further step of the execution, the section marker 1822 is appended to a set of sequence arrays including "mS[5]", "mS[6]" and "mS[7]". Consequently, "mS[6]" is entirely composed of section markers.

Lastly, sequence array "mS[8]" is composed of the single text marker 1820, and sequence array "mS[9]" includes the numbered list markers from "(1.)" to "(5.)".

Following Example 9, the hierarchy function returns a weighted average of (1) index of homogeneity of the line positions; and (2) the uniform occupancy coefficient.

Given that the values of the line positions of the markers are related with the precisely-defined format followed in the document, in the document illustrated in FIG. 16 (i) the line positions of the section markers is equal to 1, (ii) the line positions of the subsection markers is equal to 2, (iii) the line positions of the numbered list markers is also equal to 2, and (iv) the line positions of the text markers is greater than 2. Therefore, the greatest values of the index of homogeneity of the line positions are taken on by the sequence arrays entirely composed of a sequence of two or more markers of the same marker category, i.e., "mS[2]", "mS[5]", and "mS[9]".

From the definition of uniform occupancy coefficient, it turns out that the greatest values of uniform occupancy coefficient are taken on by the sequence arrays "mS[0]", "mS[1]", "mS[2]", "mS[5]", "mS[6]", and "mS[7]". Consequently, if the weights of the weighted average and the threshold "hTH" are pre-assigned with adequate values, the hierarchy marker sequences identified are related to "mS[2]" and "mS[5]", which are respectively represented by "H2" and "H1" in FIG. 18.

Figure 19:
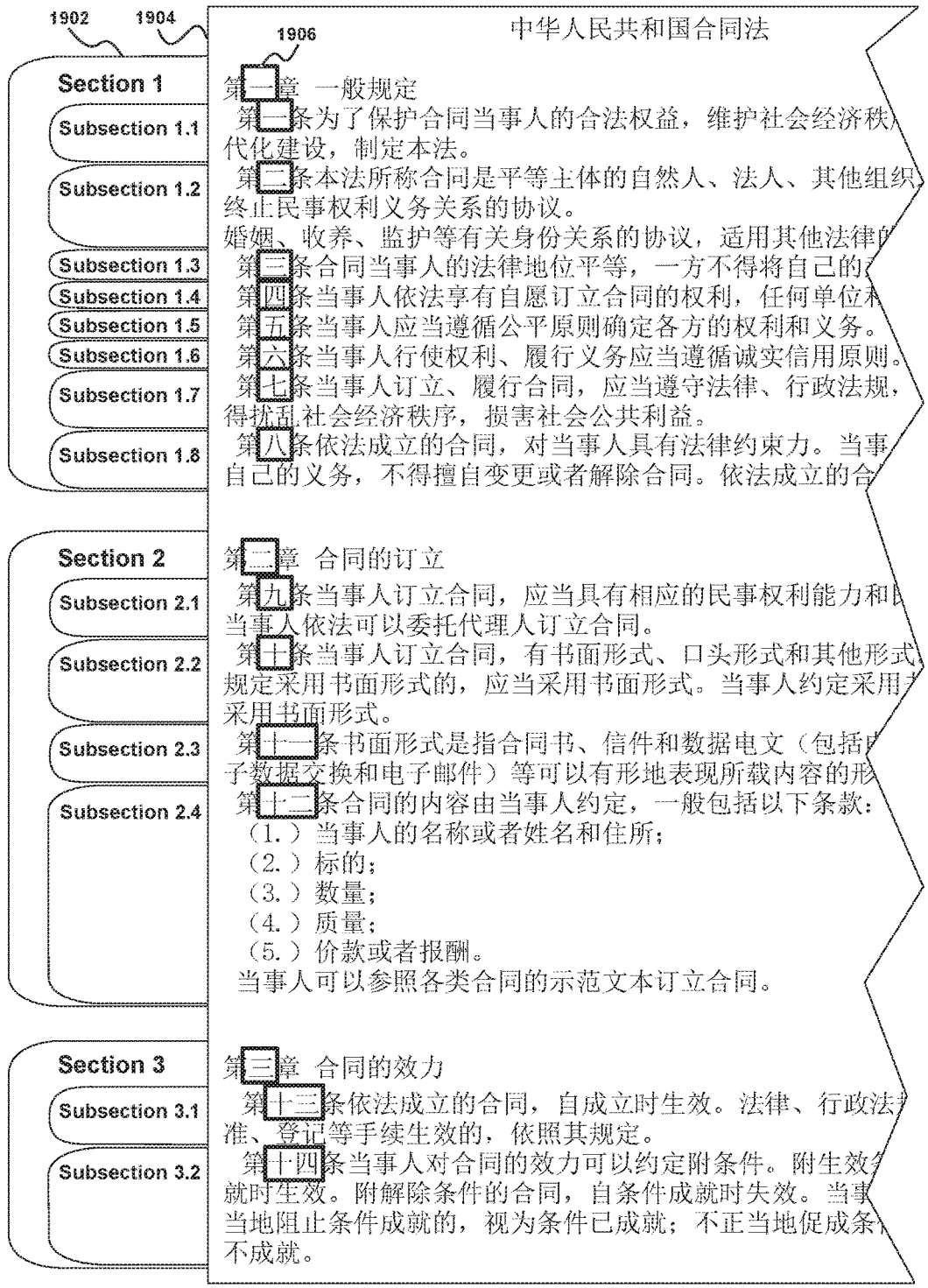
FIG. 19 is another representation of an example result of the processing of the sixth sample input document string according to embodiments of the invention.

Still following Example 9, the hierarchy combining technique detects that the positional overlap condition is verified for hierarchies "H1" and "H2", and then, basing on the marker positions, a combined marker sequence H3 is obtained. Subsequently, through a congruence function based on the marker positions, the TSDS depicted in FIG. 19 is generated. In FIG. 19, (1) the document of this Example 9 is shown in 1904, (2) the markers of the hierarchy marker sequences are outlined with outlines such as 1906, and (3) the TSDS is shown with section/subsection wrappers similar to element 1902. It is noted that, in FIG. 19, the sections and subsections of the TSDS are shown in decimal numbers and dot-notation solely for elucidative purposes.

Using embodiments of the invention according to Example 6, the numbered list function identifies the sequence array "mS[9]" as numbered list marker sequence, since its common characters index is greater than the common characters index of the other sequence arrays, given that the markers in the sequence array have the characters "(", at their beginning, and ")", at their end, in common. Thus, numbered list "NL"—depicted in FIG. 18—is correctly identified as numbered list marker sequence.

Example 10

Embodiments of the invention according to Example 10 use an adaptation of the eligibility calculation. Example 10 is analogous to Example 5, except that the threshold value "hTH" is calculated with the adaptive threshold calculation technique. In Example 5, the threshold value has a predefined constant value.

The adaptive threshold calculation technique may, for example, calculate the section threshold value by multiplying the maximum value of the eligibility values of the marker sequences by a predefined threshold coefficient.

For instance, consider where the adaptive threshold calculation technique is applied to the document in FIG. 14, wherein it is assumed that the eligibility values of the marker sequences of Table 4 are depicted in the column "WA" of the table of FIG. 30. In this example, the value of "hTH" is calculated by multiplying the maximum value of eligibility value in the table (i.e., 1.139, related to the marker sequence "mS[6]" of Table 4) by a pre-assigned factor equal to 0.1. The value of "hTH" thus obtained (i.e., 0.1139) leads to a correct identifying of the hierarchy marker sequences—i.e., the marker sequences related to "mS[2]", "mS[3]", "mS[4]", "mS[6]", and "mS[9]" of Table 4—, analogously as in the fact pattern that illustrates Example 5.

The adaptive threshold calculation technique may, for example, interpolate the eligibility values of the marker sequences with a curve from statistical distribution fitting a model of distribution of the eligibility values. The section threshold value is then calculated utilizing one or more parameter(s) of the curve.

In some embodiments, a statistical distribution curve may be employed to interpolate eligibility values within the adaptive threshold calculation technique. For instance, consider applying the adaptive threshold calculation to the document in FIG. 14 wherein the eligibility values of the marker sequences of Table 4 are still the WA values depicted in the table of FIG. 30. For example, in a first operation of an interpolating method, the marker sequences of FIG. 30 are sorted by their corresponding eligibility value WA in descending order. The marker sequences sorted as in the first operation are depicted in graph of FIG. 31 as elements similar to 3102, wherein (1) the marker sequence identifiers are represented in the X axis, and (2) the WA values of the corresponding marker sequences are the values of elements 3102 on the Y axis. Then, in a subsequent operation the WA values of FIG. 31 are approximately interpolated with a Normal Distribution function g(x), wherein it is assumed that the position on the X axis of "mS[6]" is 0.0, the position of "mS[2]" is 1.0, the position of "mS[9]" is 2.0, the position of "mS[4]" is 3.0, the position of "mS[3]" is 4.0, the position of "mS[0]" is 5.0, the position of "mS[5]" is 6.0, the position of "mS[7]" is 7.0, the position of "mS[8]" is 8.0, and the position of "mS[1]" is 9.0. The Normal Distribution function g(x)—of which an approximate representation is depicted with the line 3104 of FIG. 31—has (1) a normalizing factor equal to 6.0, (2) a mean equal to 0.0, and (3) a standard deviation SD equal to 2.1. A notable value on the X axis is NVX=2*SD—depicted with the point 3106 of FIG. 31—, such that approximately 95.44% area under g(x) is contained between the X values of 0.0 and NVX. In yet a subsequent operation, the value of the Normal Distribution function calculated in NVX—i.e., g(NVX)—is assigned to "hTH". Said value of "hTH"—i.e., approximately 0.154—, still leads to a correct interpretation of the hierarchy marker sequences.

In yet another alternative, results comparable to those described in the immediately preceding paragraph can be achieved with an alternative technique, which is a simplification of those above. In this alternative, the value of "hTH" is calculated by multiplying the arithmetic mean of the WA values (i.e., approximately 0.349) by a pre-assigned coefficient (e.g., 0.45). The value of "hTH" obtained through said alternative technique—i.e., 0.157—is close to the "hTH" value obtained in the immediately prior paragraph, thus it also leads to a correct interpretation of the hierarchy marker sequences.

Application to Documents in HTML Format

Embodiments of the invention can be applied also to document strings in HTML format, given certain modifications to support a HTML document string. One such modification is that the entities "line" and "EOL" are re-defined according to the HTML standards, e.g., to take account of the HTML tags "br", "p" and "div". A further HTML modification is that the index of homogeneity, the maximum pre-characters number, and the uniform occupancy coefficient are calculated on a second document string obtained from the input document string. Obtaining the second document string from the input document string involves (a) scanning the input document string to identify certain HTML tags, elements, and attributes; and (b) if any HTML tag, element, or attribute is found, removing all found from the second document string.

Comparison with the Methods to Date

Unlike known methods of document analysis, embodiments of the invention include unconventional and innovative approaches to the problem of identifying the sections and subsections in a document. As described above, some embodiments of the invention include (1) identifying a number of marker sequences of a document string (instead of identifying single markers as in the methods to date), and (2) performing—in phases separated from the identifying of the prior point (1)—the selection of one or more eligible marker sequences.

In order to show, by comparison, the improvements of the inventive methods over known methods, a first and a second marker-lookup methods—both based on interpretations of the methods to date—are described hereinafter. Particularly, the performances of said marker-lookup methods when processing the document string of FIG. 5—in terms of time complexity and of correctness of the result—are compared with the performances of embodiments of the invention in accordance with Example 1 when processing the same document string.

In FIG. 22, an illustration of the processing of certain key steps of the marker-lookup methods is depicted. In a marker-identifying step of the first marker-lookup method, the markers at the beginning of the lines are identified as potential markers. The page numbers, such as the ones marked with the shape 2208, are excluded from the list of potential markers using a page-excluding technique. In a subsequent marker-grouping step of the first marker-lookup method, similar potential markers—i.e., potential markers that are similar to each other—are grouped together in marker group(s). Then, in a further marker-sequencing step, sequences of markers are identified in the marker groups. Finally, in a structure-identifying step, the markers of the sequences of markers are combined together to produce a marker structure.

A limitation of the first marker-lookup method when processing the document of FIG. 5 is in the concept of potential marker. Due to the restriction that the potential markers identified in the marker-identifying step are at the beginning of the lines of the document, in the marker-lookup methods the definition of marker is extended in order to correctly identify also the markers immediately preceded by keywords—e.g., "Section", "Article", etc.—commonly used in sectioned documents (hereinafter such markers are referred to as "compound markers"). Assuming that such keywords are memorized in a predefined keyword table used in the marker-lookup methods, in this example the marker 2212, which is immediately preceded by the word "Sction" (affected by a document error), is not identified as a marker by the first marker-lookup method. Thus, said method, if applied to FIG. 5, does not provide the correct result.

A second marker-lookup method comprises the same steps of the first marker-lookup method with a modification to the assumption of the keywords memorized in the pre-defined keyword table, in order to overcome the issues that lead to the misinterpretation of the first marker-lookup method. In the marker-identifying step of said second marker-lookup method, a word-position rule is used to identify the compound markers, i.e., a compound marker is identified as potential marker if any single word is between (1) the marker of the compound marker, and (2) the beginning of the line containing the marker. With this second method, the markers outlined with the outlines similar to 2204 are identified as potential markers, including the marker "Feb. 1" outlined by 2202. A page-excluding technique, that excludes the page numbers from the potential markers, is also used in the second marker-lookup method.

A similarity technique is used in the marker-grouping step of the marker-lookup methods. This similarity technique recognizes the markers "Section 1.", "Section 2." and "Sction 3" as similar markers and groups them in a first marker group. Furthermore, the same technique groups together the markers "1.1" (i.e., marker 2206), "1.2", "1.1" (i.e., marker 2210), "2.1", "2.2", "3.1", and "3.2" in a second marker group. Lastly, the similarity technique assigns (1) the marker "Feb. 1" to a third marker group, and (2) the markers "i)" and "ii)" to a fourth marker group.

In the marker-sequencing step, sequencing techniques identify group sequences in the first, the second, and the fourth marker groups. It is noted that the group sequence identified in the second marker group includes the markers of the second marker group excluding marker 2210.

Finally, in the structure-identifying step, a constructing technique combines at least the markers of the first marker group together with the markers of the second marker group, so as to identify the structure depicted in FIG. 23 with shapes such as 2302.

Figure 24:
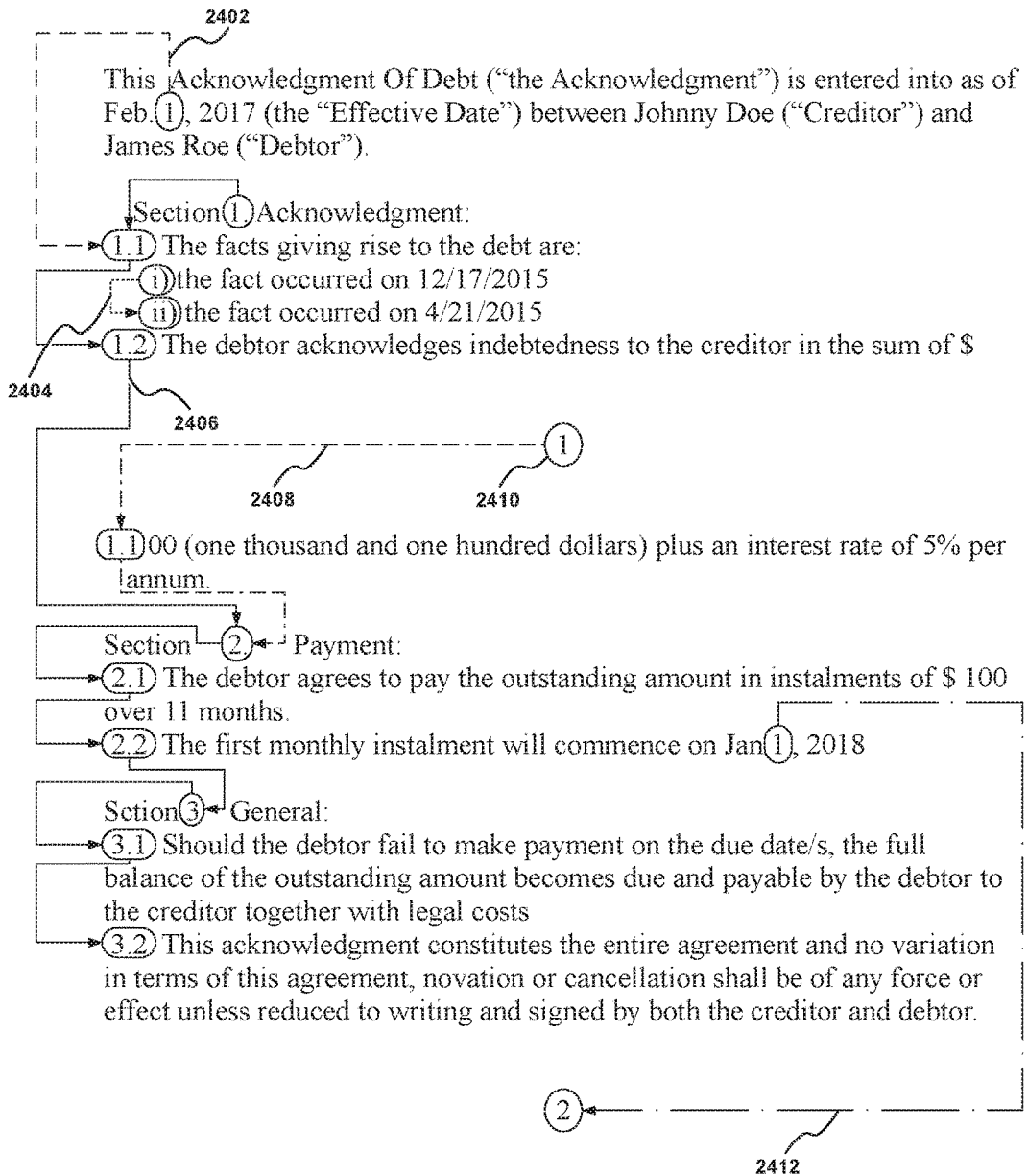
FIG. 24 illustrates an example representation of markers and marker sequences of the first sample document processed according to embodiments of the invention.

The approach of identifying the marker sequences first, used in embodiments of the invention, is illustrated in FIG. 24 to compare it with the approach of the marker-lookup methods described above. The marker sequences that are identified in the first fact pattern to illustrate Example 1, are depicted with (1) marker outlines—such as the 2410—, and (2) sequence connectors—such as 2402. In other words, in FIG. 24 the result of the first identifying procedure processing the document string of Example 1—depicted in 1002 of FIG. 10 is shown. Sequence connectors depicted with different line styles are used to mark the sequence arrays listed in 1002, as described in details below.

The first couple of markers ["1", "1.1"] of sequence array "mS[0]" are connected with the dashed line 2402. The connection between the markers of the pair ["1.1", "1.2"] and the connections between the subsequent couples of consecutive markers of "mS[0]" are depicted with solid lines such as 2406.

The connections between each couple of consecutive markers of "mS[1]" are depicted with solid lines such as the 2406.

The connection between the markers "i)" and "ii)" of "mS[2]" is depicted with the fine-dashed line 2404.

The markers of the couples (a) ["1", "1.1"], and (b) ["1.1", "2."] of sequence array "mS[3]" are connected with the dot-dashed line 2408. The connection between the couple ["2.", "2.1"] and the connections between the subsequent couples of consecutive markers of "mS[3]" are depicted with solid lines such as 2406.

The connection between the markers "1" and "2" of "mS[4]" is depicted with the dot-dashed line 2412.

Following the fact pattern used to illustrate Example 1, the sequence array "mS[1]" is selected as best-fit marker sequence after that the marker sequences are identified. In FIG. 25, the best-fit marker sequence is depicted with marker outlines such as 2504 and with connectors similar to 2502. The TSDS generated in the fact pattern of Example 1, using the congruence function described therein, is depicted in FIG. 12.

In summary, when processing the document in FIG. 5 the first marker-lookup method fails to identify the document structure, whereas the second marker-lookup method of embodiments of the invention according to Example 1 obtain analogous results, depicted respectively in FIG. 23 and in FIG. 12. Nevertheless, even if the results obtained by applying the inventive methods and an interpretation of the methods to date appear similar in this particular case, it turns out that the methods to date face several limitations, which arise from the fact that the approach of the methods to date is oriented to process each single marker of the documents. By contrast, embodiments of the invention overcome such limitations, thanks to the approach oriented to identify the marker sequences first.

Certain aspects, techniques and algorithms of the known marker-lookup methods, from which the limitations arise, are analyzed in detail below. To estimate the performance of the known methods in terms of time complexity, the description of operations whose execution does not affect the performances—e.g., certain operation with linear time complexity, i.e., O(n)—is omitted.

A first limitation of the marker-lookup methods arises from the identification of the compound markers, whose concept is introduced and used in the methods to date because of the restriction that the potential markers are at the beginning of the lines.

The first marker-lookup method, in which the keywords of the compound markers are identified by means of the predefined keyword table, is consequently affected by poor robustness to document errors. For example, if an OCR or a typographical error affects a compound marker—e.g., the marker "Sction 3" of FIG. 5—, the keyword of the affected compound marker cannot be found in the predefined keyword table, and thus cannot be identified. Furthermore, the first marker-lookup method is affected by a dependence on the language and on the character set used in the document—since the predefined keyword table is language-specific—, which is reflected in a greater difficulty in implementing the support of multiple languages of the methods to date.

The second marker-lookup method overcomes said first limitation by means of the word-position rule, nevertheless a second limitation of the marker-lookup methods is still in a dependence of said methods on the language and character set of the document, due to the different language-specific rules and conventions for the compound markers in languages such as, for example, the Chinese Mandarin language described in FIG. 16.

The page-excluding techniques are affected by a further limitation whereby the identifying of the page numbers is also dependant on the document format and on the document language—e.g., in case of page-number text such as "Page 3 of 12". Again, the marker-lookup methods may incur (1) poor robustness to document errors, where such errors affect the text page-number text; (2) dependence on the language and character set; and (3) dependence on the document format—e.g., when documents have a complex and structured format.

The similarity techniques are in turn affected by the following limitations: (1) dependence on the language and character set, as explained in the related art; and (2) risk of providing poor performances, especially in case of lengthy and/or highly structured documents, as explained in detail below.

To group the potential markers by similarity so that an adequate robustness to document errors is obtained, the known methods can, for example, (1) extract a marker pattern from each potential marker, wherein the marker pattern is composed of fixed part(s) and sequenced part(s); and (2) perform a number of similarity comparisons between couples of marker patterns.

To perform the operation of the step (2) of the immediately prior paragraph, a similarity comparison function detects whether a potential marker is similar to the potential markers of certain target marker group or not. The similarity comparison function uses similarity techniques to detect the similarity between (a) the potential marker, and (b) a flagship marker of the target marker group. These similarity techniques, by following rules and conventions specific for the character set of the document, for each couple of markers detect separately the similarity (1) of the fixed part(s) (basing on similarity string functions, e.g., the Levenshtein distance), and (2) of the sequenced part(s) (basing on the type of the sequenced part, e.g., numeric, alphabetic, etc.). Assuming that, for example, a linear time-complexity k-Means clustering algorithm is implemented for the marker-grouping step, and that N is the number of potential markers of an input document, it turns out that the number of similarity comparisons to be performed can reach $N*(N-1)/2$.

Poor performances of the marker-grouping step may arise, for example, from (1) a lengthy document in which the number of the potential markers is 100 or more—and consequently the comparisons performed can reach the number of 4.950—; (2) a deeply structured document, in which several marker patterns have complex structure of fixed and sequenced parts; and/or (3) a document in a non-alphabetic language, for which the similarity comparison functions have generally performances poorer than for the alphabetic ones.

Following the analysis, the sequencing techniques process the sequenced parts of the marker patterns of each marker group in order to identify the group sequence(s) in each marker group.

The sequencing techniques are affected by a risk of poor performances similar to the one that affects the similarity techniques, even if it is assumed herein that techniques among the most efficient are used to identify sequences of markers each marker group. For example, the following sequencing technique may be applied to each marker group: first, the markers of the marker group are sorted in ascending order according to the type of the sequenced part(s) of the marker patterns, and then each marker of the marker group is compared with the subsequent marker (if such a marker exists) in order to detect if the two markers are sequential. It will be recalled that the time complexity of the most performant sorting algorithms, e.g. Merge Sort, is O(n log n), wherein "n" in this case is the number of markers of the marker groups.

The constructing techniques process the markers of the marker groups to identify a structure of markers. The constructing techniques have as input data (1) the markers of each group; and (2) the position in the document of each marker, which is crucial for detecting the dependency relations between the marker groups in case of document with multiple hierarchies. An example of document for which the position of the markers is used in the constructing techniques is a multiple-hierarchies document with (1) a first hierarchy of sections/subsections, including the markers "1", "1.1", "1.2", "1.3", "1.4" and "2"; and (2) a second hierarchy placed below the end of the first, the second hierarchy including the markers "1", "1.1", and "1.2". In said multiple-hierarchies document, a sequencing technique of the methods to date identifies the following sequences:

I: ["1", "2" ];
II: ["1.1", "1.2", "1.3", "1.4" ];
III: ["1" ]; and
IV: ["1.1", "1.2" ].

The positions of the markers of the sequences above are used to detect (1) whether the sequence II is dependent (1-a) on the marker "1" of the sequence I, or (1-b) on the marker "1" of the sequence III; and, dually, (2) whether the sequence IV is dependent (2-a) on the marker "1" of the sequence I, or (2-b) on the marker "1" of the sequence III.

Therefore, the constructing techniques may incur a risk of poor performances due to the number of detections of dependence relationships performed between the markers of the sequences of markers, which, especially in case of document with several hierarchies, can reach, for each sequence of marker, M*(M−1)/2–wherein M is the number of markers in the sequence of markers. For this reason, the time complexity of the constructing techniques is $O(n^2)$.

Conversely to these known methods, embodiments of the invention do not require use of the same techniques that negatively affect the known methods.

The identifying procedure of embodiments of the invention, described with reference to FIG. 1 above, is indeed based on scanning the document string in search of (1) a marker in the form of first-element string, or (2) a marker consecutively congruent to the last markers of each sequence array. In greater details, it turns out that, in a modified version of the first identifying procedure, each operation of the main loop of the modified version is performed only one time for each marker sequence encountered in the scanning process. For example, in a third implementation of the identifying procedure (hereinafter, "third identifying procedure") a set of acceptable markers is calculated each time that a marker is detected either in "mF1" or in "mF2" of FIG. 3, so that the set of acceptable markers includes (1) the markers in the form of first-element string, and (2) the markers consecutively congruent to the last markers of each sequence array. Consequently, the time complexity of the third identifying procedure is O(n), i.e., it increases linearly with the number of markers of the document.

By contrast, the time complexity of the second identifying procedure of Example 3, if transcribed blindly, is $O(n^3)$—given that block 422 of FIG. 4 performs a scan of the "mS[i]" elements that potentially involves all the elements except the last. In a fourth implementation of the identifying procedure (hereinafter, "fourth identifying procedure"), certain hashing and indirect referencing techniques are used, for example, to obtain the same result of the second identifying procedure with improved performances. Additionally, to further improve the performances of the fourth identifying procedure, the appending of certain branch sequence arrays to "mS" is bypassed in case, for example, of duplicate sequence arrays or of subset branch sequence arrays—as described in the second fact pattern illustrating Example 3. Through the improvements mentioned in this paragraph, the time complexity of the fourth identifying procedure can be reduced to O(n).

Furthermore, there is no limitation on the languages and character sets supported in the implementations of the identifying procedures given that, for example, a character set can be further supported in the identifying procedures by, where it is needed, (1) populating accordingly predefined table(s) of (1-a) first-element strings, and/or (1-b) markers consecutively congruent; and/or (2) supporting the numeration system of the character set. The identifying procedures also supports the right-to-left languages with no need of adaptations—as shown in with reference to the processing of FIG. 16—, since these procedures are not affected by the restriction of identifying only the markers at the beginning of the lines. It is also noted that, with no further modification, an implementation of the identifying procedures supporting, for example, (1) a first language with a first character set, and (2) a second language with a second character set, further identifies the markers of a bilingual document in which both the first and second language are used together.

Lastly, embodiments of the invention, thanks to the implementations of the identifying procedures, are more robust to the document errors—e.g. "Sction 3" of Example 1—and to the formatting/style document issues than the known methods. The robustness to the document errors is because the identifying procedures identify exclusively the sequential markers, and not the compound markers as the methods to date do. The robustness to the formatting/style document issues—especially shown in the second fact pattern to illustrate Example 2—arises from the fact that the identifying procedures do not use any information related to the formatting and to the style of the document.

Embodiments of the invention support a wide range of implementations and of implementation parameters, which allow tuning the features of the embodiments to (a) correctly interpret the greatest possible number of documents, and (b) support various options of identification of sections, subsections, and numbered lists in a document. Since embodiments according to Example 1 is one of the simplest possible, albeit of proven efficacy, it is utilized as a basis for comparison with the methods to date.

The time complexity of the step of the eligibility calculation is linear with the number of marker sequences identified, since it assigns an eligibility value to each sequence array. In Example 1, the computation time is further reduced given that the best-fit function is simply a function returning the number of elements of the sequence arrays.

Moreover, the time complexity of the step in which the eligible marker sequence is selected, as shown in the loops of flows 100 and 200 (FIGS. 1 and 2), is also linear with the number of marker sequences identified.

Lastly, by analyzing the hierarchy combining techniques, it turns out that their time complexity is linear with the number of markers in the combined marker sequence, which is, in turn, less than or equal to the number of markers identified.

Hereinafter, it is shown that the implementations of embodiments of the invention do not require use of any of the techniques utilized in the known methods.

In greater detail, page-excluding techniques are not required in embodiments of the invention, which exclude the page numbers from the set of eligible marker sequences as a function of the operation of those embodiments themselves. For example, in the first fact pattern to illustrate Example 1, set forth above, the page numbers of the documents are identified as markers and stored in the marker sequences "mS[3]" and "mS[4]" through the first identifying procedure, and then they are excluded from the set of eligible marker sequence, i.e., neither "mS[3]" nor "mS[4]" is selected as best-fit marker sequence.

Implementations of similarity techniques and of sequencing techniques are also not required for practicing the invention, given that by executing the identifying procedures according to embodiments of the invention, the markers are grouped using the criterion of consecutive congruence. As described in detail below, if the identifying procedures are compared with the similarity and sequencing techniques, they (1) present significant improvements, and (2) do not face the above-described limitations.

A noticeable advantage of the identifying procedures in terms of time complexity lies in the fact that the sequence arrays are populated while the document is scanned, so that the markers of the sequence arrays are in the tree ordering and do not need to be further sorted.

The advantage that the sequence arrays—and, consequently, the eligible marker sequences—are already in the tree ordering takes effect also when comparing the structure-detecting techniques of embodiments of the invention to the constructing techniques of the methods to date. One such advantage is shown practically in Example 1, where the TSDS is generated using a structure-detecting technique in which the congruence function is applied to each couple of consecutive markers of the best-fit marker sequence. Therefore, the structure-detecting technique has a time complexity of $O(n)$, i.e. increasing linearly with the number of the markers of the best-fit marker sequence. Said time complexity is an improvement if compared with the time complexity $O(n^2)$ of the constructing techniques.

If the constructing techniques are compared with the hierarchy combining techniques according to embodiments of the invention, it also turns out that the time complexity of the hierarchy combining techniques, which is $O(n)$, leads to better performances of embodiments of the invention compared with the known methods.

Example 11 and Fact Pattern to Illustrate

In Example 11, embodiments of the invention are implemented as an add-on, or adjunct to a word processor program.

Figure 26:
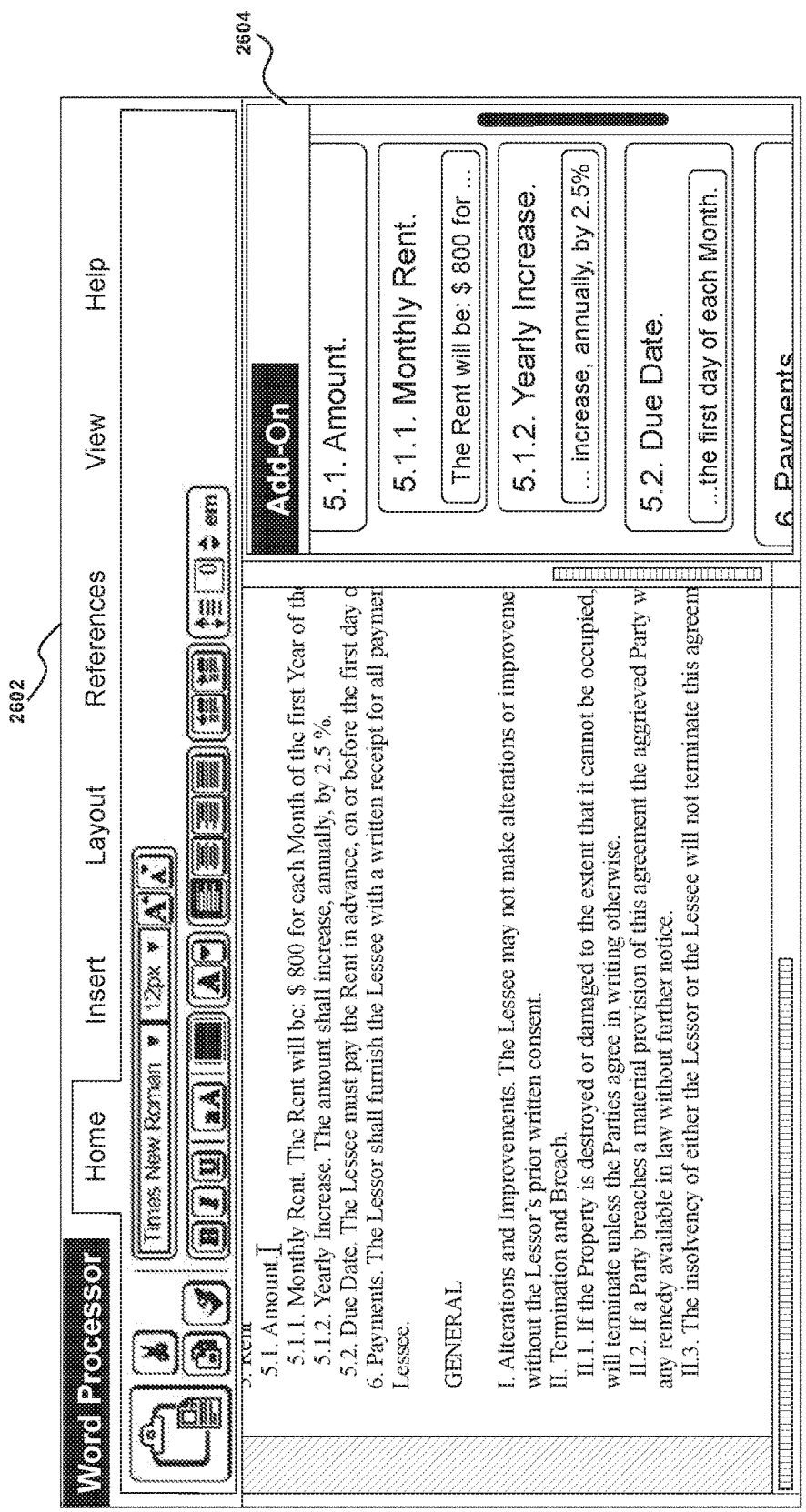
FIG. 26 illustrates an example visualization of a supplemental visualization window in which the fifth sample input document string was processed according to embodiments of the invention.

FIG. 26 illustrates a user screen to a word processor program 2602. In this figure, the user of the word processor program 2602 utilizes an add-on viewer section 2604 to navigate the document of FIG. 13 directly from the panel. Embodiments of the invention identify, in real time, the section hierarchies while the user simultaneously edits the document, i.e., each time that the user performs an edit action in the text of the document.

In this scenario it is important that embodiments of the invention are responsive and timely during the editing of the text. One of the features of embodiments of the invention is (1) identifying the marker sequences in a first step, and then (2) assign an eligibility value in a second step. One of the benefits of this feature—as described in details below—is that it allows embodiments of the invention to perform quickly enough to operate in or near "real-time", within the add-on to the word processor program 2602. The editing of text generally involves small text modifications at a time, and most times they do not affect any of the markers identified by embodiments of the invention. Namely, a few text modifications involve a single marker which is added, edited, or removed by the user; and even less text modifications involve two or more markers at a time. Consequently, at each text modification, a limited number of marker sequences—generally none of them—is modified, thus the eligibility value(s) of the unchanged marker sequence(s) are not recalculated in the second step of the embodiments of the invention, and this leads to a further improvement of the performance.

The above-described examples and embodiments may be implemented by one or more processors operating on one or more computers or computing devices. Such computing devices may include hand-held telephones, as well as desktop, laptop, and networked computers. The disclosure now turns to example techniques and systems for implemeting embodiments of the invention.

General System

Figure 32:
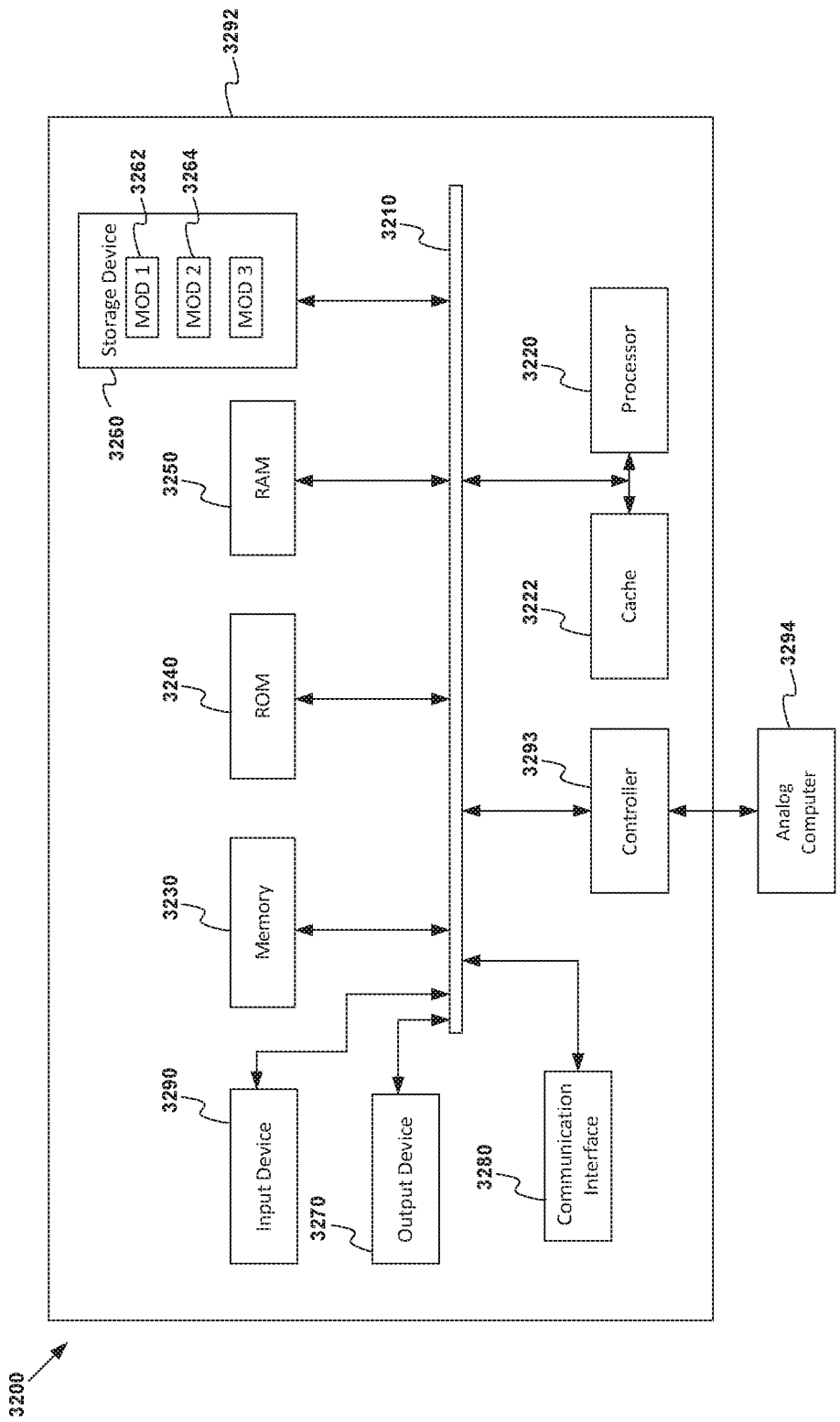
FIG. 32 is a block diagram illustrating an example computing system including a processor for implementing embodiments of the invention.

With reference to FIG. 32, an exemplary system according to embodiments of the disclosure includes a computing device 3200, including a processing unit (CPU or processor) 3220 and a system bus 3210 that couples various system components including the input device 3290 and the output device 3270 to the processor 3220. The system 3200 can include a cache 3222 of high speed memory connected directly with, in close proximity to, or integrated as part of the processor 3220. The system 3200 copies data from the memory 3230 and/or the storage device 3260 to the cache 3222 for quick access by the processor 3220. In this way, the cache provides a performance boost that avoids processor 3220 delays while waiting for data. These and other modules can control or be configured to control the processor 3220 to perform various actions. Other system memory 3230 may be available for use as well. The memory 3230 can include multiple different types of memory with different performance characteristics. It can be appreciated that the disclosure may operate on a computing device 3200 with more than one processor 3220 or on a group or cluster of computing devices networked together to provide greater processing capability. The processor 3220 can include any processor and a hardware module or software module, such as module 1 3262, module 2 3264, and module 3 3266 stored in storage device 3260, configured to control the processor 3220 as well as a special-purpose processor where some or all software instructions used to implement embodiments of the invention are incorporated into the actual processor design. The processor 3220 may essentially be a completely self-contained computing system, containing multiple cores or processors, a bus, memory controller, cache, etc. A multi-core processor may be symmetric or asymmetric.

The system bus 3210 may be any of several types of bus structures including a memory bus or memory controller, a peripheral bus, and a local bus using any of a variety of bus architectures. A basic input/output (BIOS) stored in ROM 3240 or the like, may provide the basic routine that helps to transfer information between elements within the computing device 3200, such as during start-up. The computing device 3200 further includes storage devices 3260 such as a hard disk drive, a magnetic disk drive, an optical disk drive, a solid state drive, a tape drive or the like. The storage device 3260 can include software modules 3262, 3264, 3266 for controlling the processor 3220. Other hardware or software modules are contemplated. The storage device 3260 is connected to the system bus 3210 by a drive interface. The drives and the associated computer readable storage media provide nonvolatile storage of computer readable instructions, data structures, program modules and other data for the computing device 3200. In one aspect, a hardware module that performs a particular function includes the software component stored in a non-transitory computer-readable medium in connection with the necessary hardware components, such as the processor 3220, bus 3210, display 3270, and so forth, to carry out the function. The basic components are known to those of skill in the art and appropriate variations are contemplated depending on the type of device, such as whether the device 3200 is a small, handheld computing device, a desktop computer, or a computer server.

Although the exemplary embodiment described herein employs the storage device 3260, it should be appreciated by those skilled in the art that other types of computer readable media which can store data that are accessible by a computer, such as magnetic cassettes, flash memory cards, digital versatile disks, cartridges, random access memories (RAMs) 3250, read only memory (ROM) 3240, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 3200, an input device 3290 represents any number of input mechanisms, such as a microphone for speech, a touch-sensitive screen for gesture or graphical input, keyboard, mouse, motion input, speech and so forth. An output device 3270 can also be one or more of a number of output mechanisms known to those of skill in the art. In some instances, multimodal systems enable a user to provide multiple types of input to communicate with the computing device 3200. The communications interface 3280 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 3220. The functions these blocks represent may be provided through the use of either shared or dedicated hardware, including, but not limited to, hardware capable of executing software and hardware, such as a processor 3220, that is purpose-built to operate as an equivalent to software executing on a processor. For example the functions of one or more processors presented in FIG. 32 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 3240 for storing software performing the operations discussed below, and random access memory (RAM) 3250 for storing results. Very large scale integration (VLSI) hardware embodiments, as well as custom VLSI circuitry in combination with a DSP circuit, may also be provided.

The logical operations of the various embodiments may be implemented as: (1) a sequence of computer implemented steps, operations, or procedures running on a programmable circuit within the computer 3200, (2) a sequence of computer implemented steps, operations, or procedures running on a specific-use programmable circuit; and/or (3) interconnected machine modules or program engines within the programmable circuits. The system 3200 shown in FIG. 32 can practice all or part of the recited methods, can be a part of the recited systems, and/or can operate according to instructions in the recited non-transitory computer-readable storage media. Such logical operations can be implemented as modules configured to control the processor 3220 to perform particular functions according to the programming of the module. For example, FIG. 32 illustrates three modules Mod1 3262, Mod2 3264 and Mod3 3266 which are modules configured to control the processor 3220. These modules may be stored on the storage device 3260 and loaded into RAM 3250 or memory 3230 at runtime or may be stored as would be known in the art in other computer-readable memory locations. The computer 3292 can be coupled to an analog computer 3294 via the controller 3293. In some embodiments, the analog computer 3294 is a quantum computer and the computer 3292 is a classical computer.

In some embodiments, a user operating the computer 3200 first uses the input device 3290, such as a touchscreen interface on a hand-held device, to open an application that implements embodiments of the invention. Opening the application causes a sequence of computer implemented steps, operations, or procedures to be retrieved from a storage location, such as storage device 3260, and can be stored locally in another component of the computer 3200, such as the memory 3230, RAM 3250, and/or cache 3222. Then, the program initiates by loading instructions to the processor 3220, which steps through the instructions in an order controlled by the program itself. The user may (1) enter and/or paste a document to be analyzed—where said document is in form of text string—through an appropriate entry field of an user interface of the program; and/or (2) direct the program where to find a document to be analyzed, which may be stored on the computer 3200, or may be received through the input device 3290 or communication interface 3280. Embodiments of the invention may generate output for the user, as described above, which may be presented on the output device 3270 or elsewhere.

Figure 33:
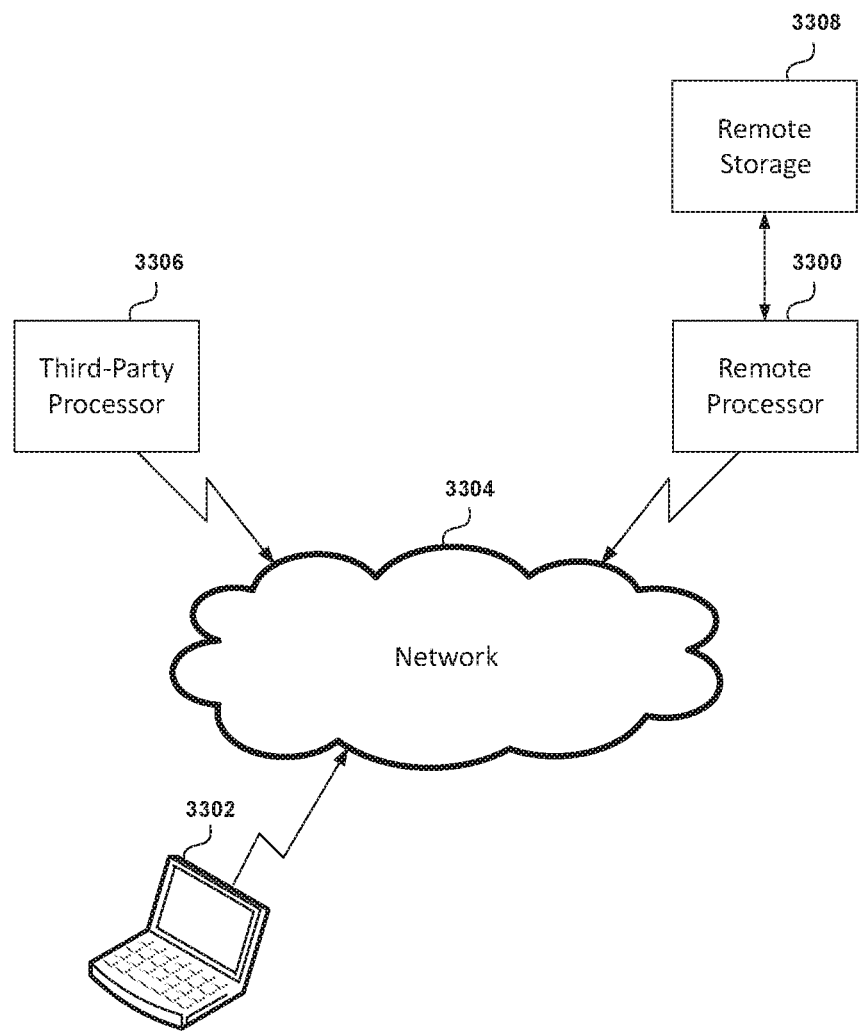
FIG. 33 is a block diagram illustrating an example computing network system including a remote processor for implementing embodiments of the invention.

Although FIG. 32 illustrates a single computer 3200, the examples discussed above, however, are not limited to being performed on a single computer 3200. Rather, in some embodiments, the examples may be performed on a remote processor 3300, as illustrated in FIG. 33, which communicates with a local device 3302. The remote processor 3300 may connect to one or more local devices 3302, such as a user device, through a network 3304. The remote processor 3300 may be any computing device that can connect to a network, one example of which is computer 3200 illustrated in FIG. 32. The local device 3302 may also be any computing device that can connect to a network, one example of which is the computer 3200. The network 3304 may be any network which allows the remote processor 3300 and the local device 3302 to communicate with each other, including, but not limited to, a personal area network (PAN), a local area network (LAN), a wireless local area network (WLAN), a wide area network (WAN), etc.

A user can upload an input file to the remote processor 3300 through the local device 3302. The local device 3302 transfers the input file for processing to the remote processor 3300 through the network 3304. In other embodiments, a user can transmit an input string to the remote processor 3300 through the local device 3302. The local device 3302 transfers the input string for processing to the remote processor 3300 through the network 3304. In yet other embodiments, a user can transmit a web address string to the remote processor 3300 through the local device 3302. The local device 3302 transfers the web address string for processing to the remote processor 3300 through the network 3304, and the remote processor 3300 obtains an input file and/or an input string from a third-party processor 3306, where the input file and/or the input string may be stored or not in a remote storage 3308 of the remote processor 3300.

The remote processor 3300 receives the input file and/or the input string and builds marker sequence arrays or other operations according to any one of the examples discussed above. In further embodiments, the user can transmit a selection of an input file and/or an input string to the processor 3300 through the local device 3302. The remote processor 3300 (1) receives the selection of the input file and/or of the input string; (2) obtains an input file and/or an input string from a third party processor 3306, where the input file and/or the input string is not in the remote storage 3308 of the remote processor 3300; and (3) builds marker sequence arrays or other operations according to any one of the examples discussed above.

The remote processor 3300 may then transmit an output file, or output data, based on the indexing of the input file and/or input string to the local device 3302 for viewing on a display of the local device 3302.

In yet further embodiments, operations for processing of the document may be shared between both the remote processor 3300 and the local device 3302. In other words, the local device 3302 may perform some operations of embodiments of the invention while the remote processor 3300 performs the remainder of the operations used to implement embodiments of the invention.

EXAMPLE EMBODIMENTS

Illustrative example embodiments of the technologies disclosed herein are provided below. An embodiment of the technologies may include any one ore more, and any combination of, the example embodiments described below.

Example embodiment 1 includes a computer implemented method for identifying one or more data elements in an input data stream formed from an input data structure using processing enabled by a processor-executable instruction stored on a non-transitory computerized storage medium, the method comprising: identifying a marker sequence set in the input document string, the marker sequence set including a marker sequence; assigning an eligibility value to each marker sequence, the eligibility value being a number calculated using an eligibility calculation, to obtain at least one eligible marker sequence; generating output data comprising data related to the at least one eligible marker sequence; and providing the output data.

Example embodiment 2 includes aspects of example embodiment 1, wherein the one or more data elements include one or more selected from the group consisting of a section, a subsection, a numbered list, and an outline numbered list.

Example embodiment 3 includes aspects of example embodiments 1-2, and is additionally capable of identifying a marker sequence set in the input document string without operator intervention.

Example embodiment 4 includes aspects of preceding example embodiments 1-3 wherein the providing includes displaying the output data on a human-readable interface.

Example embodiment 5 includes aspects of preceding example embodiments 1-4 wherein the identifying of a marker sequence set comprises: storing one or more initial sequential marker(s) of the input document string in one or more first sequence array(s), wherein each stored initial sequential marker is in the form of first-element string; and storing one or more consecutive sequential marker(s) of the input document string in one or more second sequence array(s), wherein each stored consecutive sequential marker is consecutively congruent to at least one marker of the second sequence array(s).

Example embodiment 6 includes aspects of preceding example embodiments 1-5 wherein the eligibility calculation uses data related to the sequential marker(s) of each marker sequence.

Example embodiment 7 includes aspects of preceding example embodiments 1-6 wherein the eligibility calculation uses eligibility data of an eligibility data set, and wherein the eligibility data set includes (a) a cardinality of a sequential marker set comprising each sequential marker, (b) a substring of a first sequential marker, (c) a string adjacent to a second sequential marker, (d) a sequential number of a third sequential marker, and (e) identification information in a wrapping string of a fourth sequential marker, of each of the marker sequences, and wherein the wrapping string is obtained from a first substring of the input document string.

Example embodiment 8 includes aspects of preceding example embodiments 1-7 further comprising selecting one or more eligible marker sequences; and verifying at least one of a list of eligibility conditions for each of the eligible marker sequences, wherein each eligibility condition of the list compares an eligibility value of the eligible marker sequence to a comparison value Example embodiment 9 includes aspects of preceding example embodiments 1-8 further comprising: selecting one or more eligible marker sequence from the marker sequence set, by verifying at least one of a list of eligibility conditions for each of the eligible marker sequences, wherein each eligibility condition of the list compares an eligibility value of the eligible marker sequence to a comparison value set, wherein the comparison value set comprises (i) a threshold value, (ii) a comparison marker value obtained from eligibility value(s) of marker sequence(s), (iii) an adaptive comparison value calculated using an adaptive threshold calculation based on the eligibility value(s), or (iv) two or more of any of these, and wherein the output data comprises (i) an output string obtained from output marker caption(s) of first-output eligible sequential marker(s), (ii) output identification information of second-output eligible sequential marker(s) in an identification string obtained from a second substring of the input document string, (iii) a report value obtained from eligibility value(s) of third-output eligible sequential marker(s), or (iv) two or more of any of these.

Example embodiment 10 includes aspects of preceding example embodiments 1-9, further comprising: accepting an input document; performing a first pre-treatment process on the input document, and generating the input data stream from an output of the first pre-treatment process.

Example embodiment 11 includes aspects of the preceding example embodiment 10, further comprising: detecting if at least one removable string is present in the output of the first pre-treatment process; and removing the at least one removable string; wherein a removable string(s) comprises one or more selected from the group consisting of a page header, a page footer, and a footnote.

Example embodiment 12 includes aspects of preceding example embodiments 1-11 wherein the input document string is in HTML format.

Example embodiment 13 includes aspects of preceding example embodiments 1-12 wherein identifying a marker sequence set in the input document string comprises identifying an internal reference to a referred sequential marker in the input document string.

Example embodiment 14 includes aspects of preceding example embodiments 1-13, further comprising: verifying parent sequential marker(s) of child sequential marker(s), from a set of parental conditions, wherein the set of parental conditions comprises one or more selected from the group consisting of a first parent sequential marker identifying a parent section of the input document string, a child sequential marker identifying a first subsection of the parent section, a second parent sequential marker identifying a parent subsection of the input document string, and a child sequential marker identifying a second subsection of the parent subsection.

Example embodiment 15 includes aspects of preceding example embodiments 1-14 wherein combining a first eligible marker sequence with a second eligible marker sequence into a third eligible marker sequence, wherein the third eligible marker sequence comprises (a) one or more markers of the first eligible marker sequence, and (b) one or more markers of the second eligible marker sequence.

Example embodiment 16 includes aspects of the preceding example embodiments 1-15 wherein the input document string includes text in two or more document languages.

Example embodiment 17 includes aspects of preceding example embodiments 1-16 wherein the data structure comprises a computer-readable text document.

Example embodiment 18 includes an apparatus for determining document structure, comprising: an input for accepting an input data structure; and one or more processors configured to: generate an input document string from the input data structure; identify a marker sequence set in the input document string, the marker sequence set including a marker sequence; assign an eligibility value to each marker sequence, the eligibility value being a number calculated using an eligibility calculation, to obtain at least one eligible marker sequence; generate output data comprising data related to the at least one eligible marker sequence; and provide the output data.

Example embodiment 19 includes aspects of preceding example embodiment 18 wherein the input receives the input data structure through a network coupled to the apparatus.

Example embodiment 20 includes aspects of preceding example embodiments 18-19 wherein the output data is provided through a network coupled to the apparatus.

Aspects of the disclosure may operate on particularly created hardware, firmware, digital signal processors, or on a specially programmed computer including a processor operating according to programmed instructions. The terms controller or processor as used herein are intended to include microprocessors, microcomputers, quantum computers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a computer readable storage medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or computer-readable storage media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

All described embodiments and features of the present invention may be combined with each other in any arbitrary manner, except where as described to be exclusive or know to those of skill in the art as technically unable to be combined.

The invention claimed is:

1. A computer-implemented method for determining document structure of a document, the method comprising:
   generating a document string corresponding to the document;
   identifying a first candidate marker at a first position in the document string;
   based on determining that the first candidate marker is in a predefined first-element form, adding the first candidate marker to a set of marker sequences associated with the document as a first marker sequence, wherein the first marker sequence corresponds to a first candidate hierarchy for the document structure;

identifying a second candidate marker occurring at a second position in the document string subsequent to the first position;

based on determining that the second candidate marker is in the predefined first-element form, adding the second candidate marker to the set of marker sequences as a second marker sequence, wherein the second marker sequence corresponds to a second candidate hierarchy for the document structure;

identifying a third candidate marker occurring at a third position in the document string subsequent to the second position;

based on determining that the third candidate marker is not in the predefined first-element form, iteratively determining whether the third candidate marker is consecutively congruent to a last element in each respective marker sequence of the set of marker sequences;

based on determining that the third candidate marker is consecutively congruent to the last element in the first marker sequence, adding the third candidate marker to the first marker sequence;

determining at least one eligible marker sequence based on evaluating each marker sequence of the set of marker sequences using at least one marker sequence eligibility criteria; and generating a display of the document comprising visual indicia associated with a determined document structure, wherein the visual indicia correspond to a determined hierarchy for the document structure based on the at least one eligible marker sequence.

2. The method of claim 1, wherein each candidate marker is associated with at least one of: a section, a subsection, an element of a numbered list, or an element of an outline numbered list.

3. The method of claim 1, wherein evaluating each marker sequence is based on sequential markers in the respective marker sequences other than an initial marker.

4. The method of claim 3, wherein the at least one marker sequence eligibility criteria include one or more rules based on:
a cardinality of a sequential marker set comprising the sequential markers.

5. The method of claim 3, wherein the at least one marker sequence eligibility criteria include one or more rules based on:
a substring adjacent to the sequential markers, or
a superstring comprising:
at least a portion of a given sequential marker; and
characters adjacent to the given sequential marker.

6. The method of claim 1, wherein generating the document string comprises:
detecting if at least one removable string is present in text content of the document, wherein a string is determined to be removable if it comprises a page header, a page footer, or a footnote; and
removing the at least one removable string.

7. The method of claim 1, further comprising:
combining a first eligible marker sequence with a second eligible marker sequence to generate a third eligible marker sequence,
wherein the visual indicia correspond to the third eligible marker sequence.

8. The method of claim 1, wherein determining that the third candidate marker is consecutively congruent to the last element of the first marker sequence is based on determining that the third candidate marker indicates a next section, subsection, or list element associated with the last element.

9. The method of claim 1, wherein determining that the third candidate marker is consecutively congruent to the last element of the first marker sequence is based on determining that the third candidate marker indicates a child section, subsection, or list element associated with the last element.

10. The method of claim 1, wherein determining that the third candidate marker is consecutively congruent to the last element of the first marker sequence is based on determining that the third candidate marker indicates a next section, subsection, or list element associated with a parent element of the last element.

11. A document processing apparatus comprising:
at least one processor; and
memory storing instructions that, when executed by the at least one processor, cause the document processing apparatus to:
generate a document string corresponding to a document;
identify a first candidate marker at a first position in the document string;
based on determining that the first candidate marker is in a predefined first-element form, add the first candidate marker to a set of marker sequences associated with the document as a first marker sequence, wherein the first marker sequence corresponds to a first candidate hierarchy for a document structure of the document;
identify a second candidate marker occurring at a second position in the document string subsequent to the first position;
based on determining that the second candidate marker is in the predefined first-element form, add the second candidate marker to the set of marker sequences as a second marker sequence, wherein the second marker sequence corresponds to a second candidate hierarchy for the document structure;
identify a third candidate marker occurring at a third position in the document string subsequent to the second position;
based on determining that the third candidate marker is not in the predefined first-element form, iteratively determine whether the third candidate marker is consecutively congruent to a last element in each respective marker sequence of the set of marker sequences;
based on determining that the third candidate marker is consecutively congruent to the last element in the first marker sequence, add the third candidate marker to the first marker sequence;
determine at least one eligible marker sequence based on evaluating each marker sequence of the set of marker sequences using at least one marker sequence eligibility criteria; and
generate a display of the document comprising visual indicia associated with a determined document structure, wherein the visual indicia correspond to a determined hierarchy for the document structure based on the at least one eligible marker sequence.

12. The apparatus of claim 11, wherein each candidate marker is associated with at least one of: a section, a subsection, an element of a numbered list, or an element of an outline numbered list.

13. The apparatus of claim 11, wherein the instructions, when executed by the at least one processor, cause the document processing apparatus to evaluate each marker sequence based on sequential markers in the respective marker sequences other than a initial marker, and
   wherein the at least one marker sequence eligibility criteria include one or more rules based on a cardinality of a sequential marker set comprising the sequential markers.

14. The apparatus of claim 11, wherein the instructions, when executed by the at least one processor, cause the document processing apparatus to determine that the third candidate marker is consecutively congruent to the last element of the first marker sequence based on determining that the third candidate marker indicates a next section, subsection, or list element associated with the last element.

15. The apparatus of claim 11, wherein the instructions, when executed by the at least one processor, cause the document processing apparatus to determine that the third candidate marker is consecutively congruent to the last element of the first marker sequence based on determining that the third candidate marker indicates a child section, subsection, or list element associated with the last element.

16. The apparatus of claim 11, wherein the instructions, when executed by the at least one processor, cause the document processing apparatus to determine that the third candidate marker is consecutively congruent to the last element of the first marker sequence based on determining that the third candidate marker indicates a next section, subsection, or list element associated with a parent element of the last element.

17. One or more non-transitory computer-readable media storing instructions that, when executed by at least one processor, cause a device to determine document structure of a document by causing the device to perform steps comprising:
   generating a document string corresponding to the document;
   identifying a first candidate marker at a first position in the document string;
   based on determining that the first candidate marker is in a predefined first-element form, adding the first candidate marker to a set of marker sequences associated with the document as a first marker sequence, wherein the first marker sequence corresponds to a first candidate hierarchy for the document structure;
   identifying a second candidate marker occurring at a second position in the document string subsequent to the first position;
   based on determining that the second candidate marker is not in the predefined first-element form, iteratively determining whether the second candidate marker is consecutively congruent to a last element in each respective marker sequence of the set of marker sequences, wherein each marker sequence corresponds to a respective candidate hierarchy for the document structure;
   based on determining that the second candidate marker is consecutively congruent to the last element in the first marker sequence, adding the second candidate marker to the first marker sequence;
   determining at least one eligible marker sequence based on evaluating each marker sequence of the set of marker sequences using at least one marker sequence eligibility criteria; and
   generating a display of the document comprising visual indicia associated with a determined document structure, wherein the visual indicia correspond to a determined hierarchy for the document structure based on the at least one eligible marker sequence.

18. The computer-readable media of claim 17, wherein evaluating each marker sequence is based on sequential markers in the respective marker sequences other than an initial marker, and wherein the at least one marker sequence eligibility criteria include one or more rules based on:
   a substring adjacent to the sequential markers, or
   a superstring comprising:
      at least a portion of a given sequential marker; and
      characters adjacent to the given sequential marker.

19. The computer-readable media of claim 17, wherein determining that the second candidate marker is consecutively congruent to the last element of the first marker sequence based on determining that the second candidate marker indicates a next section, subsection, or list element associated with the last element.

20. The computer-readable media of claim 17, wherein determining that the second candidate marker is consecutively congruent to the last element of the first marker sequence is based on determining that the second candidate marker indicates:
   a child section, subsection, or list element associated with the last element, or
   a next section, subsection, or list element associated with a parent element of the last element.

* * * * *

UNITED STATES PATENT AND TRADEMARK OFFICE
CERTIFICATE OF CORRECTION

PATENT NO. : 10,460,162 B2
APPLICATION NO. : 16/155844
DATED : October 29, 2019
INVENTOR(S) : Patrizio Gelosi Page 1 of 1

It is certified that error appears in the above-identified patent and that said Letters Patent is hereby corrected as shown below:

In the Claims

On Column 62, Line 36:
In Claim 19, after "sequence," insert --is--

Signed and Sealed this
Fourth Day of February, 2020

Andrei Iancu
*Director of the United States Patent and Trademark Office*